(12) United States Patent
Mittal et al.

(10) Patent No.: US 11,705,582 B2
(45) Date of Patent: Jul. 18, 2023

(54) SEPARATORS FOR FLAT PLATE BATTERIES, IMPROVED BATTERIES, AND RELATED METHODS

(71) Applicant: Daramic, LLC, Charlotte, NC (US)

(72) Inventors: Surendra Kumar Mittal, Bangalore (IN); Naveen Prabhu Shanmugam, Bangalore (IN); J. Kevin Whear, Utica, KY (US); Eric H. Miller, Philpot, KY (US)

(73) Assignee: Daramic, LLC, Charlotte, NC (US)

( * ) Notice: Subject to any disclaimer, the term of this patent is extended or adjusted under 35 U.S.C. 154(b) by 130 days.

(21) Appl. No.: 16/886,805

(22) Filed: May 29, 2020

(65) Prior Publication Data

US 2020/0295335 A1    Sep. 17, 2020

Related U.S. Application Data

(60) Division of application No. 15/235,197, filed on Aug. 12, 2016, now Pat. No. 10,693,118, which is a continuation of application No. PCT/US2015/045060, filed on Aug. 13, 2015.

(60) Provisional application No. 62/204,693, filed on Aug. 13, 2015.

(51) Int. Cl.
  *H01M 10/12*   (2006.01)
  *H01M 50/446*  (2021.01)
  *H01M 50/466*  (2021.01)

(52) U.S. Cl.
  CPC ......... *H01M 10/12* (2013.01); *H01M 50/446* (2021.01); *H01M 50/466* (2021.01)

(58) Field of Classification Search
  None
  See application file for complete search history.

(56) References Cited

U.S. PATENT DOCUMENTS

| | | | |
|---|---|---|---|
| 3,967,978 A | 7/1976 | Honda et al. | |
| 4,440,838 A | 4/1984 | Schmidt | |
| 5,001,025 A * | 3/1991 | Rose ...................... | H01M 4/22 205/78 |
| 5,616,434 A | 4/1997 | Redden et al. | |
| 6,000,153 A | 12/1999 | Hercamp et al. | |
| 6,703,161 B2 | 3/2004 | Zucker | |
| 2003/0049525 A1 | 3/2003 | Hottori et al. | |

(Continued)

FOREIGN PATENT DOCUMENTS

WO    WO2011049852    4/2011

*Primary Examiner* — Daniel S Gatewood
(74) *Attorney, Agent, or Firm* — Hammer & Associates, P.C.

(57) ABSTRACT

An exemplary hybrid battery separator is provided with a porous sheet with a folded bottom edge and joined lateral edges that form a pocket. The folded bottom edge may have one or more openings or slits. The hybrid separators of the present disclosure are particularly useful for flat-plate cycling batteries. The separators of the present disclosure may effectively enhance the battery re-chargeability and the backup time. In addition, the separators of the present disclosure may contribute to the reduction of water loss in the battery, lowering the maintenance needs in service. It is expected that batteries having the separators of the present disclosure may be useful in various applications, such as in inverters, golf carts, as well as solar and traction applications.

10 Claims, 52 Drawing Sheets

(56) References Cited

U.S. PATENT DOCUMENTS

2011/0091761 A1* 4/2011 Miller ................ H01M 50/411
429/143
2012/0070747 A1* 3/2012 Whear ............... H01M 50/463
429/247

* cited by examiner

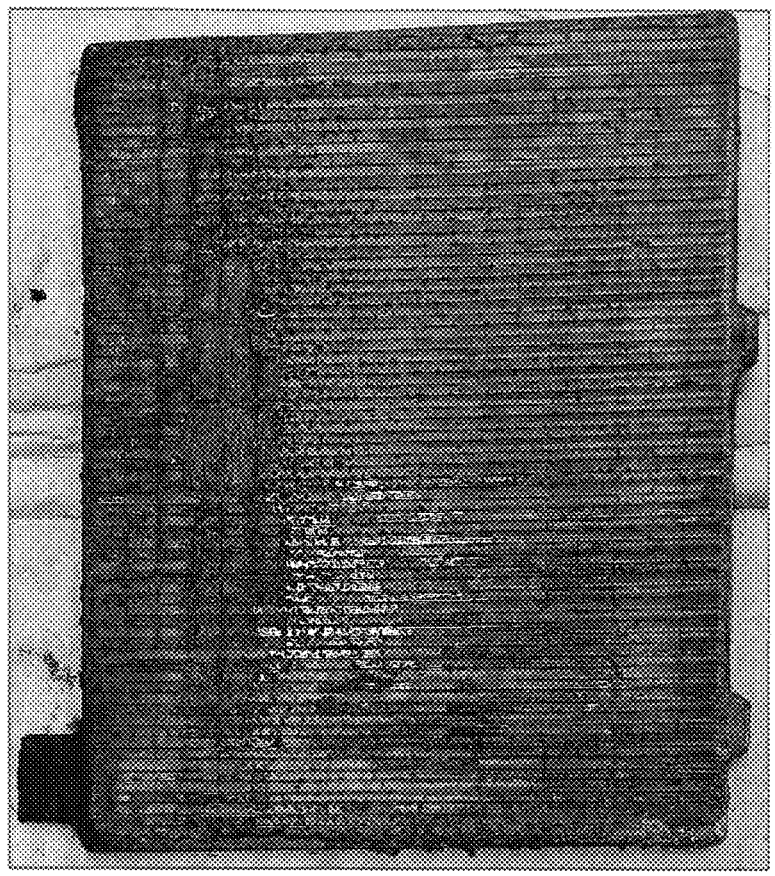
*FIG. 14B* — Control Separator Battery Negative Plate
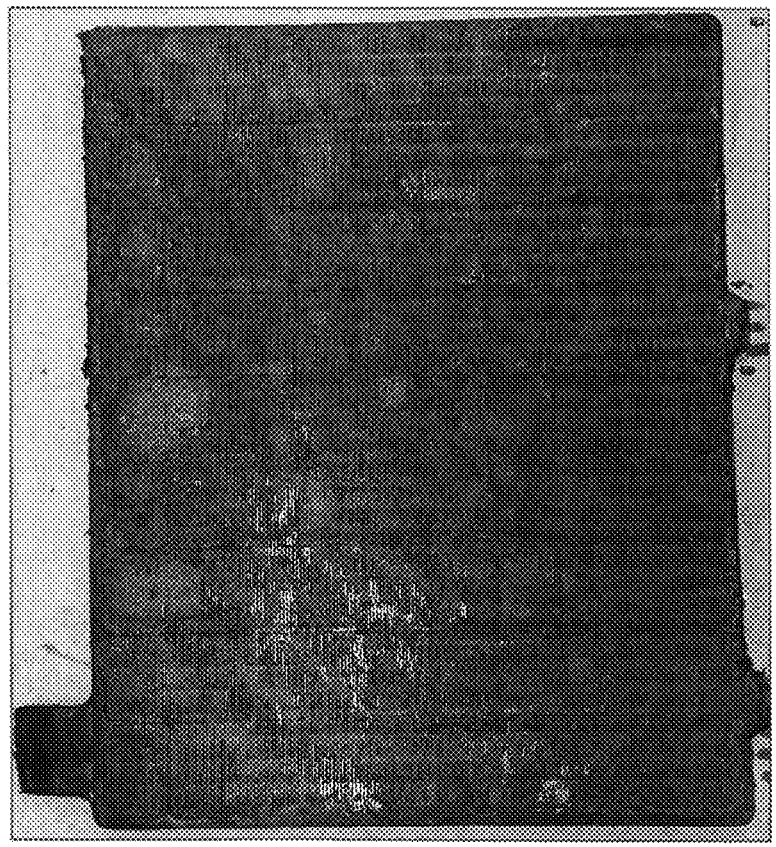
*FIG. 14A* — Hybrid Separator Battery Negative Plate

SEPARATORS FOR FLAT PLATE BATTERIES, IMPROVED BATTERIES, AND RELATED METHODS

CROSS-REFERENCE TO RELATED APPLICATIONS

This application is a Divisional of U.S. application Ser. No. 15/235,197, filed Aug. 12, 2016, which claims priority to and benefit of both U.S. Provisional Patent Application Ser. No. 62/204,693, filed on Aug. 13, 2015, and PCT Application No. PCT/US2015/045060, filed on Aug. 13, 2015. The entire contents of both applications are herein incorporated by reference.

FIELD

In accordance with at least selected embodiments, the present disclosure is directed to novel or improved separators, battery separators, flat-plate separators, batteries, cells, and/or methods of manufacture and/or use of such separators, battery separators, flat-plate separators, cells, and/or batteries, or combinations thereof. In accordance with at least certain embodiments, the present disclosure is directed to novel or improved lead acid battery separators for flat-plate cycling batteries, flat-plate deep cycling batteries, flat-plate inverter batteries, flat-plate UPS batteries, flat-plate home UPS batteries, flat-plate long cycle life batteries, deep cycle stationary, traction, inverter, fork lift batteries, flooded batteries, UPS, ESS, BESS, flat-plate cells, improved methods of making, using such improved separators, cells, batteries, systems, or combinations thereof. In accordance with at least certain embodiments, the present disclosure is directed to an improved separator for flat-plate stationary batteries, improved methods of using such batteries having such improved separators, or a combination thereof. In addition, disclosed herein are methods, systems, and battery separators for enhancing battery life, reducing water loss, improving uniformity in at least flat-plate stationary batteries, or combinations thereof. In accordance with at least particular embodiments, the present disclosure is directed to an improved separator for flat-plate batteries wherein the separator includes performance enhancing additives or coatings, hybrid envelopes, cross rib shapes or profiles, or combinations thereof.

BACKGROUND

One type of lead acid flooded or VLA battery is known as a flat plate or flat-plate deep cycle battery (or more simply, a "flat-plate battery"). These batteries are often employed in high-temperature and partial charge applications, such as found in inverters, photo-voltaic systems, and the like. When used for deep cycling applications, flat-plate stationary batteries tend to remain under charged or in a partial state of charge. Accordingly, the battery's efficiency and/or charge time diminishes over the life of the battery. Under such operating conditions, the battery plates deteriorate due to sulphation (or sulfation), and the battery life ends prematurely. Furthermore, under the typical float charging voltage, for instance, about 13.8V to 14.4V, flat-plate deep cycle batteries do not fully recover after a deep discharge. However, simply increasing the float charging voltage is not a general solution, because higher voltages accelerate the corrosion of the grid and may reduce cycle life.

In deep cycling applications such as inverter batteries, the key requirements include better re-chargeability, improved backup time, as well as lower water loss to reduce maintenance needs. However, improvement of one criteria can be accompanied by a corresponding deleterious effect to another aspect of battery performance. For example, while it is possible to reduce the water loss in a battery with certain coatings, battery charge acceptance is usually compromised by the coating process.

In some instances, such as in U.S. Pat. No. 6,703,161 owned by Daramic, LLC of Charlotte, N.C., which is incorporated by reference herein in its entirety, there have been disclosed battery separators for lead acid storage batteries that are, for instance, multi-layer battery separators.

There is a need for at least certain applications or batteries for an improved separator that overcomes the aforementioned problems, for deep cycle batteries having improved re-chargeability under float charging conditions, or for deep cycle batteries having reduced rates of water loss and grid corrosion.

SUMMARY

In accordance with at least selected embodiments, the present disclosure may address the above issues or needs. In accordance with at least certain objects, the present disclosure may provide an improved separator that overcomes the aforementioned problems, deep cycle batteries having improved re-chargeability under float charging conditions, deep cycle batteries having reduced rates of water loss and grid corrosion, or combinations thereof.

In accordance with at least selected embodiments, the present disclosure may address the above issues or needs and may provide novel or improved separators, battery separators, flat-plate separators, batteries, cells; methods of manufacture or use of such separators, battery separators, flat-plate separators, cells, batteries, or combinations thereof. In accordance with at least certain embodiments, the present disclosure is directed to novel or improved lead acid battery separators for flat-plate cycling batteries, flat-plate deep cycling batteries, flat-plate inverter batteries, flat-plate UPS batteries, flat-plate home UPS batteries, flat-plate long cycle life batteries, deep cycle stationary, traction, inverter, or fork lift batteries, flooded batteries, UPS, ESS, BESS, fork truck, pallet jack, golf car, or scissor lift batteries, flat-plate cells, improved methods of making or using such improved separators, cells, batteries, systems, or combinations thereof. In accordance with at least certain embodiments, the present disclosure is directed to an improved separator for flat-plate stationary batteries, and improved methods of using such batteries having such improved separators. In addition, disclosed herein are methods, systems and battery separators for enhancing battery life, reducing water loss, improving uniformity in at least flat-plate stationary batteries, or combinations thereof. In accordance with at least particular embodiments, the present disclosure is directed to an improved separator for flat-plate batteries wherein the separator includes performance enhancing additives or coatings, hybrid envelopes, cross rib shapes or profiles, or combinations thereof.

Disclosed herein are novel or improved separators for lead acid batteries. The separators preferably include or contain performance enhancing additives, hybrid envelope shapes, ribbed surfaces, or combinations thereof.

In accordance with at least one embodiment, a separator in the shape of a hybrid envelope is provided. The separator can be a porous membrane, for instance a porous polyolefin such as polyethylene. The hybrid envelope can contain one or more openings or slits along the bottom edge. However, exemplary embodiments may not have the openings at a corner of the envelope.

A plurality of ribs may be disposed upon the outer face of the envelope that faces the positive electrode plate (the "positive face"). A plurality of ribs may be disposed upon the inner face of the envelope in a direction different than the ribs upon the outer face ("cross ribs"). The ribs of the inner and outer faces may be substantially perpendicular to each other. The ribs of the inner surface of the envelope that faces the negative electrode plate (the "negative face") may be mini-ribs or mini-cross ribs, which are smaller and more closely spaced than the positive or outer face ribs. While the ribs have been described as being on a certain face of the separator, it is appreciated that the ribs may also be on opposite faces than described hereinabove and that one or more glass mats may be added.

The separator may also contain a surfactant additive along with other additives or agents, residual oil, fillers, or combinations thereof.

One exemplary embodiment described herein provides a battery separator having a porous sheet with a folded bottom edge and joined lateral edges that form a pocket having an outer surface and an inner surface. The folded bottom edge has one or more openings or slits; both the outer and inner surfaces of the sheet have ribs; and the outer and inner ribs may not extend in the same direction. The separator may also be provided with at least one surfactant, which may be a non-ionic surfactant. Such a non-ionic surfactant may have one or more of the following: polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters, or sucrose esters of fatty acids. The outer ribs may also run parallel to the lateral edges and the inner ribs may run perpendicular to the lateral edges, and the outer ribs may be larger than the inner ribs.

Yet another exemplary embodiment disclosed herein provides a battery separator having a porous sheet with a folded bottom edge and joined lateral edges which form a pocket having an outer surface and an inner surface. Both the outer and inner surfaces of the sheet may have ribs. The outer and inner ribs may not extend in the same direction. The separator may alternatively be provided with at least one surfactant. The separator may also be provided with the folded bottom edge (or close to the bottom edge) having one or more openings or slits. The slits may be positioned such that they do not extend to the joined lateral edges, not in the corners, or the like. Although a pocket or envelope may be preferred, a sleeve with one or more welded portions at the bottom may be used.

The present disclosure may further provide another exemplary embodiment that provides a battery separator having a porous sheet provided with a folded bottom edge and joined lateral edges which form a pocket having an outer surface and an inner surface. The folded bottom edge may have one or more openings or slits, and the separator may contain at least one surfactant. The battery separator may also be provided with both of the outer and inner surfaces of the sheet having ribs, with the outer and inner ribs not extending in the same direction.

Novel or improved separators, battery separators, flat plate separators, batteries, cells, and/or methods of manufacture and/or use of such separators, battery separators, flat plate separators, cells, and/or batteries, novel or improved lead acid battery separators for flat plate cycling batteries, flat plate deep cycling batteries, flat plate inverter batteries, flat plate UPS batteries, flat plate home UPS batteries, flat plate long cycle life batteries, deep cycle stationary, traction, inverter, or fork lift batteries, flooded batteries, UPS, ESS, BESS, flat plate cells, and/or improved methods of making and/or using such improved separators, cells, batteries, systems, and/or the like, an improved separator for flat plate stationary batteries and/or improved methods of using such batteries having such improved separators, methods, systems and battery separators for enhancing battery life, reducing water loss, and/or improving uniformity in at least flat plate stationary batteries, an improved separator for flat plate batteries wherein the separator includes performance enhancing additives or coatings, hybrid envelopes, and/or cross rib shapes or profiles, and/or the like as shown or described herein.

Another exemplary embodiment described herein may be a battery provided with a battery separator as generally described herein. The battery may alternatively be either of a flooded lead-acid battery or a flat-plate lead-acid battery.

BRIEF DESCRIPTION OF THE FIGURES

Exemplary embodiments of the present disclosure are illustrated in the following illustrations.

FIGS. 12A and 12B represent the discharge duration as a percentage of initial backup time of a flat-plate inverter battery over the course 84 cycles while discharging at 400 W to 10.50 V; charging up to 14.40 V at 15 A; continuing to charge at 14.40 V for 3 hours; and continuing to charge at 13.8 V for 1 hour. FIGS. 12C and 12D represent the discharge duration as a percentage of initial backup time of a flat-plate inverter battery over the course 168 cycles while discharging at 43 A to 10.50 V; charging at 13.90 V for 10 hours, with a maximum current limit of 15 A. All of the batteries are provided with samples of a control separator, and a hybrid separator.

FIG. 14A is a photographic representation of a battery negative plate of a hybrid separator after approximately 250 charge and discharge cycles. FIG. 14B is a photographic representation of a battery negative plate of a conventional control separator after approximately 250 charge and discharge cycles.

DETAILED DESCRIPTION

Figures 1A, 1B:
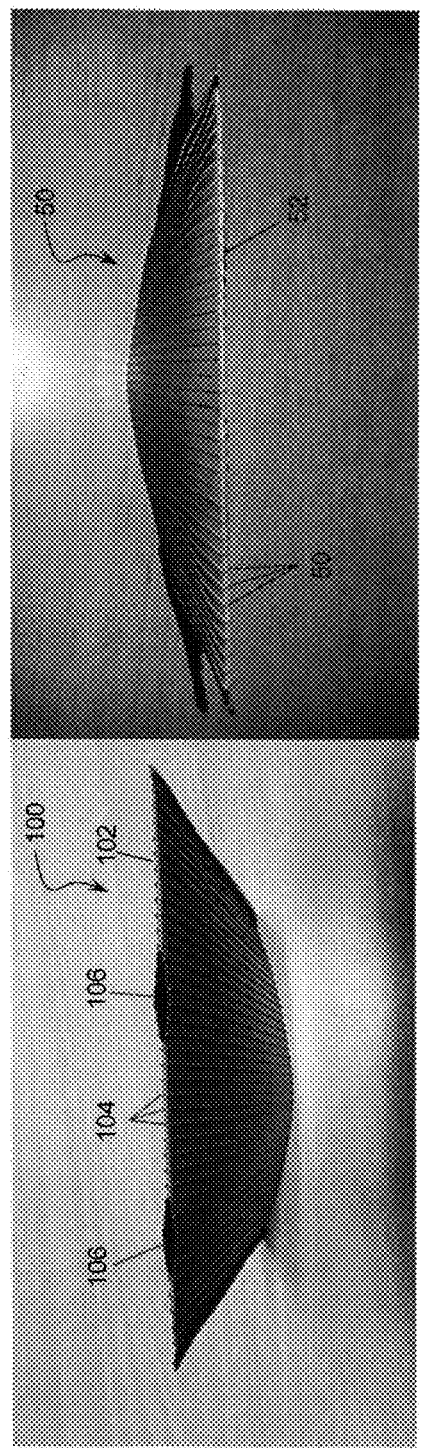
FIG. 1A is a photographic representation of a hybrid envelope separator embodiment of the present invention.
FIG. 1B is a photographic representation of a more conventional style envelope separator.

In accordance with at least selected embodiments, the present disclosure is directed to novel or improved separators, battery separators, flat-plate separators, batteries, cells, and/or methods of manufacture and/or use of such separators, battery separators, flat-plate separators, cells, and/or batteries, or combinations thereof. In accordance with at least certain embodiments, the present disclosure is directed to novel or improved lead acid battery separators for flat-plate cycling batteries, flat-plate deep cycling batteries, flat-plate inverter batteries, flat-plate UPS batteries, flat-plate home UPS batteries, flat-plate long cycle life batteries, deep cycle stationary, traction, inverter, fork lift batteries, flooded batteries, UPS, ESS, BESS, flat-plate cells, improved methods of making, using such improved separators, cells, batteries, systems, or combinations thereof. In accordance with at least certain embodiments, the present disclosure is directed to an improved separator for flat-plate stationary batteries, improved methods of using such batteries having such improved separators, or a combination thereof. In addition, disclosed herein are methods, systems, and battery separators for enhancing battery life, reducing water loss, improving uniformity in at least flat-plate stationary batteries, or combinations thereof. In accordance with at least particular embodiments, the present disclosure is directed to an improved separator for flat-plate batteries wherein the separator includes performance enhancing additives or coatings, hybrid envelopes, cross rib shapes or profiles, or combinations thereof.

In accordance with at least selected embodiments, the inventive separator is preferably a porous membrane (such as a microporous membrane having pores less than about 1 µm, mesoporous, or a macroporous membrane having pores greater than about 1 µm) made of natural or synthetic materials, such as polyolefin, polyethylene, polypropylene, phenolic resin, PVC, rubber, synthetic wood pulp (SWP), glass fibers, cellulosic fibers, or combinations thereof, more preferably a microporous membrane made from thermoplastic polymers. The preferred microporous membranes may have pore diameters of about 0.1 µm (100 nm) and porosities of about 60%. The thermoplastic polymers may, in principle, include all acid-resistant thermoplastic materials suitable for use in lead acid batteries. The preferred thermoplastic polymers include polyvinyls and polyolefins. The polyvinyls include, for example, polyvinyl chloride (PVC). The polyolefins include, for example, polyethylene, ultra-high molecular weight polyethylene (UHMWPE), and polypropylene. One preferred embodiment may include a mixture of filler (for example, silica) and UHMWPE. In general, the preferred separator may be made by mixing, in an extruder, about 30% by weight silica with about 10% by weight UHMWPE, and about 60% processing oil. The mixture may also include minor amounts of other additives or agents as is common in the separator arts (such as wetting agents, colorants, antistatic additives, similar materials, or combinations thereof) and is extruded into the shape of a flat sheet.

One such additive that may be present in the separator is a surfactant. Suitable surfactants include surfactants such as salts of alkyl sulfates; alkylarylsulfonate salts; alkylphenolalkylene oxide addition products; soaps; alkyl-naphthalenesulfonate salts; dialkyl esters of sulfo-succinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

The battery separators can be provided in various ways with the additives, agents, fillers. The additives can be, for example, applied to the separator when it is finished (e.g., after the extraction), or added to the mixture used to produce the separator, or a combination thereof. According to a preferred embodiment, the additive or a solution of the additive is applied to the surface of the separator. This variant is suitable in particular for the application of non-thermostable additives and additives which are soluble in the solvent used for the subsequent extraction. Particularly suitable as solvents for the additives according to exemplary embodiments are low-molecular-weight alcohols, such as methanol and ethanol, as well as mixtures of these alcohols with water. The application can take place on the side facing the negative electrode, the side facing the positive electrode, or on both sides of the separator.

The additive can be present at a density of at least 0.5 g/m$^2$, 1.0 g/m$^2$, 1.5 g/m$^2$, 2.0 g/m$^2$, 2.5 g/m$^2$, 3.0 g/m$^2$, 3.5 g/m$^2$, 4.0 g/m$^2$, 4.5 g/m$^2$, 5.0 g/m$^2$, 5.5 g/m$^2$, 6.0 g/m$^2$, 6.5 g/m$^2$, 7.0 g/m$^2$, 7.5 g/m$^2$, 8.0 g/m$^2$, 8.5 g/m$^2$, 9.0 g/m$^2$, 9.5 g/m$^2$, or 10.0 g/m$^2$. The additive can be present on the separator at a density between 0.5-10 g/m$^2$, 1.0-10.0 g/m$^2$, 1.5-10.0 g/m$^2$, 2.0-10.0 g/m$^2$, 2.5-10.0 g/m$^2$, 3.0-10.0 g/m$^2$, 3.5-10.0 g/m$^2$, 4.0-10.0 g/m$^2$, 4.5-10.0 g/m$^2$, 5.0-10.0 g/m$^2$, 5.5-10.0 g/m$^2$, 6.0-10.0 g/m$^2$, 6.5-10.0 g/m$^2$, 7.0-10.0 g/m$^2$, 7.5-10.0 g/m$^2$, 5.0-10.5 g/m$^2$, 5.0-11.0 g/m$^2$, 5.0-12.0 g/m$^2$, or 5.0-15.0 g/m$^2$.

The application may also take place by dipping the battery separator in the additive or a solution of the additive and subsequently optionally removing the solvent (e.g., by drying). In this way the application of the additive can be combined with, for example, the extraction often utilized during separator production.

Another preferred option is to mix the additive or additives into the mixture of thermoplastic polymer and optionally fillers and other additives which are used to produce the battery separators. The additive-containing homogeneous mixture is then formed into a web-shaped material.

In accordance with at least another object of the present disclosure, there is provided a battery separator with ribs. Longitudinally-oriented ribs ("positive ribs," or "longitudinal ribs") (see ribs 104 in FIG. 1B) may be disposed on one face of the separator, such as the surface that faces a positive electrode, or on both faces (such as large positive ribs and smaller negative ribs). Transverse cross ribs ("transverse ribs," "cross ribs," "negative ribs," or "negative cross ribs") may be disposed on the opposite face of the separator as the longitudinal ribs, such as the surface that faces a negative electrode.

In some exemplary embodiments, the ribbed separator may have a transverse rib height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. The ribbed separator can have a transverse rib height between 0.005-1.0 mm, 0.01-0.5 mm, 0.025-0.5 mm, 0.05-0.5 mm, 0.075-0.5 mm, 0.1-0.5 mm, 0.2-0.4 mm, 0.3-0.5 mm, or 0.4-0.5 mm.

In some exemplary embodiments, the ribbed separator can have longitudinal rib (see ribs 104 in FIG. 1B) height of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, or 1.5 mm. The ribbed separator can have a transverse rib height between 0.005-1.5 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.5-1.0 mm, 0.4-0.8 mm, or 0.4-0.6 mm.

In some exemplary embodiments, the ribbed separator can have a sheet ("substrate" or "backweb") thickness of at least 0.005 mm, 0.01 mm, 0.025 mm, 0.05 mm, 0.075 mm, 0.1 mm, 0.2 mm, 0.3 mm, 0.4 mm, 0.5 mm, 0.6 mm, 0.7 mm, 0.8 mm, 0.9 mm, or 1.0 mm. The ribbed separator can have a sheet (substrate) thickness between 0.005-1.0 mm, 0.01-1.0 mm, 0.025-1.0 mm, 0.05-1.0 mm, 0.075-1.0 mm, 0.1-1.0 mm, 0.2-1.0 mm, 0.3-1.0 mm, 0.4-1.0 mm, 0.4-0.9 mm, 0.4-0.8 mm, 0.5-0.8 mm, or 0.6-0.8 mm.

In some exemplary embodiments, the ribbed separator can have overall thickness (i.e., longitudinal rib height+backweb thickness+transverse rib height) of at least 0.05 mm, 0.1 mm, 0.25 mm, 0.5 mm, 0.75 mm, 1.0 mm, 1.5 mm, 2.0 mm, 2.5 mm, 3.0 mm, 3.5 mm, 4.0 mm, 4.5 mm, 5.0 mm, or 6.0 mm. The ribbed separator can have an overall thickness between 0.05-5.0 mm, 0.1-5.0 mm, 0.2-5.0 mm, 0.5-5.0 mm, 1.0-5.0 mm, or 1.0-4.0 mm.

With regard to at least selected embodiments of the present disclosure, the ribbed separator can have the following: 1) Transverse Rib Height—preferably between about 0.02-0.45 mm, and most preferably between about 0.075-0.3 mm; 2) Sheet Thickness—preferably between about 0.065-0.75 mm; 3) Overall Thickness—preferably between about 0.10-6.0 mm, and most preferably between about 0.20-4.0 mm.

In accordance with at least one embodiment, the separator is made up of an ultra-high molecular weight polyethylene (UHMWPE) mixed with a processing oil plus additive and precipitated silica. In accordance with at least one other embodiment, the separator is made up of an ultra-high molecular weight polyethylene (UHMWPE) mixed with a processing oil and precipitated silica. The additive can then be applied to the separator via one or more of the techniques described above. In accordance with at least one particular embodiment, the negative cross ribs are rounded mini-ribs and preferably have a 0.05-0.15 mm radius and a 0.25-1.3 mm rib spacing.

In accordance with at least selected embodiments, the battery separator includes a porous membrane having a backweb and at least two rows of positive ribs on the positive side of the backweb, and a plurality of negative cross ribs or transverse ribs on the negative side of the backweb. The positive ribs may be straight or wavy, may have a solid portion, may have a truncated pyramidal shape, or combinations thereof. The membrane may be selected from the group of polyolefin, rubber, polyvinyl chloride, phenolic, cellulosic, or combinations thereof, and the membrane is preferably a polyolefin material forming a battery separator for a storage battery.

In at least one embodiment, the separator is made of a microporous, thermoplastic material which is provided with longitudinal positive ribs and transverse negative ribs with the height of at least a majority of the longitudinal ribs being greater than that of the transverse ribs, and the longitudinal and transverse ribs being solid ribs which are formed integrally from the plastic, characterized in that the transverse ribs extend across substantially the entire back width of the separator. The separator backweb or sheet thickness may be approximately 0.10-0.50 mm, the height of the longitudinal ribs may be 0.3-2.0 mm and the height of the transverse ribs may be 0.1-0.7 mm, the longitudinal rigidity with 100 mm width may be approximately 5 mJ and the transverse rigidity may be approximately 2.5 mJ, and the total thickness of the separator may be less than 3.5 mm, preferably less than 2.5 mm.

The separators can be processed to form hybrid envelopes. The hybrid envelope can be formed by forming one or more slits or openings before, during or after, folding the separator sheet in half and bonding edges of the separator sheet together so as to form an envelope. The sides are bonded together using welds or mechanical seals to form seams that bring one side of the separator sheet into contact with another side of the separator sheet. Welds can be accomplished, for instance, using heat or ultrasonic processes. This process results in an envelope shape or pocket having a bottom folded edge and two lateral edges. Although hybrid envelopes are preferred, the separators can be processed to form sheets, leaves, sleeves, modified sleeves, pockets, or envelopes, or composites with one or more glass mats.

Referring now to FIGS. 1A and 1B, an embodiment of a hybrid separator envelope is compared to a typical separator envelope. In FIG. 1A, an exemplary hybrid envelop 100 according to the present disclosure is shown with a bottom crease 102, a series of ribs 104 on an outer surface, and one or more openings or slits 106 at the bottom crease or fold 102. In FIG. 1B a more conventional separator envelope 50 is depicted having a bottom crease 52 and a series of ribs 54 on an outer surface.

Figure 1D:
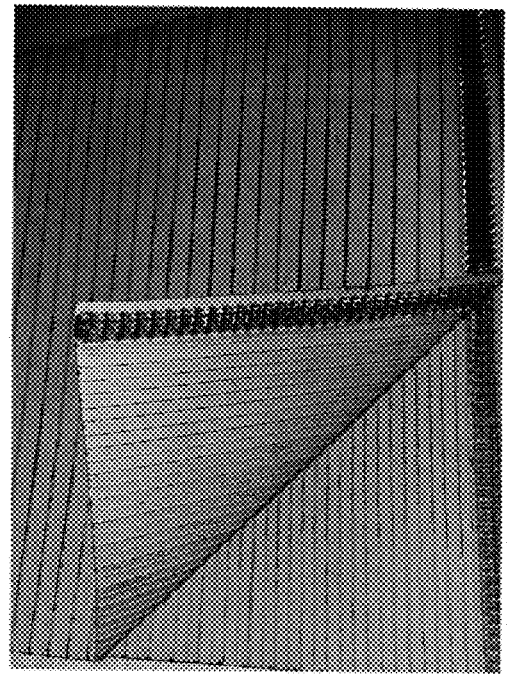
FIG. 1D is a photographic representation of a separator with mini ribs on the negative plate facing surface.
Figure 1C:
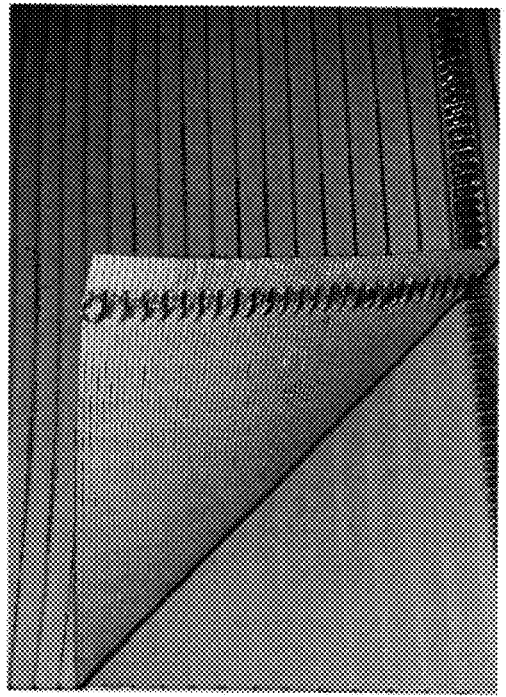
FIG. 1C is a photographic representation of a separator with cross ribs on the negative plate facing surface.

Separators can be made from polyethylene and can contain V-shaped mini-ribs disposed on the negative face of the separator envelope. These ribs are believed to facilitate release of generated gases in the electrolyte by creating channels by which the gas can escape. FIG. 1C depicts a mini-rib profile that extends in the transverse or horizontal direction on the negative face. This configuration is referred herein as a "cross-negative rib profile" or an "X-profile." Where "transverse or horizontal" refers to the fact that the mini-ribs are generally perpendicular to the main ribs that are disposed on the positive face. FIG. 1D depicts a mini-rib profile that extends in vertical direction on the negative face. This configuration is referred herein as a "V-profile." Where "vertical" refers to the fact that the mini-ribs are generally parallel to the main ribs that are disposed on the positive face. In addition, FIGS. 1C and 1D depict a typical joined lateral vertical edge of a separator envelope, where the joint is formed by a crimping operation. However, other known means or methods are also acceptable.

Openings can be created in a bottom or lateral folded edge of the envelope using conventional means. The hybrid envelop can have one or more slits or openings. The length of the openings may be at least 1/50, 1/25, 1/20, 1/15, 1/10, 1/8, 1/5, 1/4, or 1/3 the length of the entire edge. The length of the openings can be 1/50 to 1/3, 1/25 to 1/3, 1/20 to 1/3, 1/20 to 1/4, 1/15 to 1/4, 1/15 to 1/5, or 1/10 to 1/5 the length of the entire edge. The hybrid envelope can have 1-5, 1-4, 2-4, 2-3, or 2 openings, which may or may not be equally disposed along the length of the bottom edge. An exemplary hybrid separator envelope 100 is depicted in FIG. 1A, as discussed hereinabove. It is preferred that no opening is in either the corner of the envelope. Without wishing to be bound by theory, it is believed the openings permit enhanced electrolyte flow between electrodes, while still catching debris released from plate.

In accordance with particular examples or embodiments, the total separator thickness may be in the range of 0.6-1.6 mm, and preferably 0.8-1.3 mm; the backweb thickness may be in the range of 250-500 µm, and preferably between 300-400 µm; the additive may be a surfactant in aqueous solution (water soluble); the bottom slits may be at the base of the envelope; and the negative cross ribs may have a height of 100 µm, with a rib spacing of 0.66 mm. One particular exemplary embodiment may have a total separator thickness of 1.05 mm, having a base web thickness of 400 µm (with a backweb thickness of 300 µm and a negative cross rib height of 100 µm), and a coating of an aqueous surfactant additive.

Besides lowering water loss and leading to extended battery life, preferred separators are also designed to bring other benefits. With regard to assembly, the separators have the negative cross rib design to maximize bending stiffness and ensure highest productivity. To prevent shorts during high speed assembly and later in life, preferred separators have superior puncture and oxidation resistance when compared to standard PE separators. Combined with the lowest separator resistance, battery manufacturers are likely to find improved and sustained electrical performance in their batteries with embodiments of the present disclosure. The preferred embodiments have a micro-porous structure and can be fabricated into pockets or sleeves that give added protection against side and bottom shorts.

Beside the need for lower water loss, improved resistance to detrimental elements, we believe there is another glaring need primarily found in Asia. In countries where deficits exist between power generation and demand, inverter batteries meet the consumer's need. In such cases, the lead acid battery has filled the need well and will likely continue to do so. The inverter batteries may be discharged for up to 8 to 16 hours a day and may only receive an occasional charge. In service these inverter batteries may never get fully recharged and may ultimately fail simply due to under charging. These batteries are often returned to the dealer during the warranty period, receive a vigorous recharge and continue on in serviceable life. With this challenging situation in mind, any actions that can improve the charge acceptance or capacity of the battery will provide longer serviceable life.

With the needs of the inverter application in mind, we cycled batteries having a variety of separators in the following manner. The batteries were fully discharged and then recharged at a constant voltage ranging from about 13.9-14.4 V (for a 12 volt battery) with a limit current of around 10% of the battery capacity. With such a regime, we hope to recharge the batteries without going into an overcharge situation where vigorous gassing was possible. With no gassing, we realized that the batteries were more likely to see sustained acid stratification and would in the long-term impact the capacity. With such a test regime, we hoped to mimic the real life situations where the batteries struggle to be fully recharged.

With such a test, our goal is to influence battery performance with varied separator designs. As a control, we used separators that were negative wrapped sleeves, standard design positive rib profile and 0.6 mm glass-mat. This is a basic configuration currently being used for inverter batteries. To verify the theory of preventing acid stratification, we simply employed separators with the cross or horizontal rib profile, facing the negative plate.

With the different separators, these batteries were cycled and quickly the negative cross rib is yielding 15% capacity and this difference is sustained with cycling. In previous conferences, we have proposed that the cross rib will break up the boundary layer of concentrated acid that is formed at the plate surface during recharge. Once this boundary layer of acid forms, the heavy acid will collect in the bottom of the cell and distort the charge acceptance. The acid has potential of being mixed during overcharge, when heavy gassing is occurring. However in the inverter application, heavy overcharge is not likely. From the previous chart, batteries utilizing the negative cross rib separator consistently outperformed batteries using separators with standard rib profile. This negative cross rib design, can be included in the preferred product used for dry or wet charge and inverter batteries.

The microporous polymer layer is preferably made of a polyolefin, such as polypropylene, ethylene-butene copolymer, and preferably polyethylene, more preferably high molecular weight polyethylene, i.e. polyethylene having a molecular weight of at least 600,000, even more preferably ultra-high molecular weight polyethylene, i.e. polyethylene having a molecular weight of at least 1,000,000, in particular more than 4,000,000, and most preferably 5,000,000 to 8,000,000 (measured by viscosimetry and calculated by Margolie's equation), a standard load melt index of substantially zero (0) (measured as specified in ASTM D 1238 (Condition E) using a standard load of 2,160 g) and a viscosity number of not less than 600 ml/g, preferably not less than 1,000 ml/g, more preferably not less than 2,000 ml/g, and most preferably not less than 3,000 ml/g (determined in a solution of 0.02 g of polyolefin in 100 g of decalin at 130° C.).

In accordance with at least one embodiment, the separator is made up of an ultra-high molecular weight polyethylene (UHMWPE) mixed with a processing oil and precipitated silica. In accordance with at least one other embodiment, the separator is made up of an ultra-high molecular weight polyethylene (UHMWPE) mixed with a processing oil, additive and precipitated silica. The microporous polymer layer preferably comprises a homogeneous mixture of 8-100% by volume of polyolefin, 0-40% by volume of a plasticizer and 0-92% by volume of inert filler material. The preferred filler is dry, finely divided silica. The preferred plasticizer is petroleum oil. Since the plasticizer is the component that is easiest to remove from the polymer-filler-plasticizer composition, it is useful in imparting porosity to the battery separator.

The microporous polymer layer has an average pore size of less than 1 μm in diameter. Preferably more than 50% of the pores are 0.5 μm or less in diameter. It is especially preferred that at least 90% of the pores have a diameter of less than 0.5 μm. The microporous polymer layer preferably has an average pore size within the range of 0.05-0.5 μm, preferably 0.1-0.2 μm.

The thickness of the microporous polymer layer is preferably greater than 0.1 mm and less than or equal to 0.6 mm. Preferably, the thickness of the microporous polymer layer is within the range of 0.25 to 0.45 mm and most preferably is about 0.3 mm.

The microporous polyolefin may be provided with one or more additives. One such additive that may be present in the polyolefin is a surfactant. Suitable surfactants include surfactants such as salts of alkyl sulfates; alkylarylsulfonate salts; alkylphenol-alkylene oxide addition products; soaps; alkyl-naphthalene-sulfonate salts; dialkyl esters of sulfosuccinate salts; quaternary amines; block copolymers of ethylene oxide and propylene oxide; and salts of mono and dialkyl phosphate esters. The additive can be a non-ionic surfactant such as polyol fatty acid esters, polyethoxylated esters, polyethoxylated fatty alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters and sucrose esters of fatty acids.

In certain embodiments, the additive can be represented by a compound of Formula (I)

$$R(OR^1)_n(COOM^{x+}{}_{1/x})_m \qquad (I)$$

in which
R is a non-aromatic hydrocarbon radical with 10 to 4200 carbon atoms, preferably 13 to 4200, which can be interrupted by oxygen atoms;
$R^1$ is H, $-(CH_2)_k COOM^{x+}{}_{1/x}$ or $-(CH_2)_k-SO_3M^{x+}{}_{1/x}$, preferably H, where k=1 or 2; and
M is an alkali metal or alkaline-earth metal ion, $H^+$ or $NH_4^+$, where not all the variables M simultaneously have the meaning $H^+$;
n=0 or 1;
m=0 or an integer from 10 to 1400; and
x=1 or 2;
with the ratio of oxygen atoms to carbon atoms in the compound according to Formula (I) being in the range from 1:1.5 to 1:30 and m and n not being able to simultaneously be 0. However, preferably only one of the variables n and m is not equal to 0.

By non-aromatic hydrocarbon radicals is meant radicals that contain no aromatic groups or which themselves represent one. The hydrocarbon radicals can be interrupted by oxygen atoms, i.e. contain one or more ether groups.

R is preferably a straight-chain or branched aliphatic hydrocarbon radical which can be interrupted by oxygen atoms. Saturated, uncross-linked hydrocarbon radicals are quite particularly preferred.

Surprisingly it was found that through the use of the compounds of Formula (I) for the production of battery separators, they can be effectively protected against oxidative destruction.

Battery separators are preferred which contain a compound according to Formula (I), in which
R is a hydrocarbon radical with 10 to 180, preferably 12 to 75 and quite particularly preferably 14 to 40 carbon atoms, that can be interrupted by 1 to 60, preferably 1 to 20 and quite particularly preferably 1 to 8 oxygen atoms, particularly preferably a hydrocarbon radical of formula R2-[(OC2H4)p(OC3H6)q]-, in which
R2 is an alkyl radical with 10 to 30 carbon atoms, preferably 12 to 25, particularly preferably 14 to 20 carbon atoms;
P is an integer from 0 to 30, preferably 0 to 10, particularly preferably 0 to 4;
q is an integer from 0 to 30, preferably 0 to 10, particularly preferably 0 to 4; and
compounds being particularly preferred in which the sum of p and q=0 to 10, in particular 0 to 4;
n=1; and
m=0.

Formula $R^2-[(OC_2H_4)_p(OC_3H_6)_q]-$ is to be understood as also including those compounds in which the sequence of the groups in square brackets differs from that shown. For example according to exemplary embodiments, compounds are suitable in which the radical in brackets is formed by alternating $(OC_2H_4)$ and $(OC_3H_6)$ groups.

Additives in which $R^2$ is a straight-chain or branched alkyl radical with 10 to 20, preferably 14 to 18 carbon atoms have proved to be particularly advantageous. $OC_2H_4$ preferably stands for $OCH_2CH_2$, $OC_3H_6$ for $OCH(CH_3)CH_2$ and/or $OCH_2CH(CH_3)$.

As preferred additives there may be mentioned in particular alcohols (p=q=0; m=0) primary alcohols being particularly preferred, fatty alcohol ethoxylates (p=1 to 4, q=0), fatty alcohol propoxylates (p=0; q=1 to 4) and fatty alcohol alkoxylates (p=1 to 2; q=1 to 4) ethoxylates of primary alcohols being preferred. The fatty alcohol alkoxylates are for example accessible through reaction of the corresponding alcohols with ethylene oxide or propylene oxide.

Additives of the type m=0 which are not, or only difficulty, soluble in water and sulphuric acid have proved to be particularly advantageous.

Also preferred are additives which contain a compound according to Formula (I), in which
- R is an alkane radical with 20 to 4200, preferably 50 to 750 and quite particularly preferably 80 to 225 carbon atoms;
- M is an alkali metal or alkaline-earth metal ion, H+ or NH4+, in particular an alkali metal ion such as Li+, Na+ and K+ or H+, where not all the variables M simultaneously have the meaning H+;
- n=0;
- m is an integer from 10 to 1400; and
- x=1 or 2.

As suitable additives there may be mentioned here in particular polyacrylic acids, polymethacrylic acids and acrylic acid-methacrylic acid copolymers, whose acid groups are at least partly, i.e. preferably 40%, particularly preferably 80%, neutralized. The percentage refers to the number of acid groups. Quite particularly preferred are poly(meth)acrylic acids that are present entirely in the salt form. By poly(meth)acrylic acids are meant polyacrylic acids, polymethacrylic acids and acrylic acid-methacrylic acid copolymers. Poly(meth)acrylic acids are preferred and in particular polyacrylic acids with an average molar mass Mw of 1,000 to 100,000 g/mol, particularly preferably 1,000 to 15,000 g/mol and quite particularly preferably 1,000 to 4,000 g/mol. The molecular weight of the poly(meth)acrylic acid polymers and copolymers is ascertained by measuring the viscosity of a 1% aqueous solution, neutralized with sodium hydroxide solution, of the polymer (Fikentscher's constant).

Also suitable are copolymers of (meth)acrylic acid, in particular copolymers that, besides (meth)acrylic acid contain ethylene, maleic acid, methyl acrylate, ethyl acrylate, butyl acrylate and/or ethylhexyl acrylate as comonomer. Copolymers are preferred that contain at least 40% by weight, preferably at least 80% by weight (meth)acrylic acid monomer, the percentages being based on the acid form of the monomers or polymers.

To neutralize the polyacrylic acid polymers and copolymers, alkali metal and alkaline-earth metal hydroxides such as potassium hydroxide and in particular sodium hydroxide are particularly suitable.

The microporous polyolefin can be provided in various ways with the additive or additives. The additives can for example be applied to the polyolefin when it is finished (i.e. after the extraction) or added to the mixture used to produce the polyolefin. According to a preferred embodiment the additive or a solution of the additive is applied to the surface of the polyolefin. This variant is suitable in particular for the application of non-thermostable additives and additives that are soluble in the solvent used for the subsequent extraction. Particularly suitable as solvents for the additives according to exemplary embodiments are low-molecular-weight alcohols, such as methanol and ethanol, as well as mixtures of these alcohols with water. The application can take place on the side facing the negative electrode, the side facing the positive electrode or on both sides of the separator.

The additive can be present at a density of at least 0.5 $g/m^2$, 1.0 $g/m^2$, 1.5 $g/m^2$, 2.0 $g/m^2$, 2.5 $g/m^2$, 3.0 $g/m^2$, 3.5 $g/m^2$, 4.0 $g/m^2$, 4.5 $g/m^2$, 5.0 $g/m^2$, 5.5 $g/m^2$, 6.0 $g/m^2$, 6.5 $g/m^2$, 7.0 $g/m^2$, 7.5 $g/m^2$, 8.0 $g/m^2$, 8.5 $g/m^2$, 9.0 $g/m^2$, 9.5 $g/m^2$, or 10.0 $g/m^2$. The additive can be present on the separator at a density between 0.5-10 $g/m^2$, 1.0-10.0 $g/m^2$, 1.5-10.0 $g/m^2$, 2.0-10.0 $g/m^2$, 2.5-10.0 $g/m^2$, 3.0-10.0 $g/m^2$, 3.5-10.0 $g/m^2$, 4.0-10.0 $g/m^2$, 4.5-10.0 $g/m^2$, 5.0-10.0 $g/m^2$, 5.5-10.0 $g/m^2$, 6.0-10.0 $g/m^2$, 6.5-10.0 $g/m^2$, 7.0-10.0 $g/m^2$, 7.5-10.0 $g/m^2$, 5.0-10.5 $g/m^2$, 5.0-11.0 $g/m^2$, 5.0-12.0 $g/m^2$, or 5.0-15.0 $g/m^2$.

The application may also take place by dipping the polyolefin in the additive or a solution of the additive and subsequently optionally removing the solvent, e.g. by drying. In this way the application of the additive can be combined for example with the extraction often applied during polyolefin production.

In certain embodiments of the present disclosure, the microporous polyolefin separator layer (either having the performance enhancing additive or not) comprises a plurality of acid filling channels or a network of acid filling channels. These acid filling channels are imparted to this microporous polyolefin layer by adding ribs to the layer and/or embossing the layer. When ribs are added to the layer, such ribs may be added to one side or both sides of the polyolefin layer. In some embodiments where ribs are added to both sides, one side may include negative cross-ribs. In some embodiments, the negative cross-ribs may be at an angle relative to the machine direction or transverse direction of the layer. In various embodiments, a pattern of ribs may be added to the layer, and such a pattern may include embattlements, serrations, interrupted ribs, and/or the like. The various patterns of ribs and/or embossed regions (sometimes potentially called calendered regions) include patterns that allow battery acid into the separator, quickly, while simultaneously allowing air to escape out of the separator. In some preferred embodiments, the acid filling channels (or air flow channels) allow air flow while at the same time the ribs or embossments forming the acid filling channels are not so large as to interfere with the separator's overall contact with the electrodes.

The separator may be a PE separator and can be a leaf or sheet, a U-fold, a sleeve, or a pocket or envelope, preferably a hybrid envelope.

Home uninterrupted power supply (UPS) and Inverter Batteries are market leaders in India—and will soon be available across the globe.

Flat-Plate Deep Cycle Battery:

Features:
- Extra thick plates ensure long life
- Special alloy used—very low maintenance
- Inter partition connection-good voltage profile on discharge
- Sleek appearance in sealed plastic housing
- Good charge acceptance—suitable for frequent power cuts
- Level indicators aid easy maintenance Application:

These batteries are best suitable for high ambient temperature and partial state of charge usage, they are used in various applications like domestic inverters, off grid solar photo voltaic system, home lighting systems, alarm systems, signaling equipment and remote telecom units.

The Key Advantages:
   Medium to very long service life-ranging from 2.5-4 years for Deep Cycle design and up to 7-10 years for Ultra-Deep Cycle design. Depending on depth of discharge, frequency of cycling and battery temperatures.
   Compact size with high specific energy. Accomplished by special design of plates containers and separators.
   Very low water topping up frequency. Special alloy plates cause LOW or NO water loss from battery.
Better Design: Better Performance
   Thick flat pasted plates with selenium grids and automated vapor; curing process generates suitable proportion of binding crystals in the plates
Preferred Result:
   Much longer cycle life that most of the flat-plate batteries in the world.
A cycle life of over 500-600 cycles under deep discharge conditions.
   Examples of embodiments, aspects and/or objects of the present disclosure include:
Total Separator Thickness:
   Range 0.6-2.25 mm, preferable 0.8-1.6 mm
Backweb Thickness:
   Range 250-600 µm, preferable 300-400 mm
   The preferred separators of the present disclosure are particularly useful for flat plate cycling batteries, effectively enhance the battery re-chargeability and the backup time, contribute to the reduction of water loss in the battery, lowering the maintenance needs in service, provide batteries especially useful in various applications, such as golf carts, inverters, solar and traction applications, and/or the like.

EXAMPLES

Figure 2A:
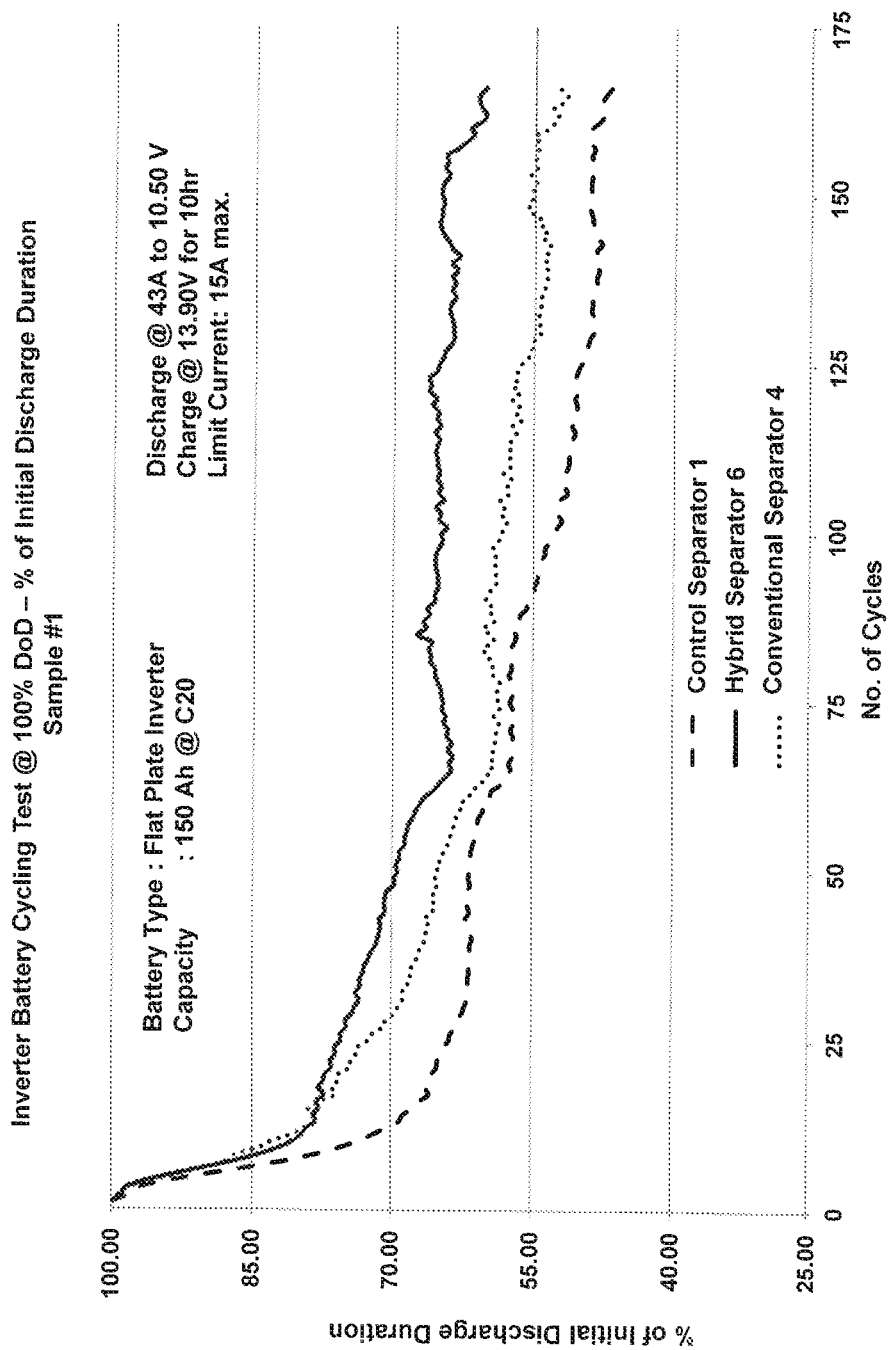
FIGS. 2A, 2B and 2C depict the discharge as a percentage of initial discharge over the course of 168 cycles while discharging at 43 A to 10.5 V and charging at 13.9 V for 10 hours for a flat-plate inverter battery having samples of a control separator, a conventional envelope separator with an X-profile negative rib pattern and an additive, and a hybrid separator (hybrid pocket) with an X-profile negative rib pattern and an additive.
Figure 2B:
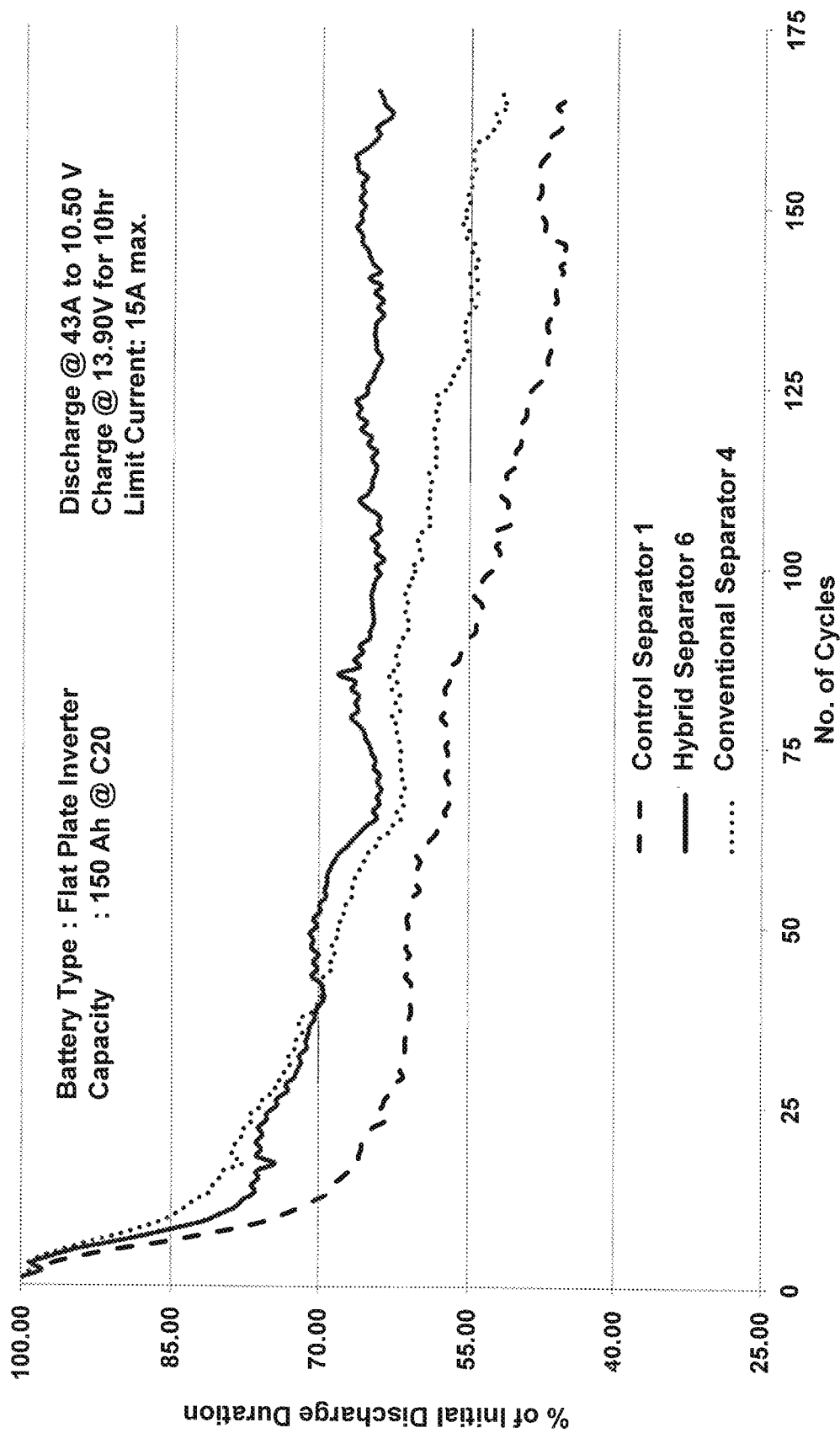
Figure 2C:
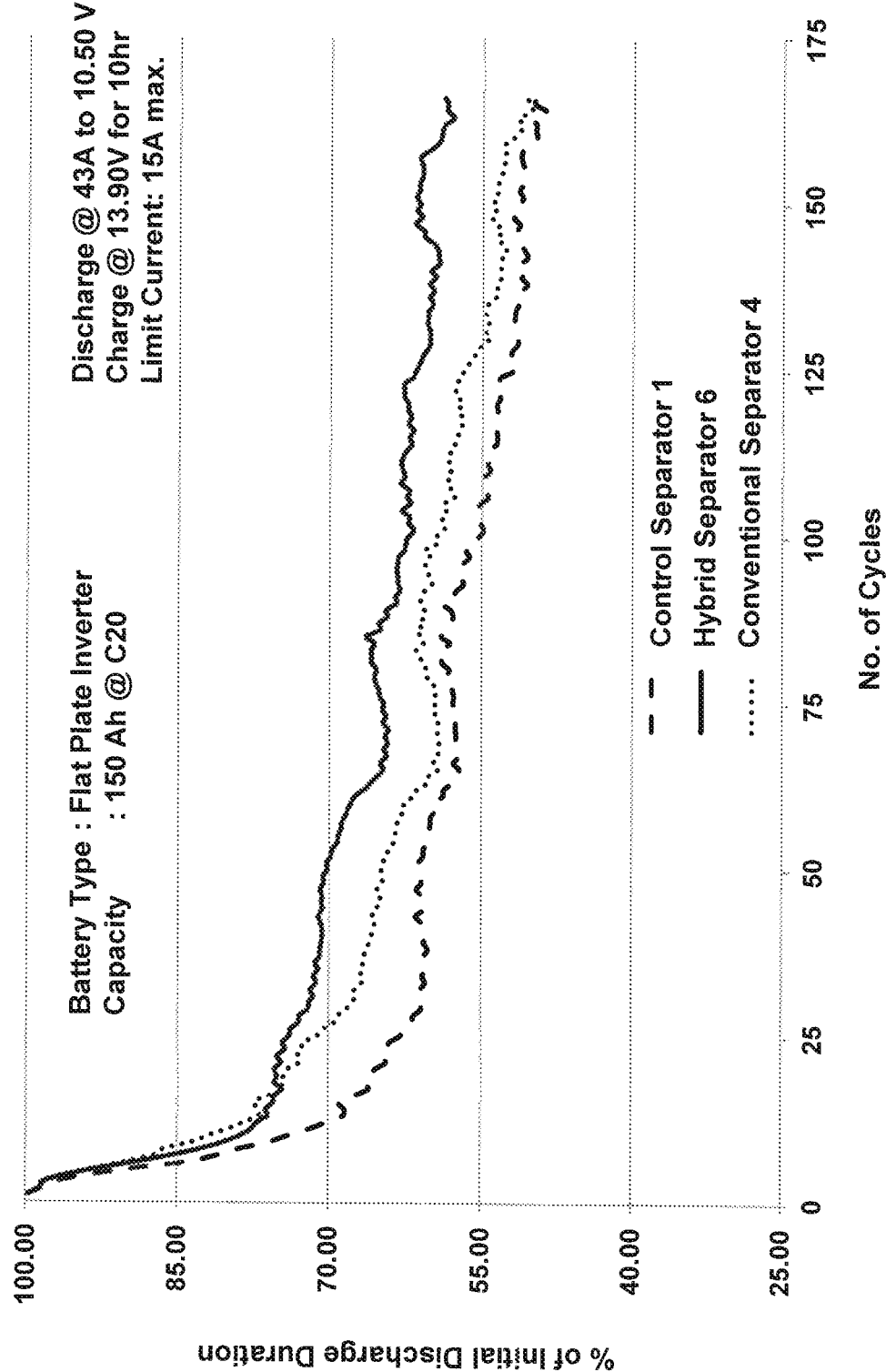
Figure 3A:
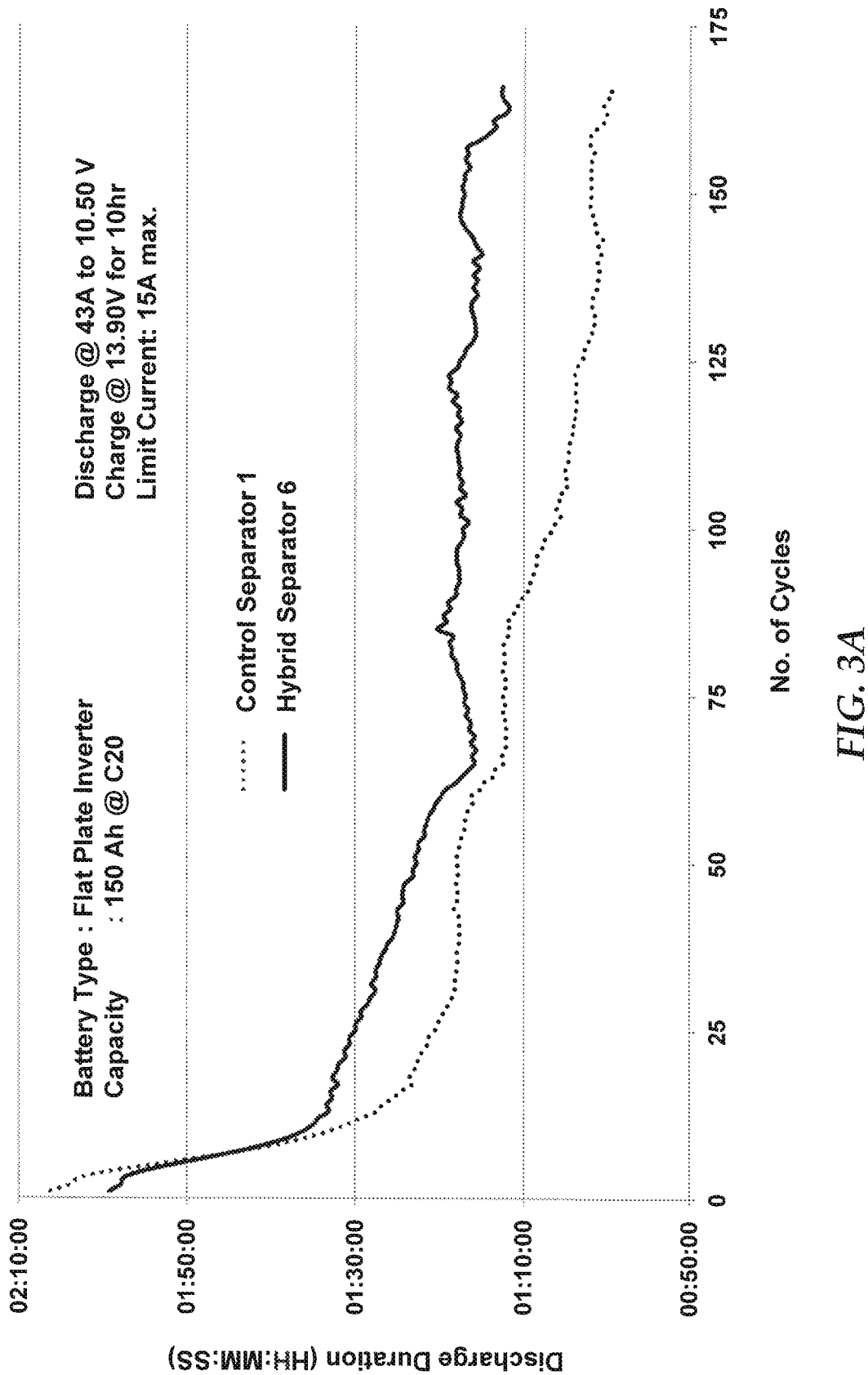
FIGS. 3A, 3B and 3C depict the discharge as a percentage of initial discharge over the course of 168 cycles while discharging at 43 A to 10.5 V and charging at 13.9 V for 10 hours for a flat-plate inverter battery having samples of a control separator, and a hybrid separator with an X-profile negative rib pattern and an additive.
Figure 3B:
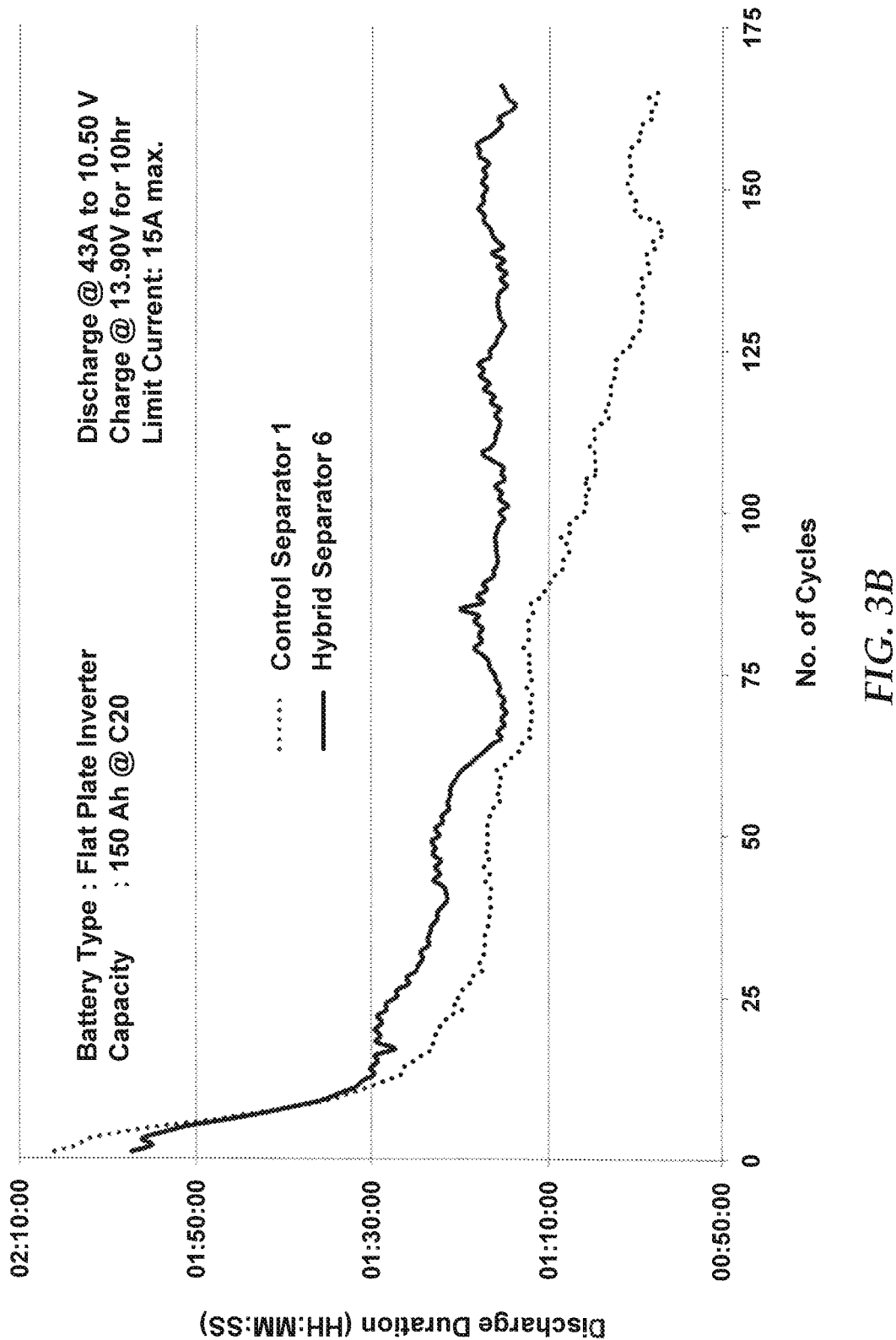
Figure 3C:
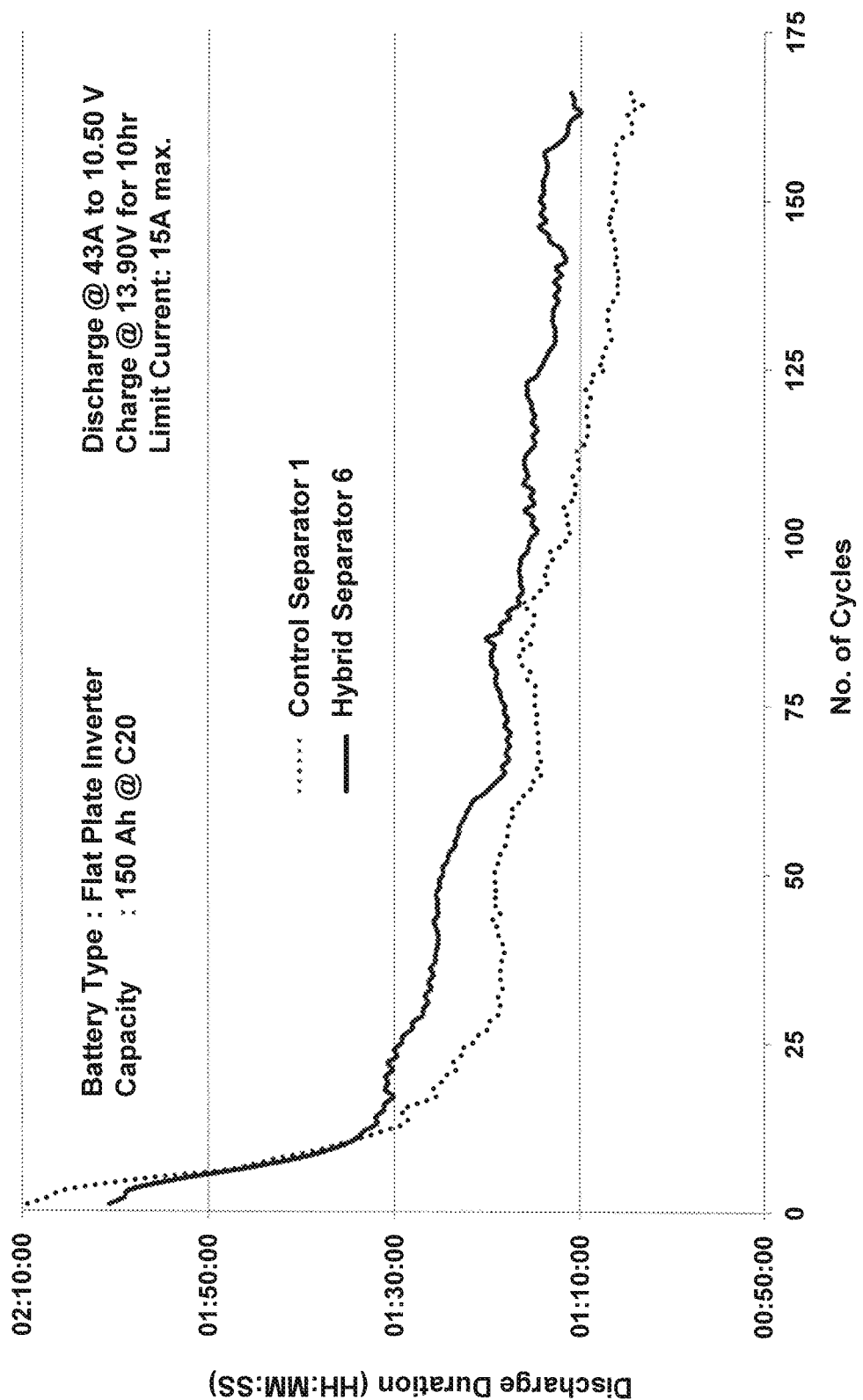
Figure 4A:
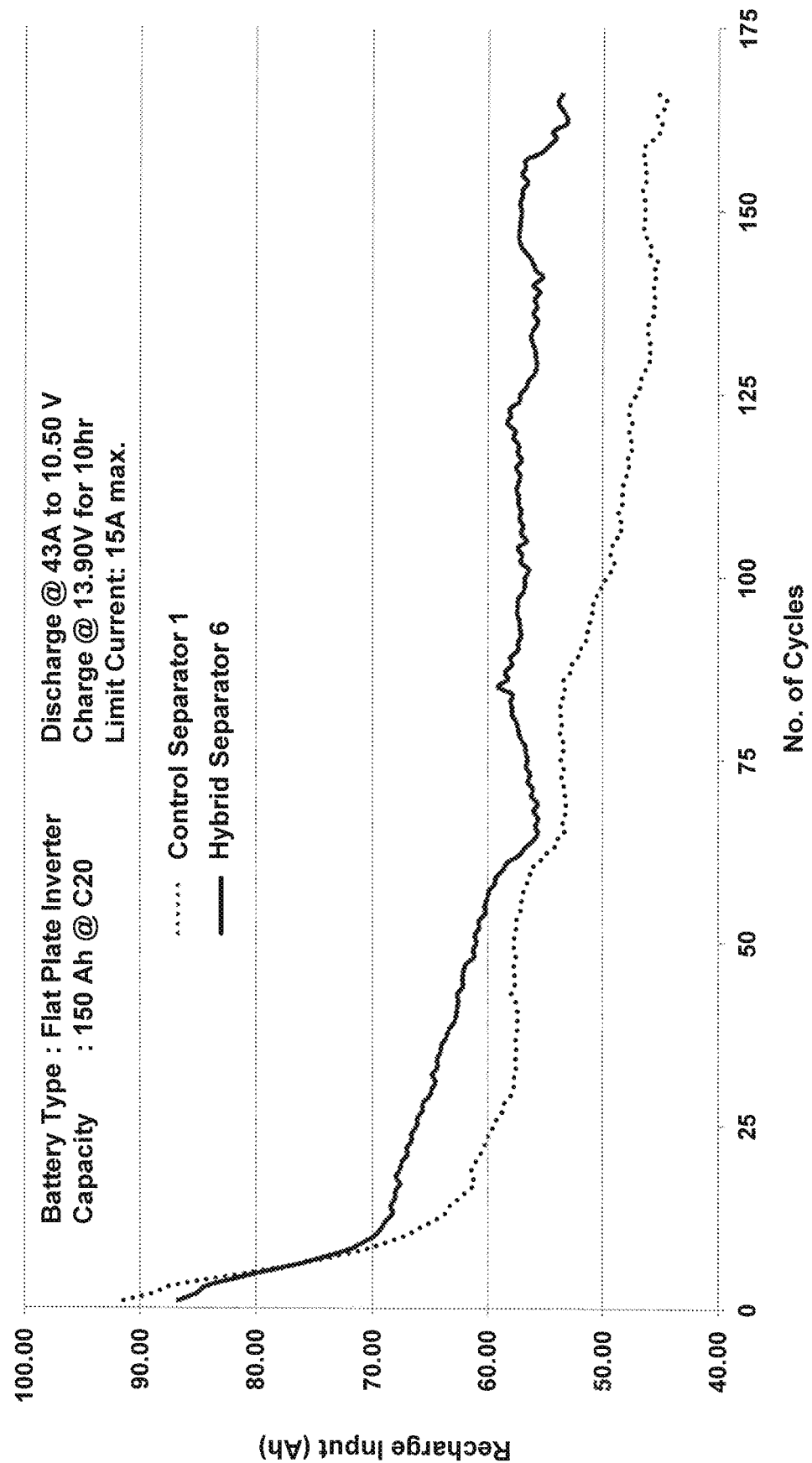
FIGS. 4A, 4B and 4C depict the comparative recharge over the course of 168 cycles while discharging at 43 A to 10.5 V and charging at 13.9 V for 10 hours for a flat-plate inverter battery having samples of a control separator, and a hybrid separator with an X-profile negative rib pattern and an additive.
Figure 4B:
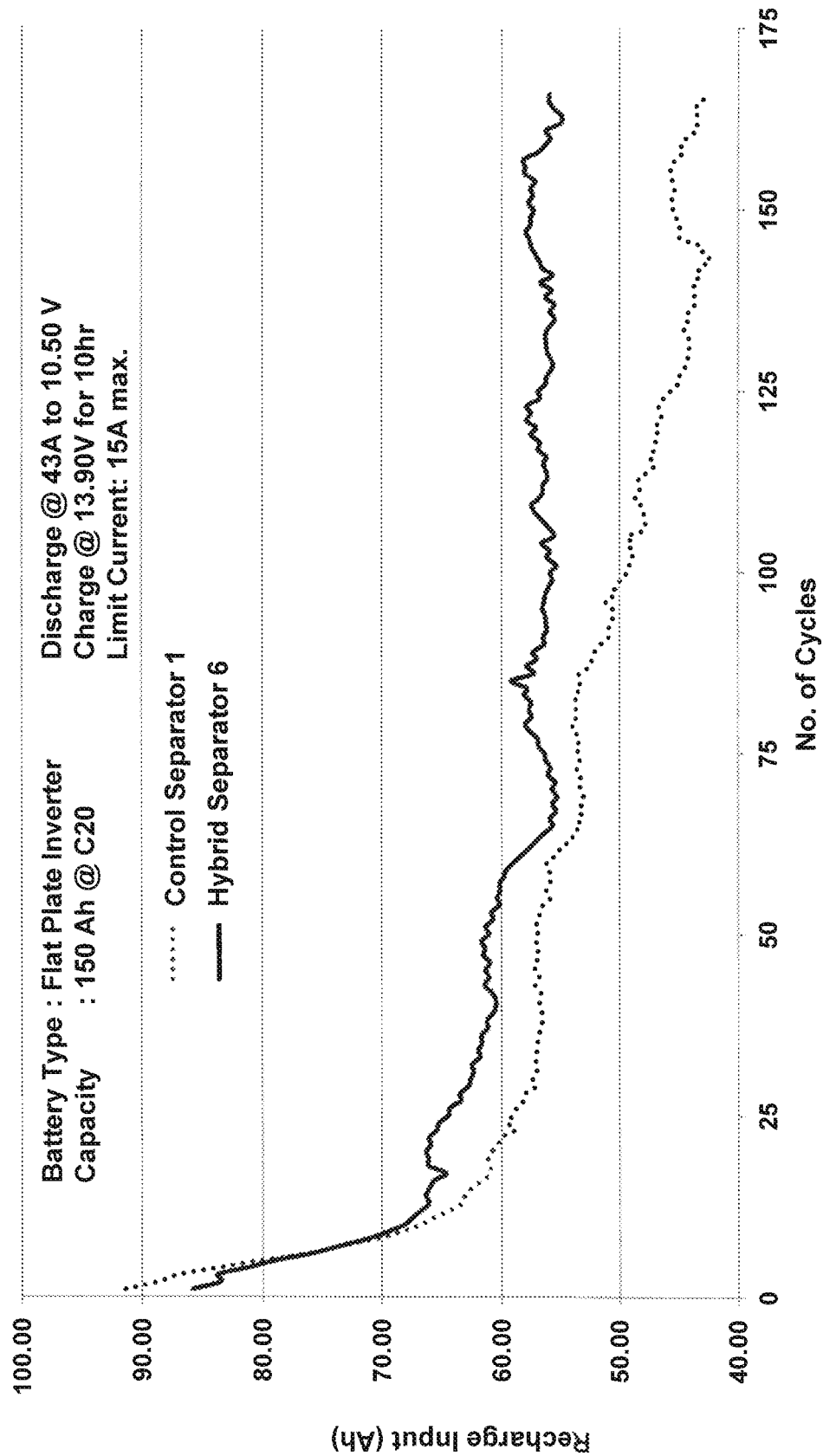
Figure 4C:
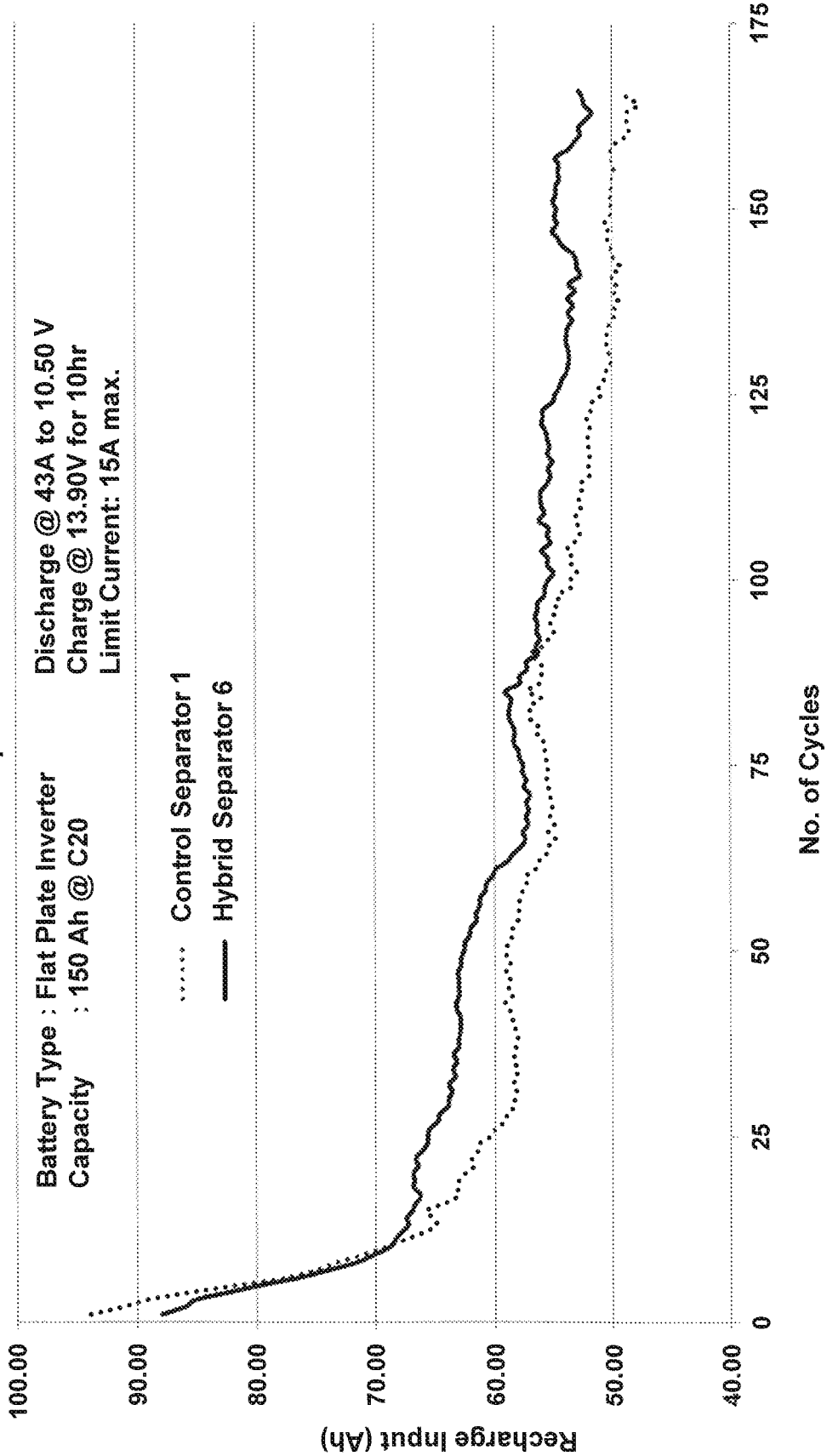
Figure 5A:
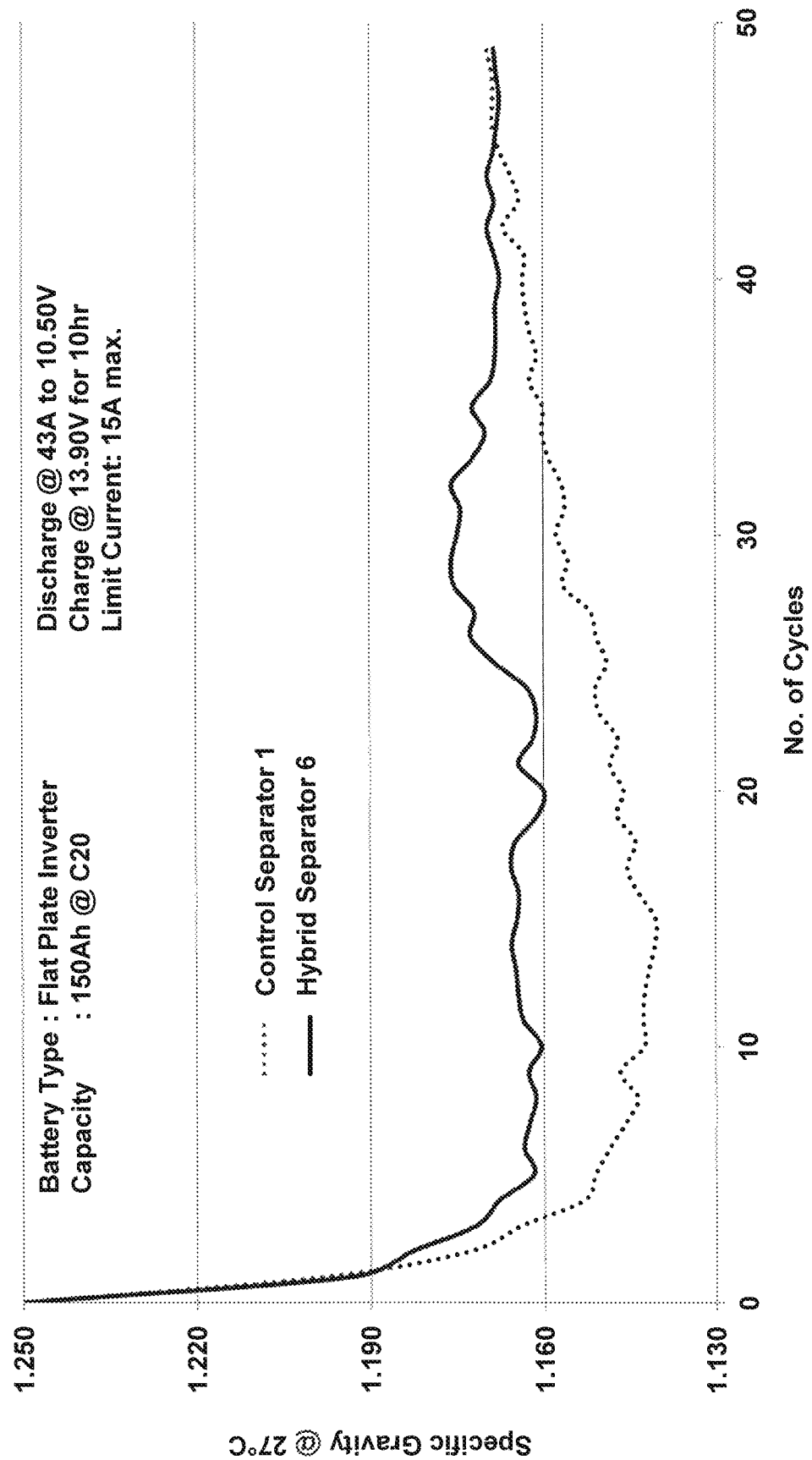
FIGS. 5A, 5B and 5C depict the comparative specific gravity over the course of 50 cycles while discharging at 43 A to 10.5 V and charging at 13.9 V for 10 hours for a flat-plate inverter battery having samples of a control separator, and a hybrid separator with an X-profile negative rib pattern and an additive.
Figure 5B:
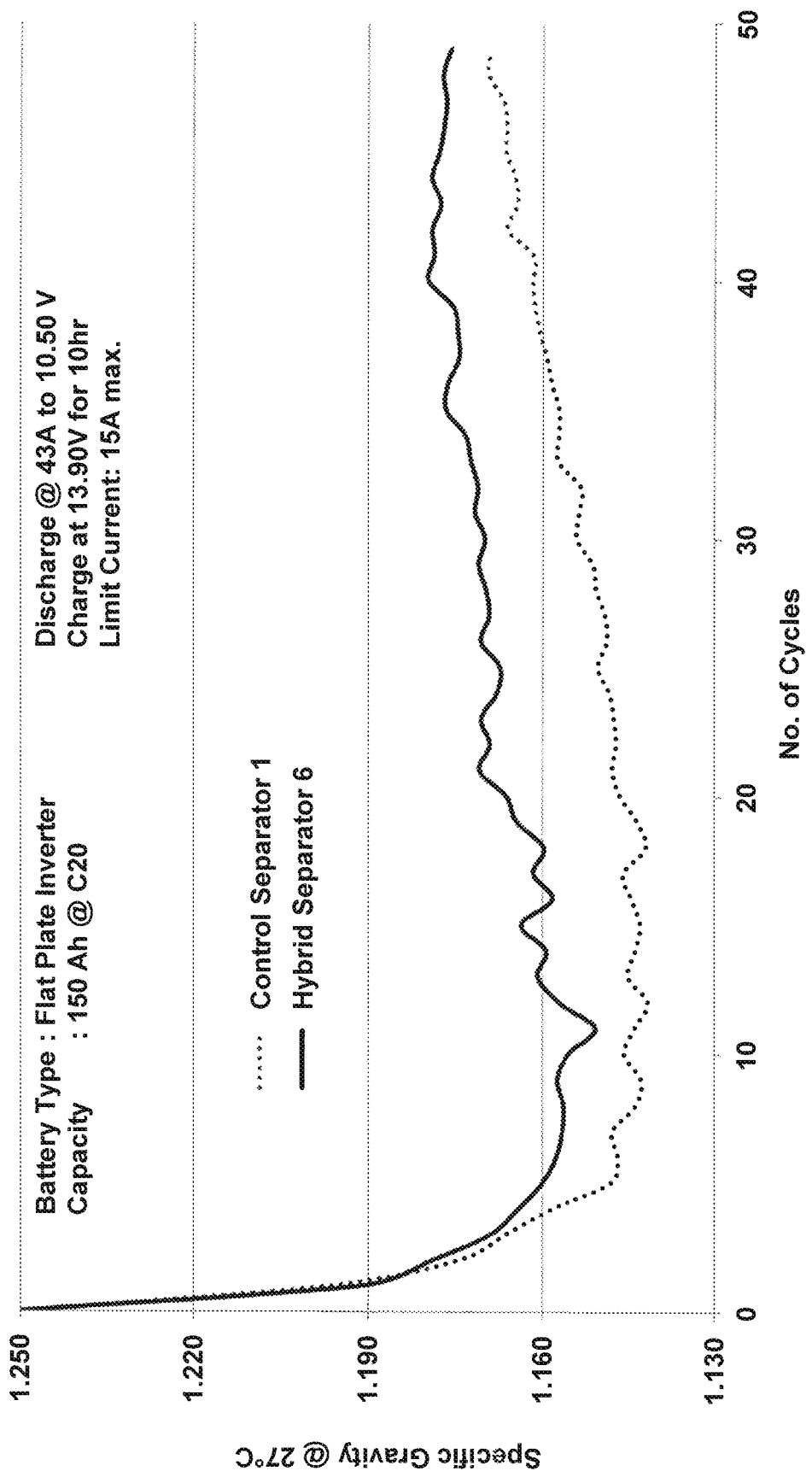
Figure 5C:
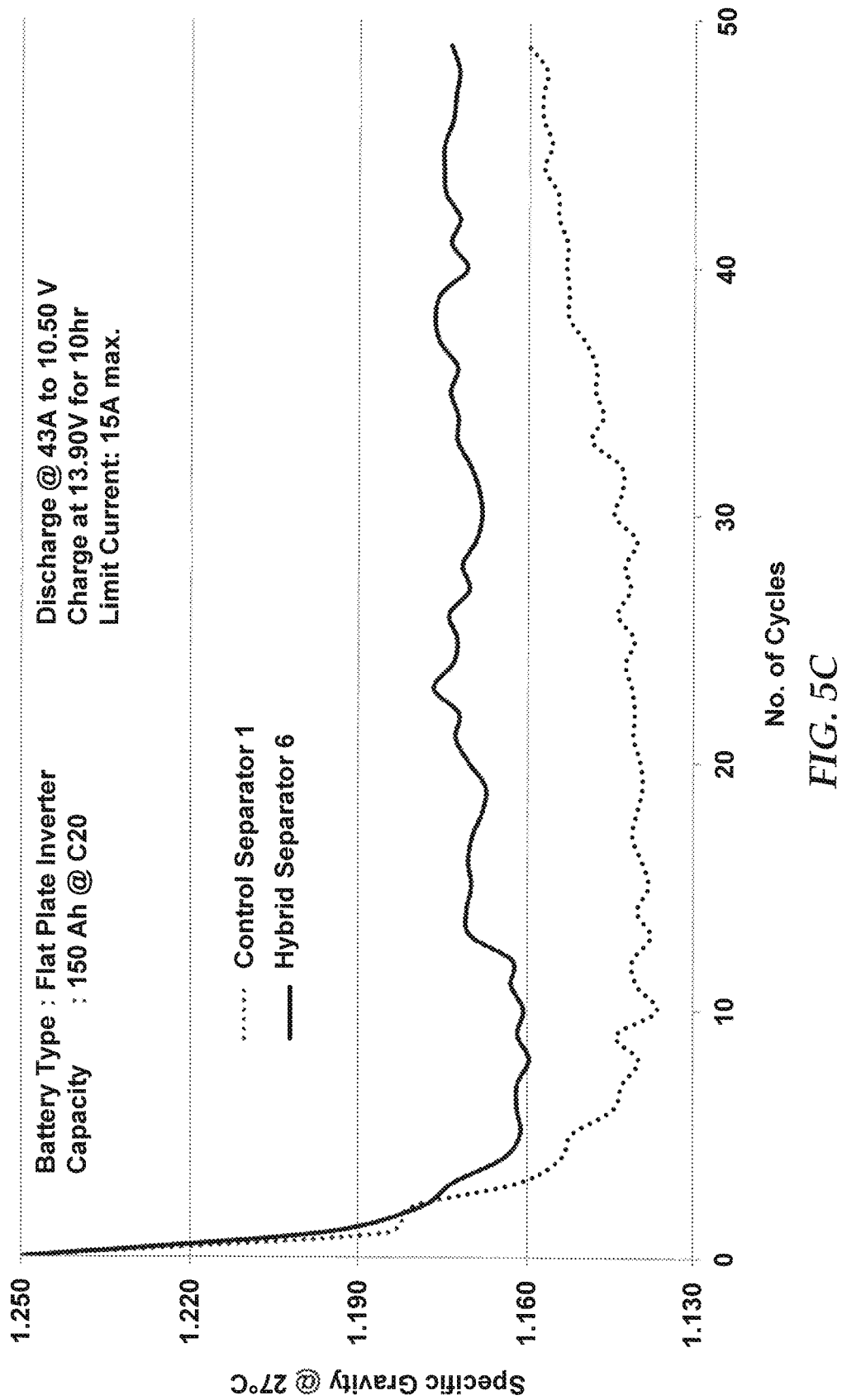
Figures 1, 6A:
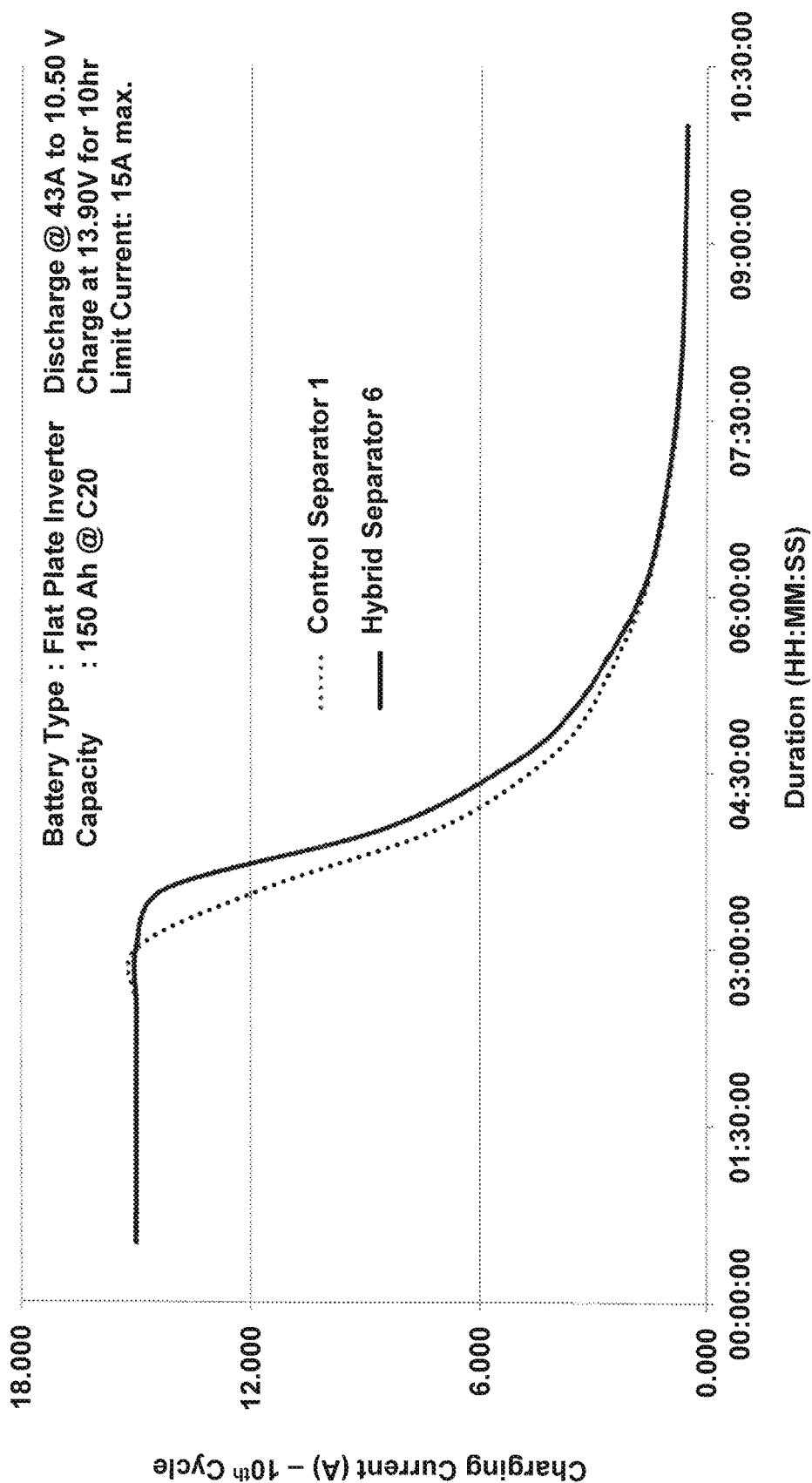
FIGS. 6A-1 to 6C-4 depict the comparative recharge profile while discharging at 43 A to 10.5 V and charging at 13.9 V for 10 hours for a flat-plate inverter battery having samples of a control separator, and a hybrid separator with an X-profile negative rib pattern and an additive.
Figures 2, 6A:
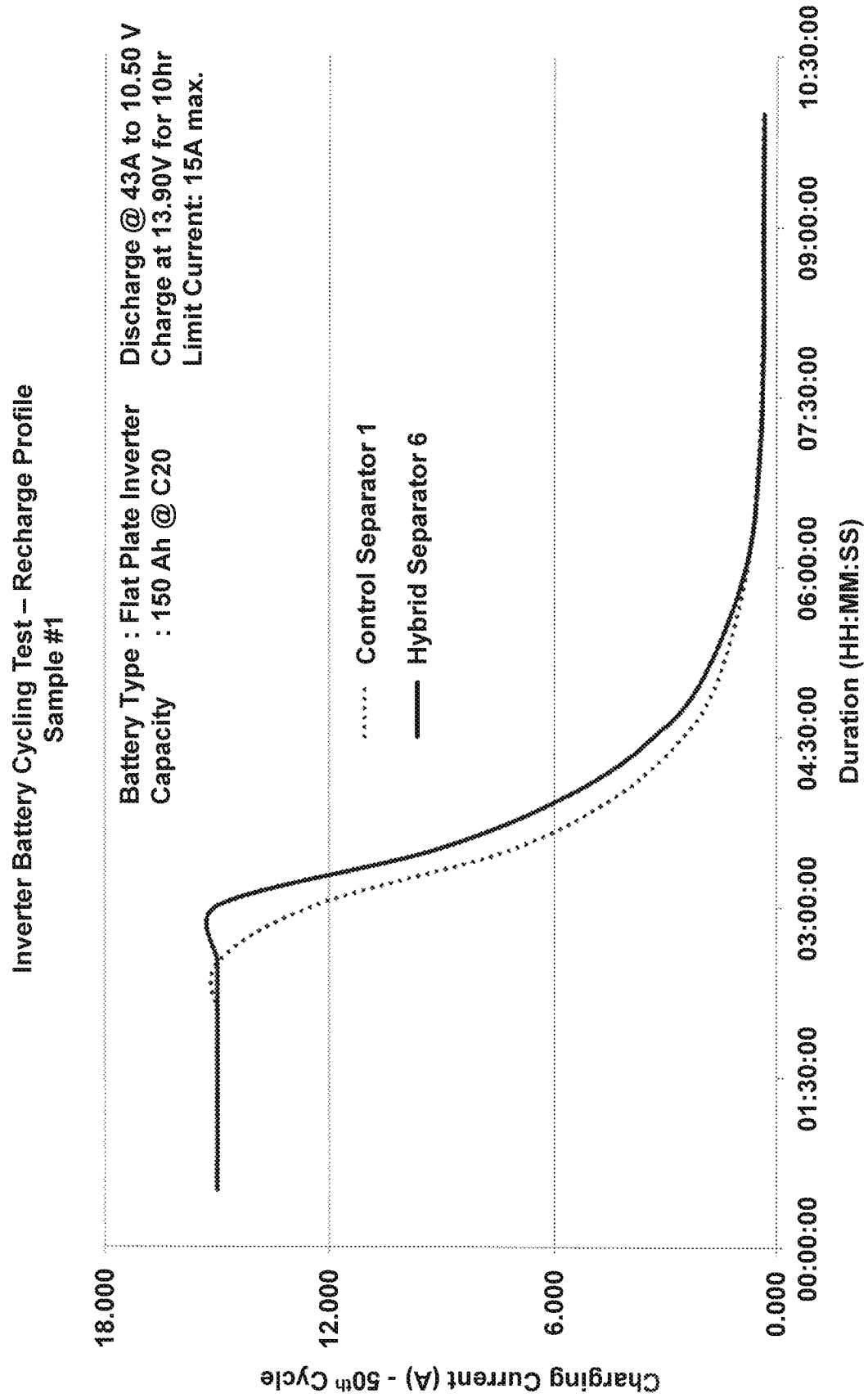
Figures 3, 6A:
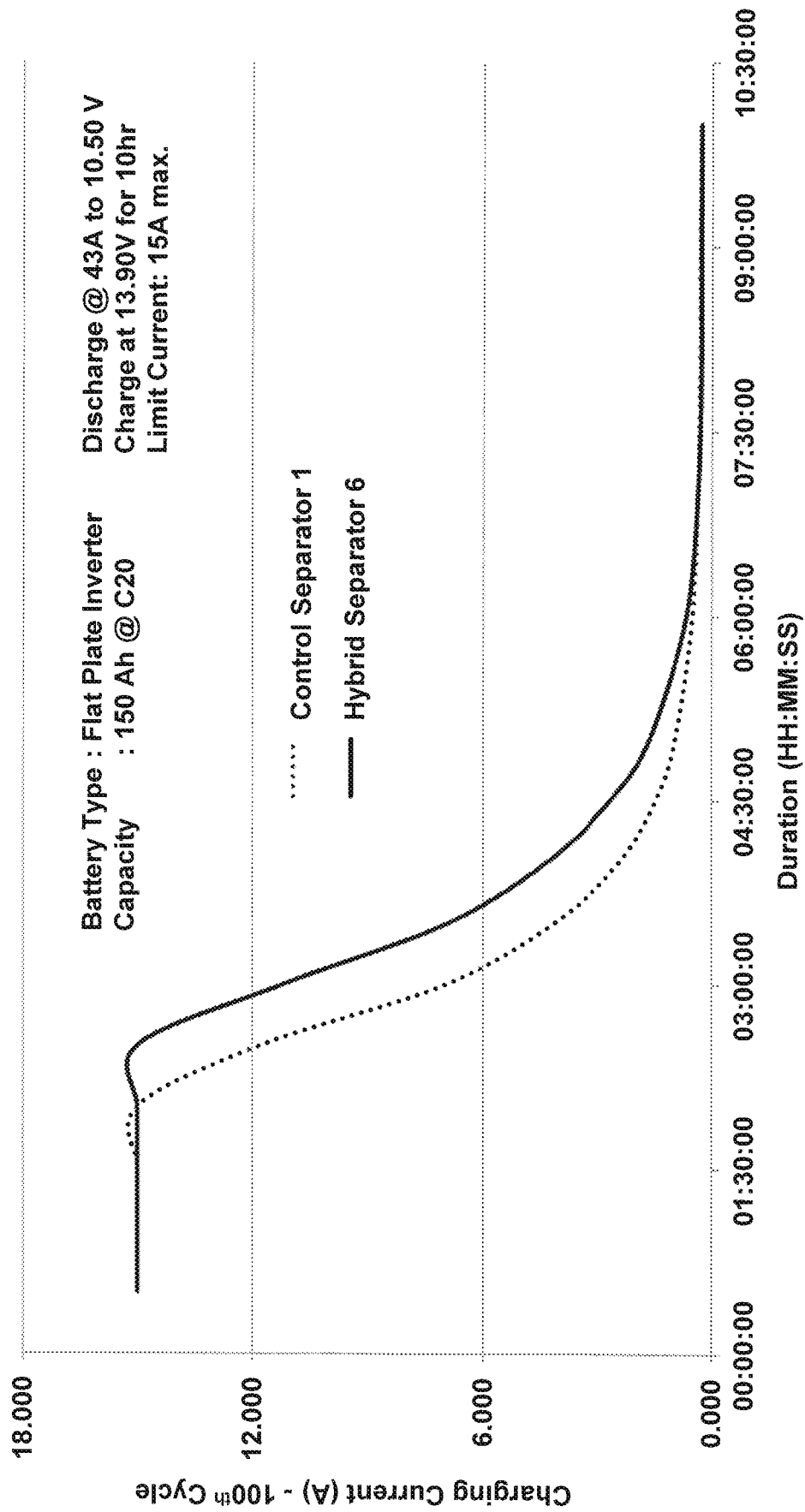
Figures 4, 6A:
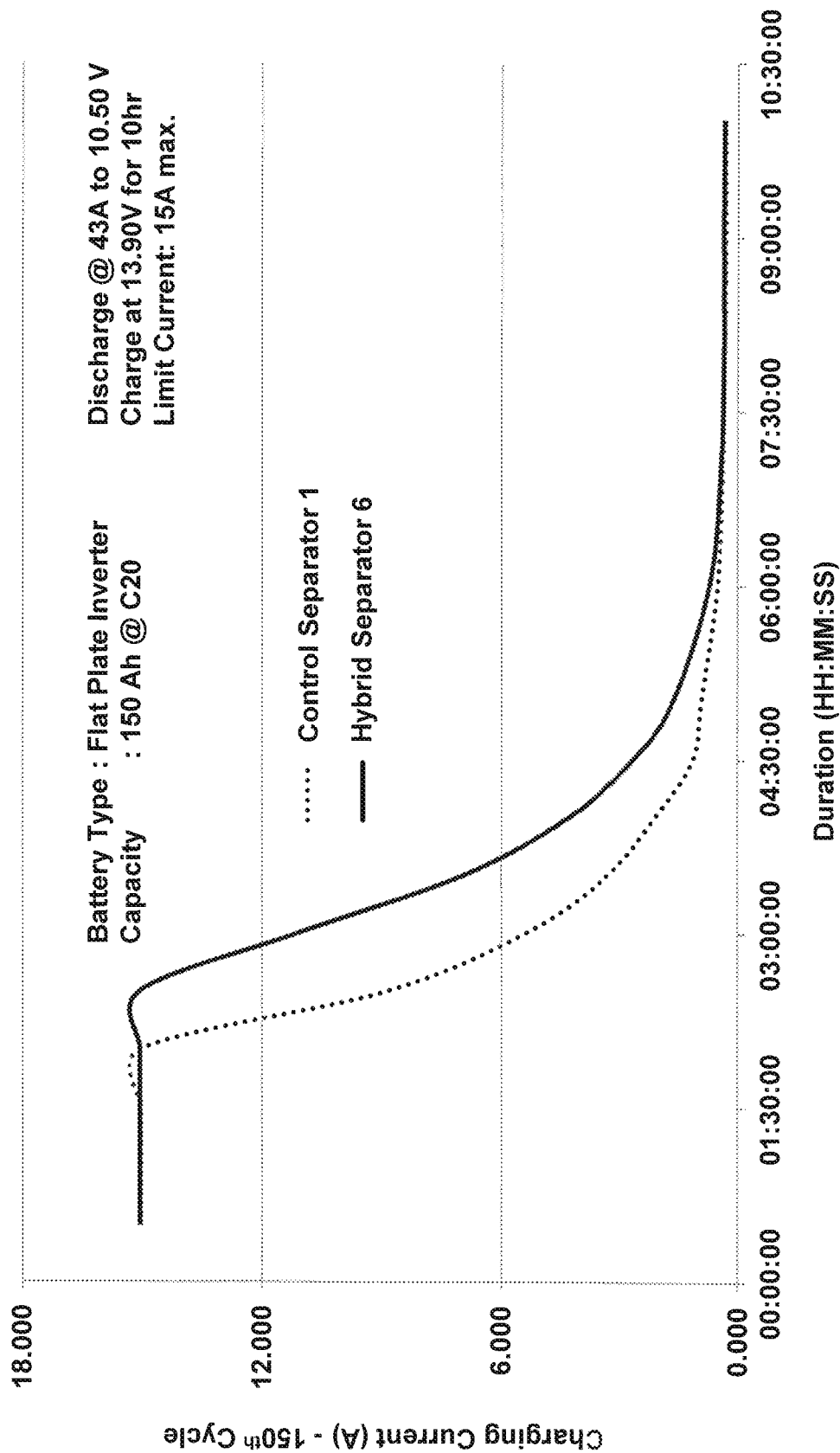
Figures 1, 6B:
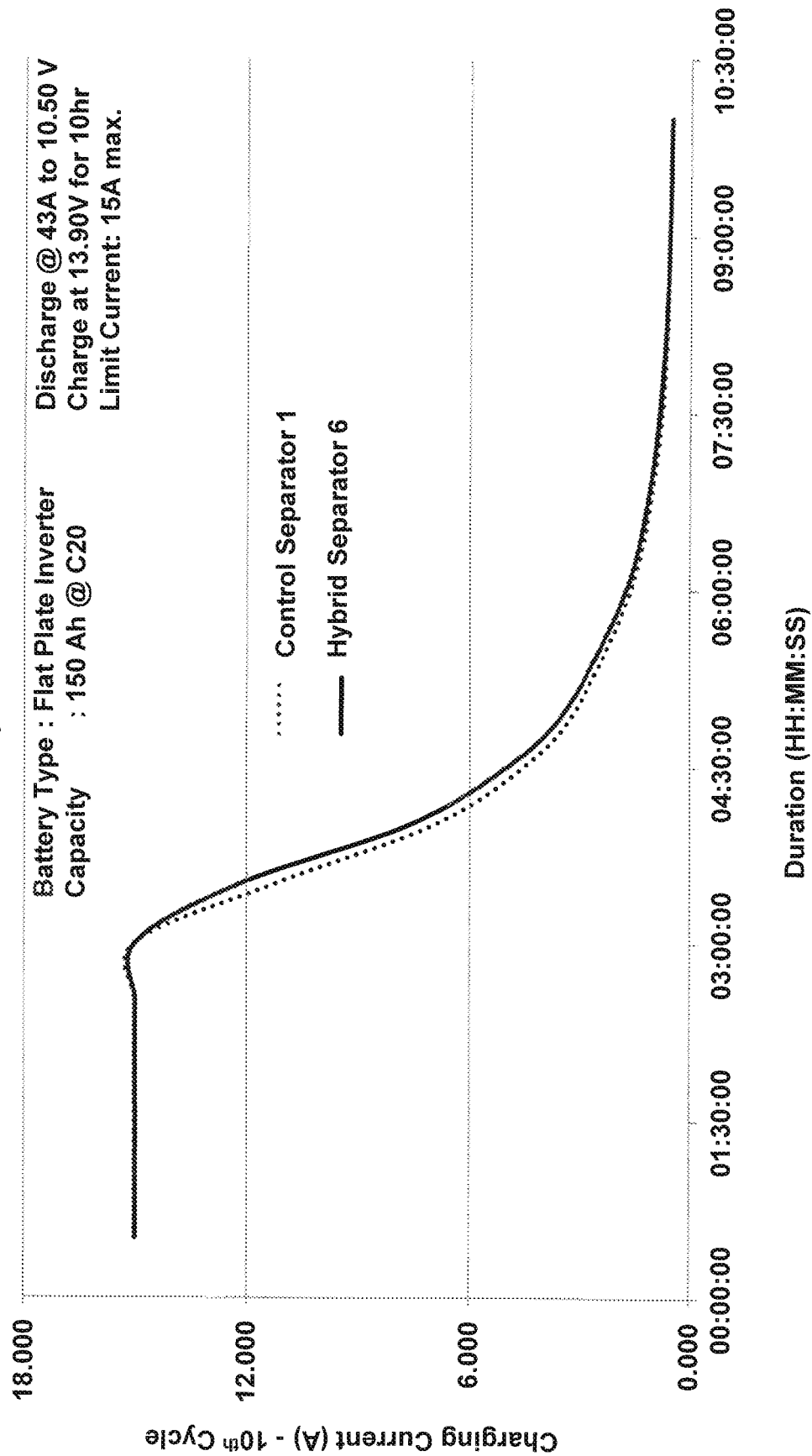
Figures 2, 6B:
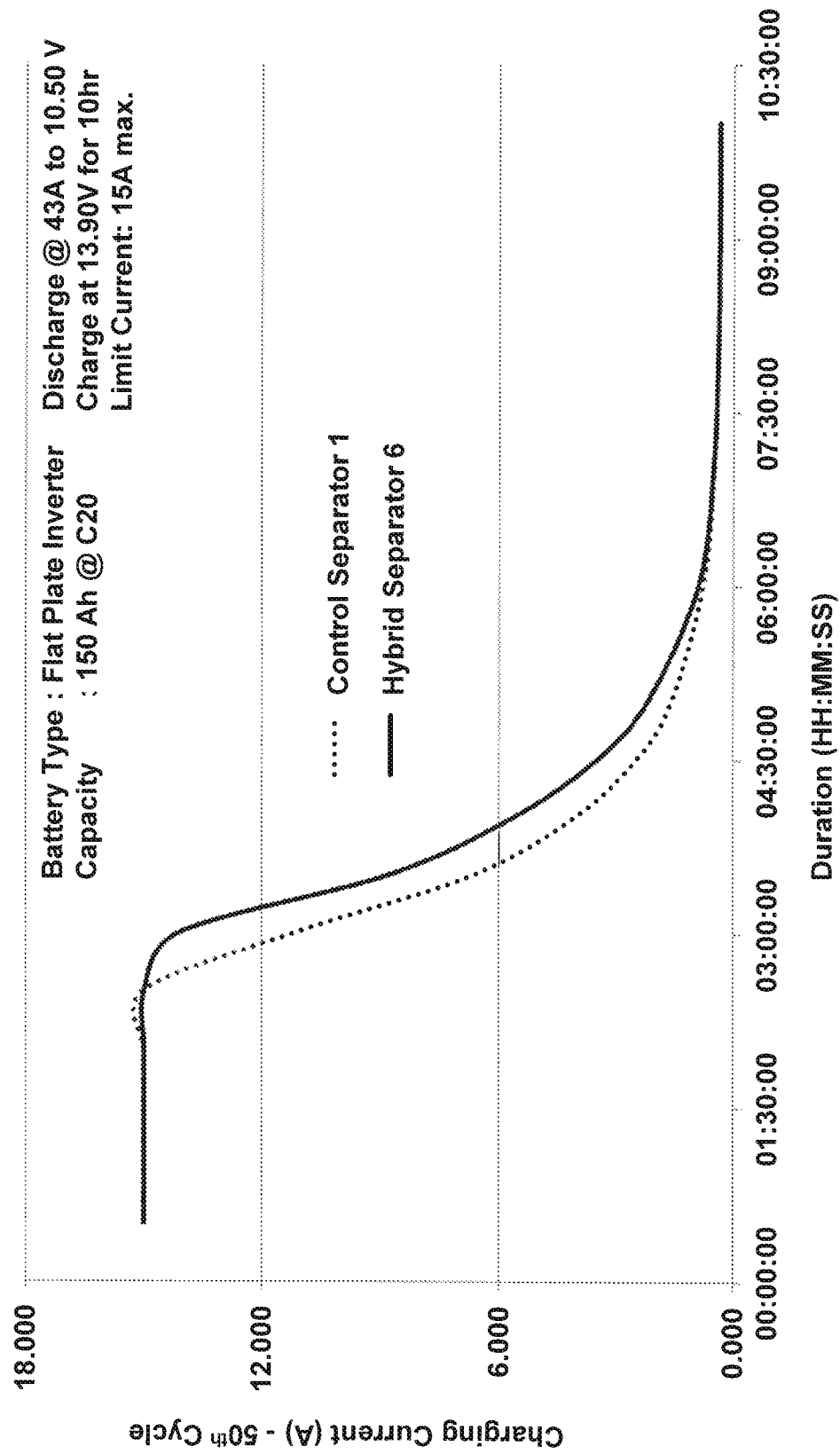
Figures 3, 6B:
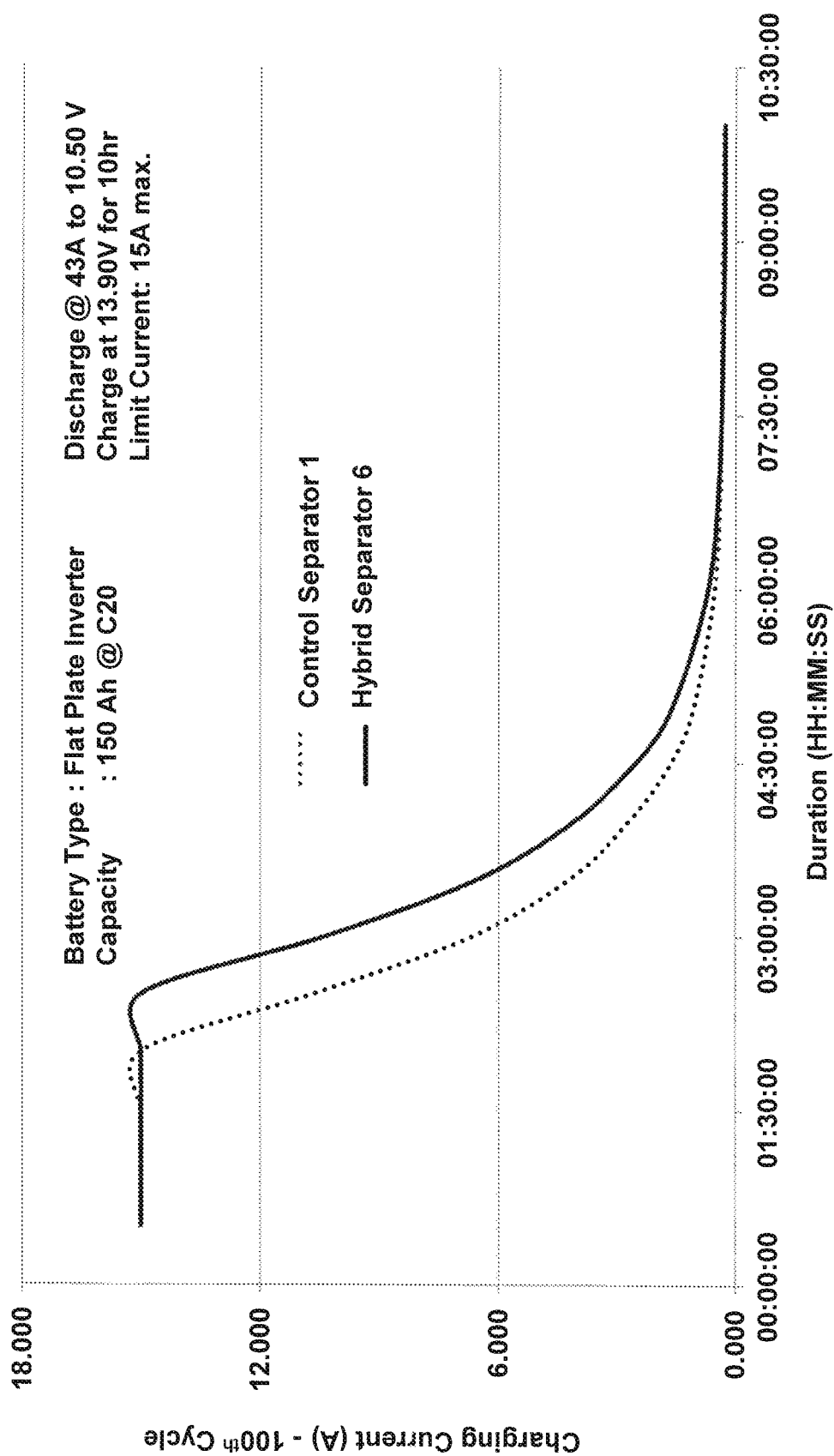
Figures 4, 6B:
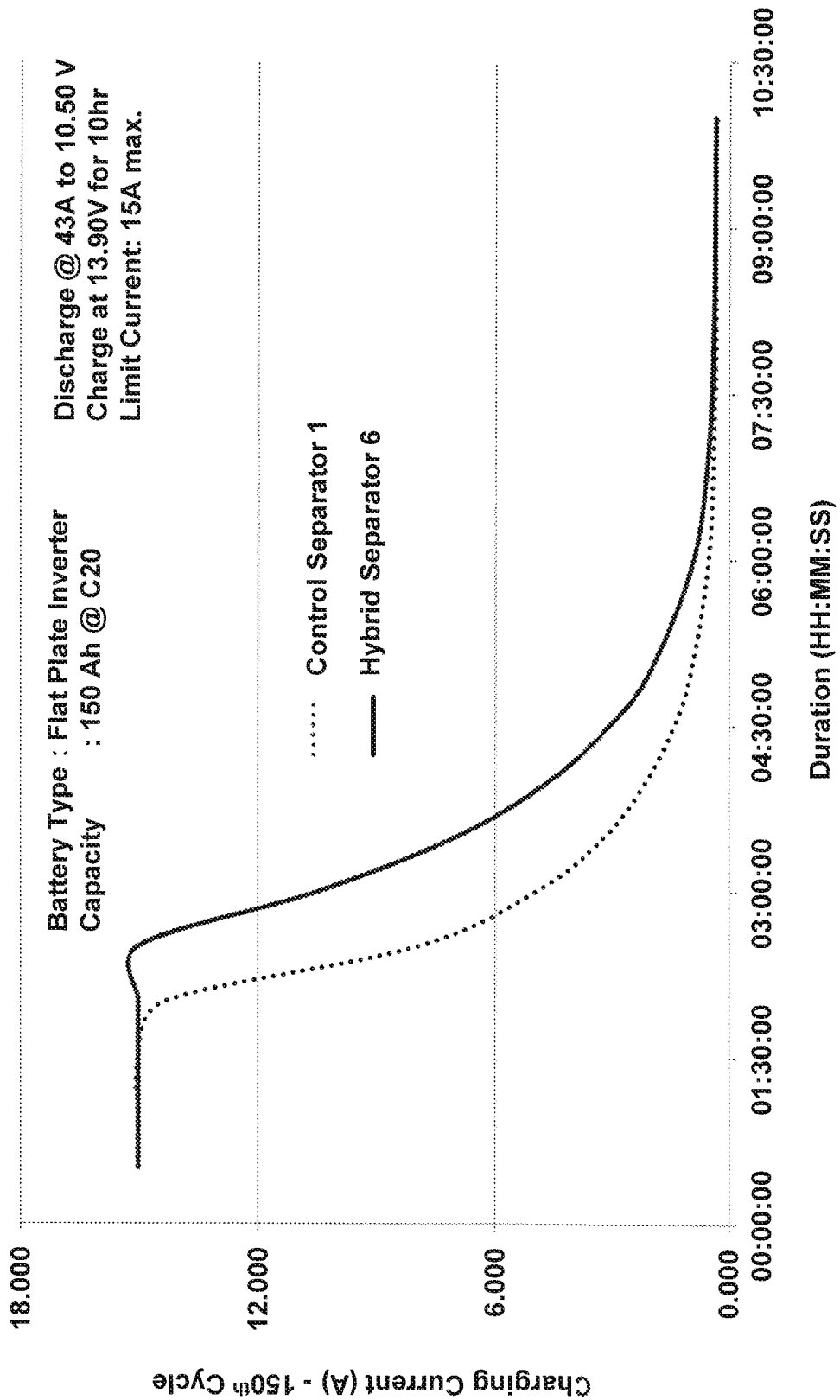
Figures 1, 6C:
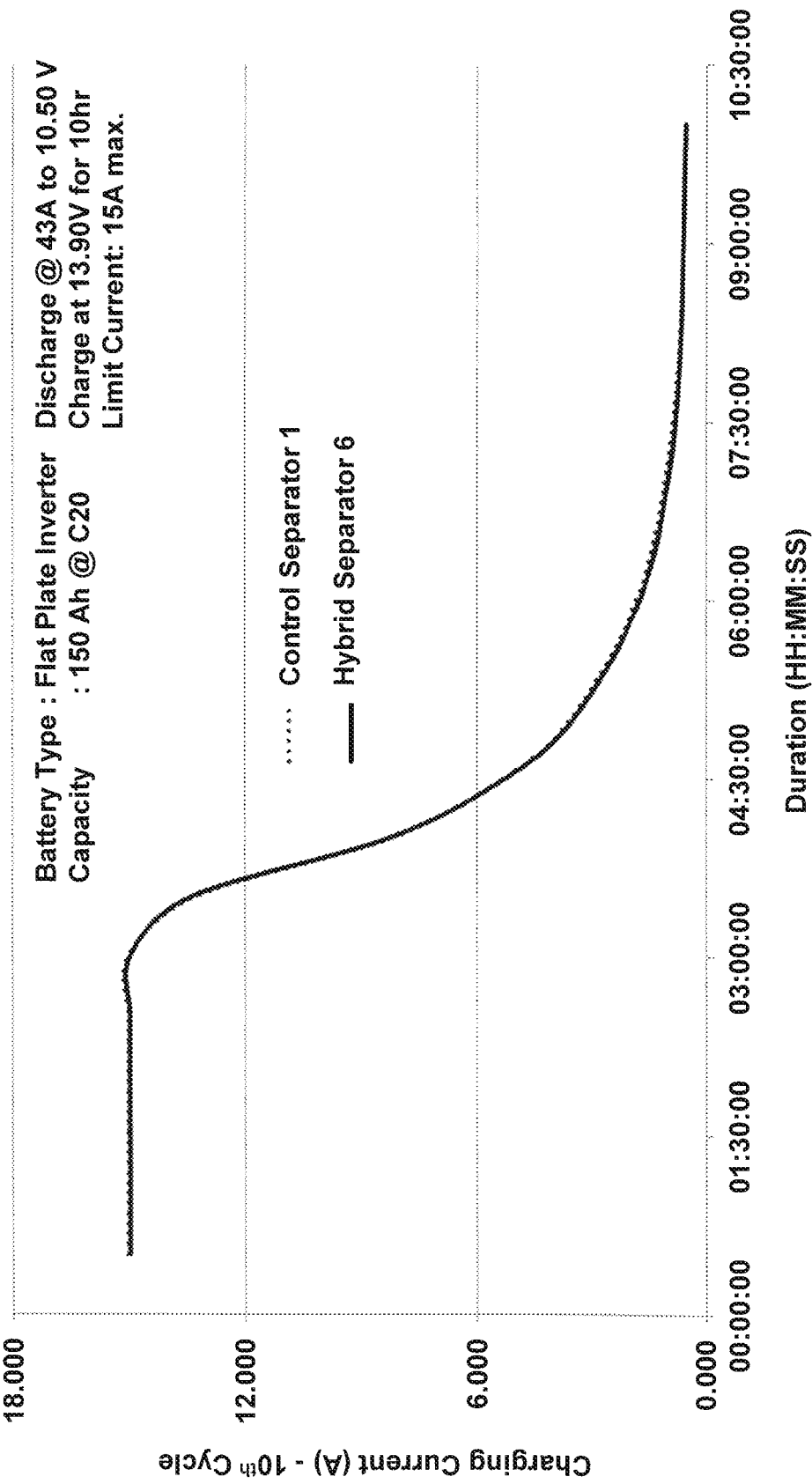
Figures 2, 6C:
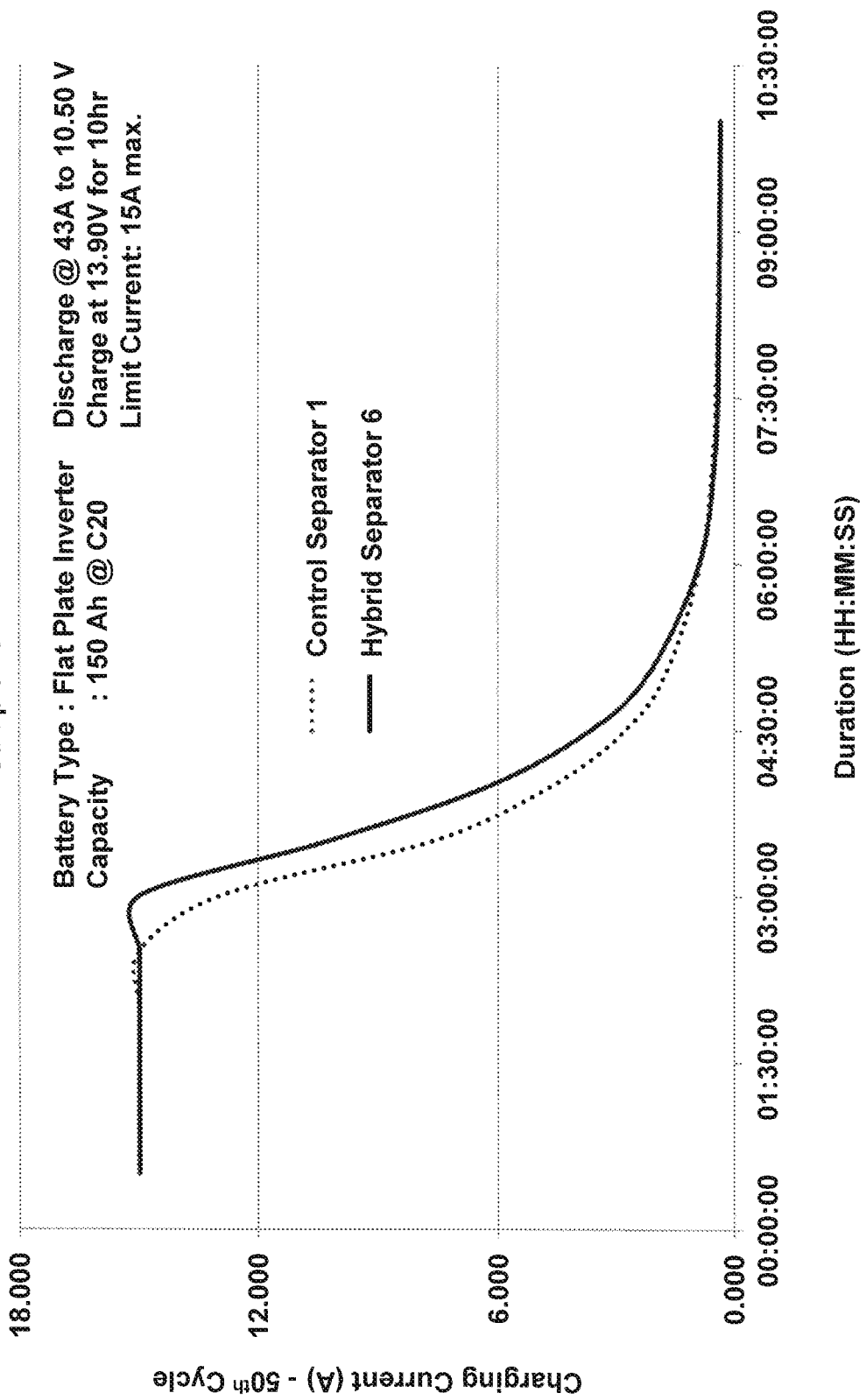
Figures 3, 6C:
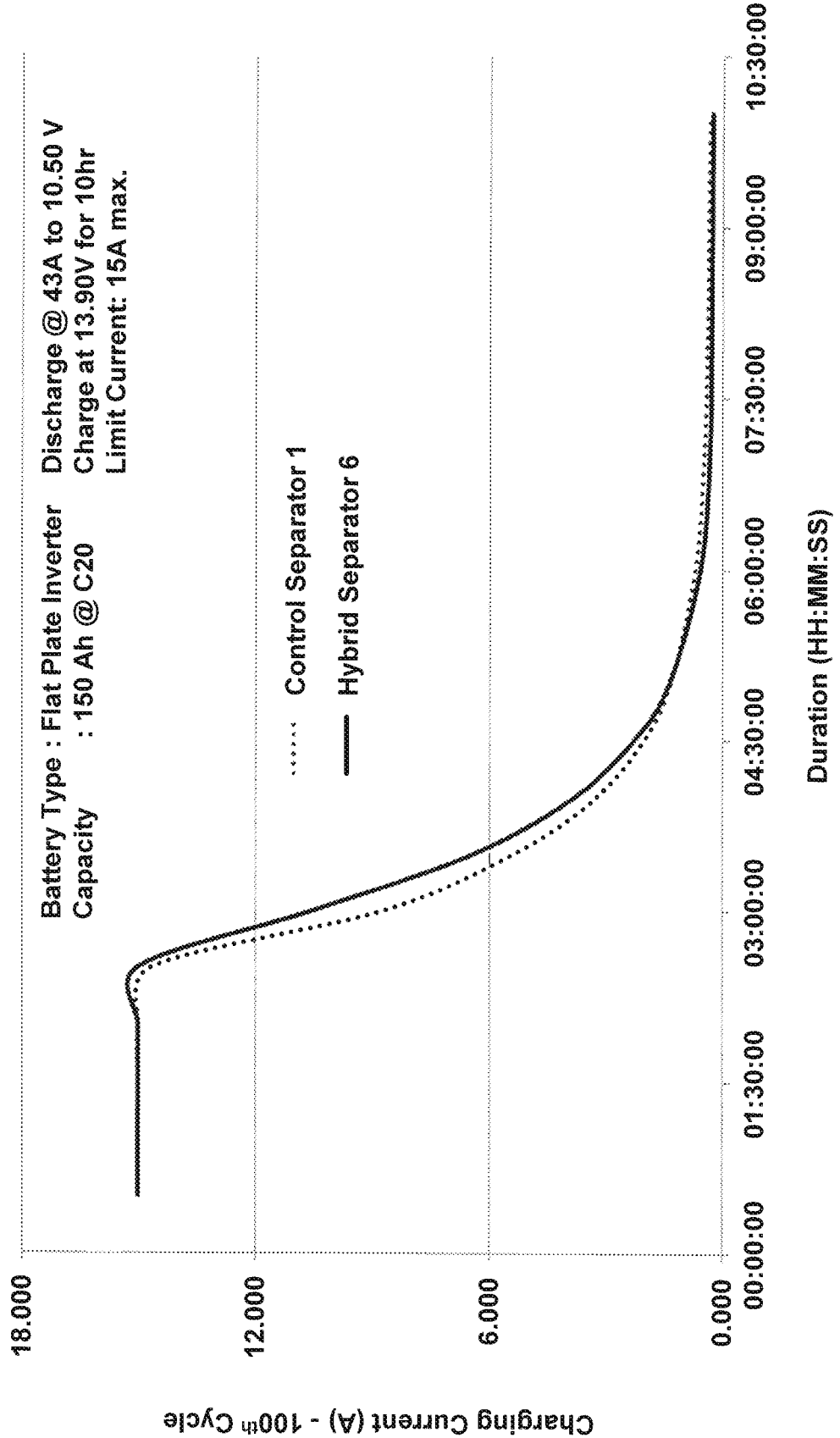
Figures 4, 6C:
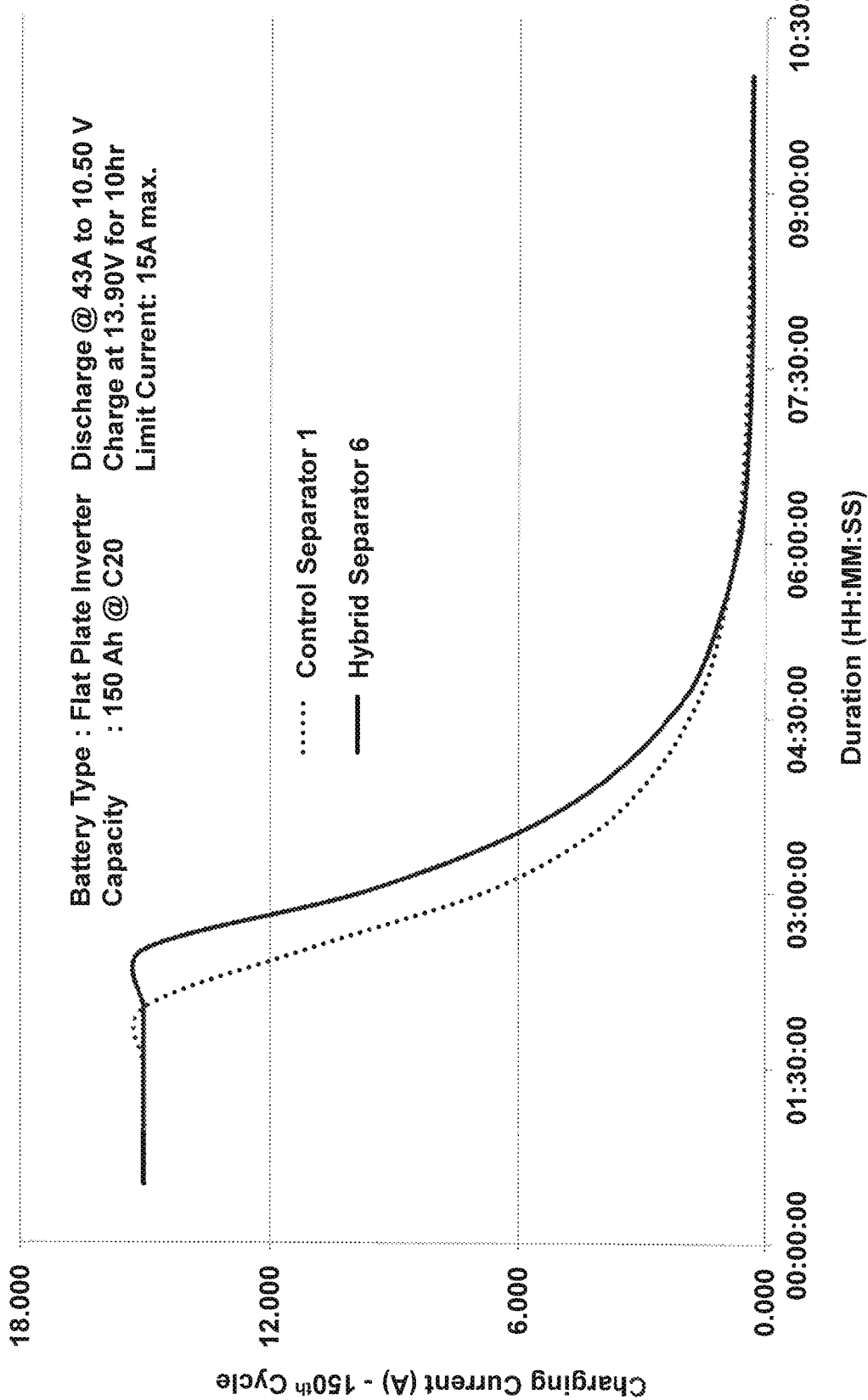
Figure 7A:
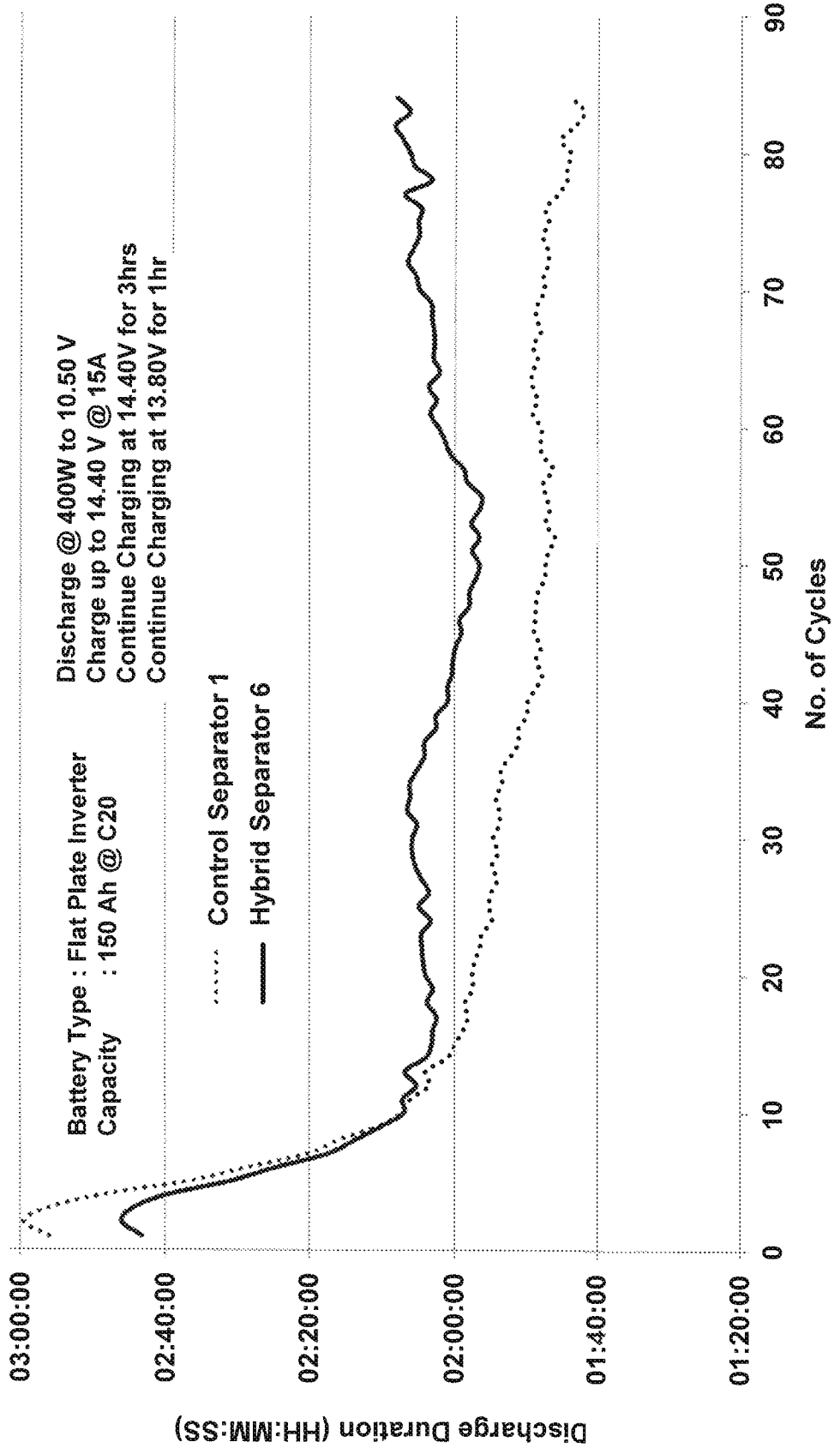
FIGS. 7A, 7B and 7C depict the comparative discharge duration/backup time during inverter battery cycling tests discharging at 43 A to 10.5 V and charging at 13.9 V for 10 hours for a flat-plate inverter battery having samples of a control separator, and a hybrid separator with an X-profile negative rib pattern and an additive.
Figure 7B:
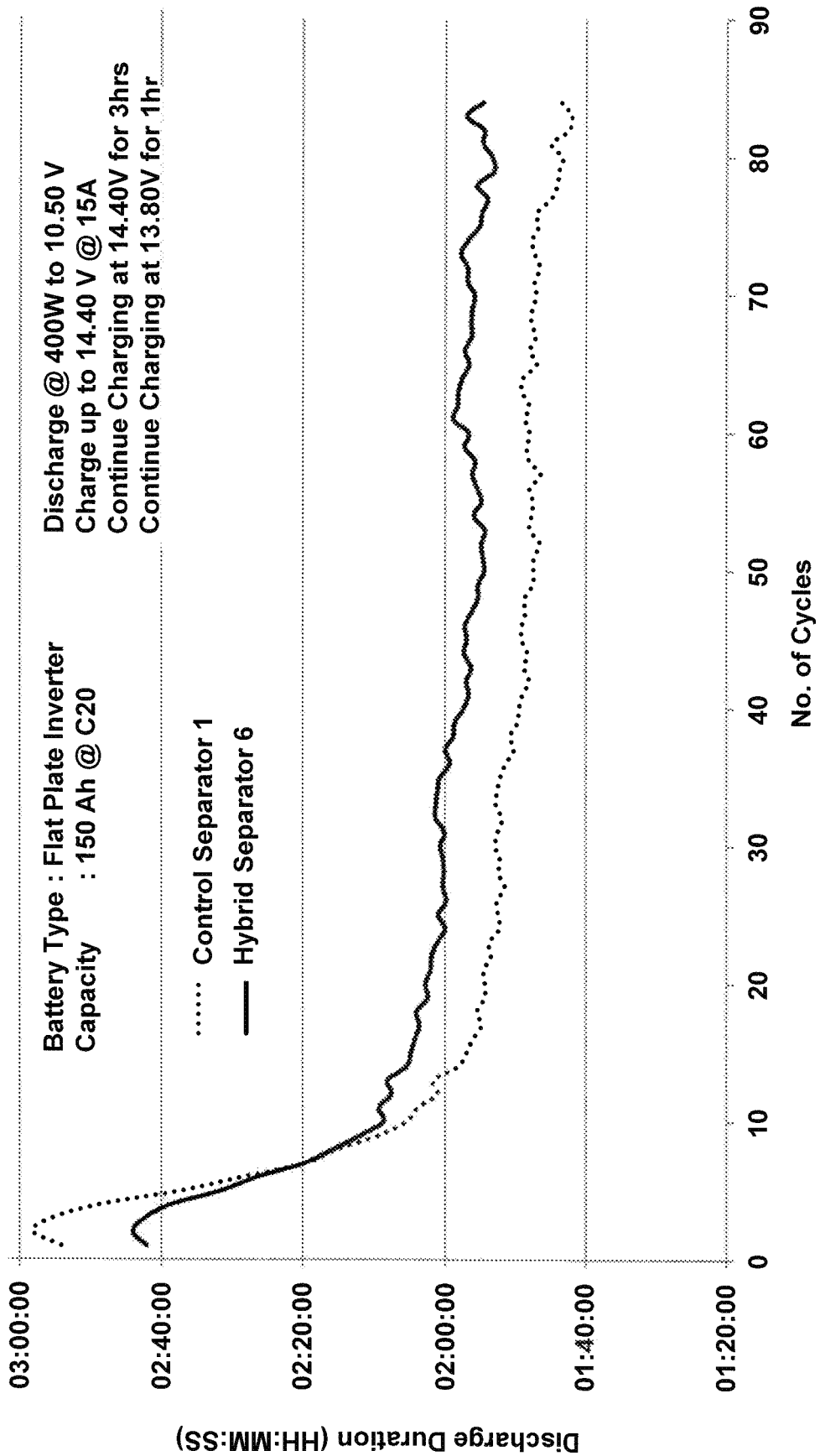
Figure 7C:
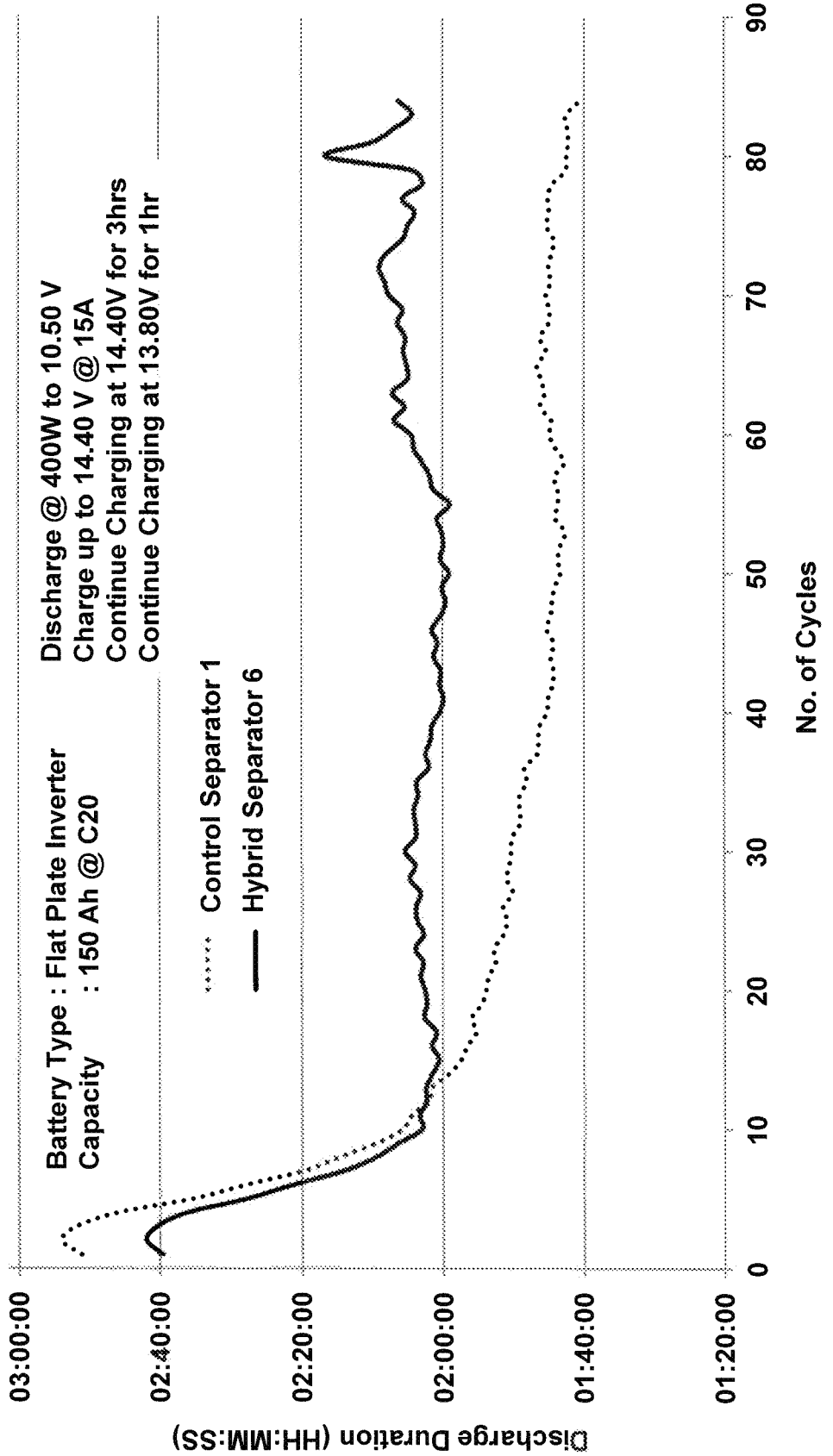
Figure 8A:
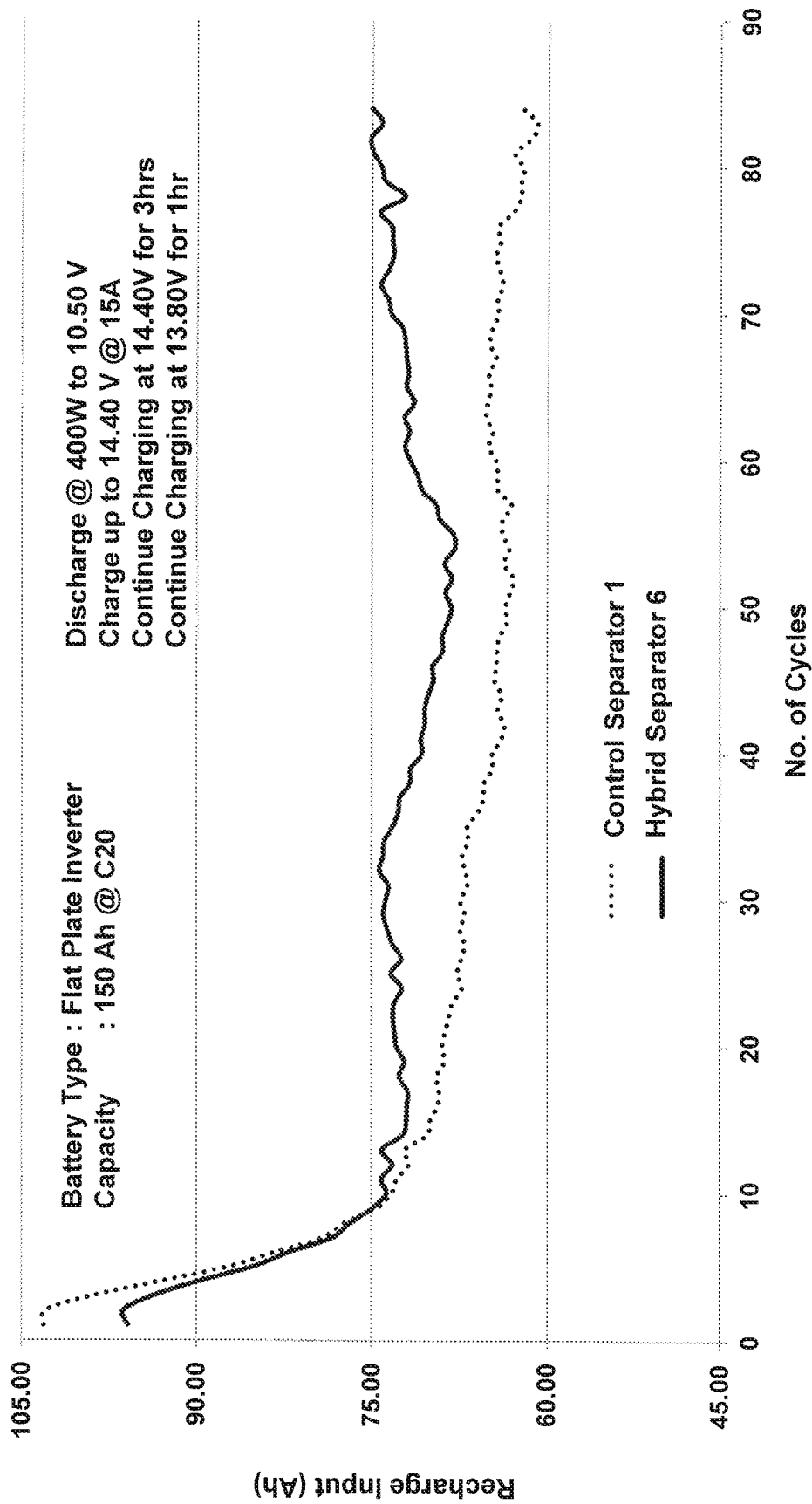
FIGS. 8A, 8B and 8C depict the comparative recharge input data in Ah during inverter battery cycling tests for a flat-plate inverter battery having samples of a control separator, and a hybrid separator with an X-profile negative rib pattern and an additive.
Figure 8B:
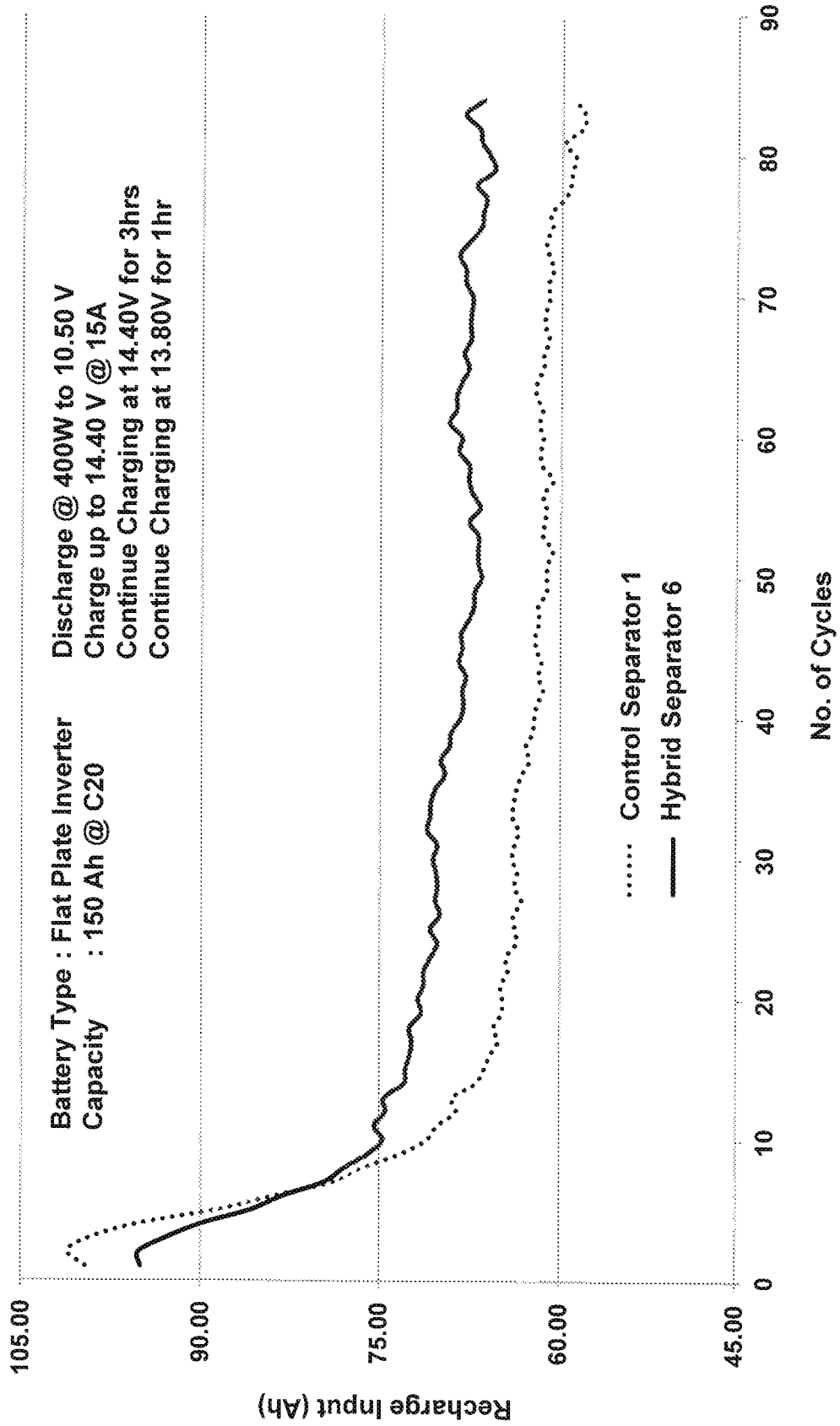
Figure 8C:
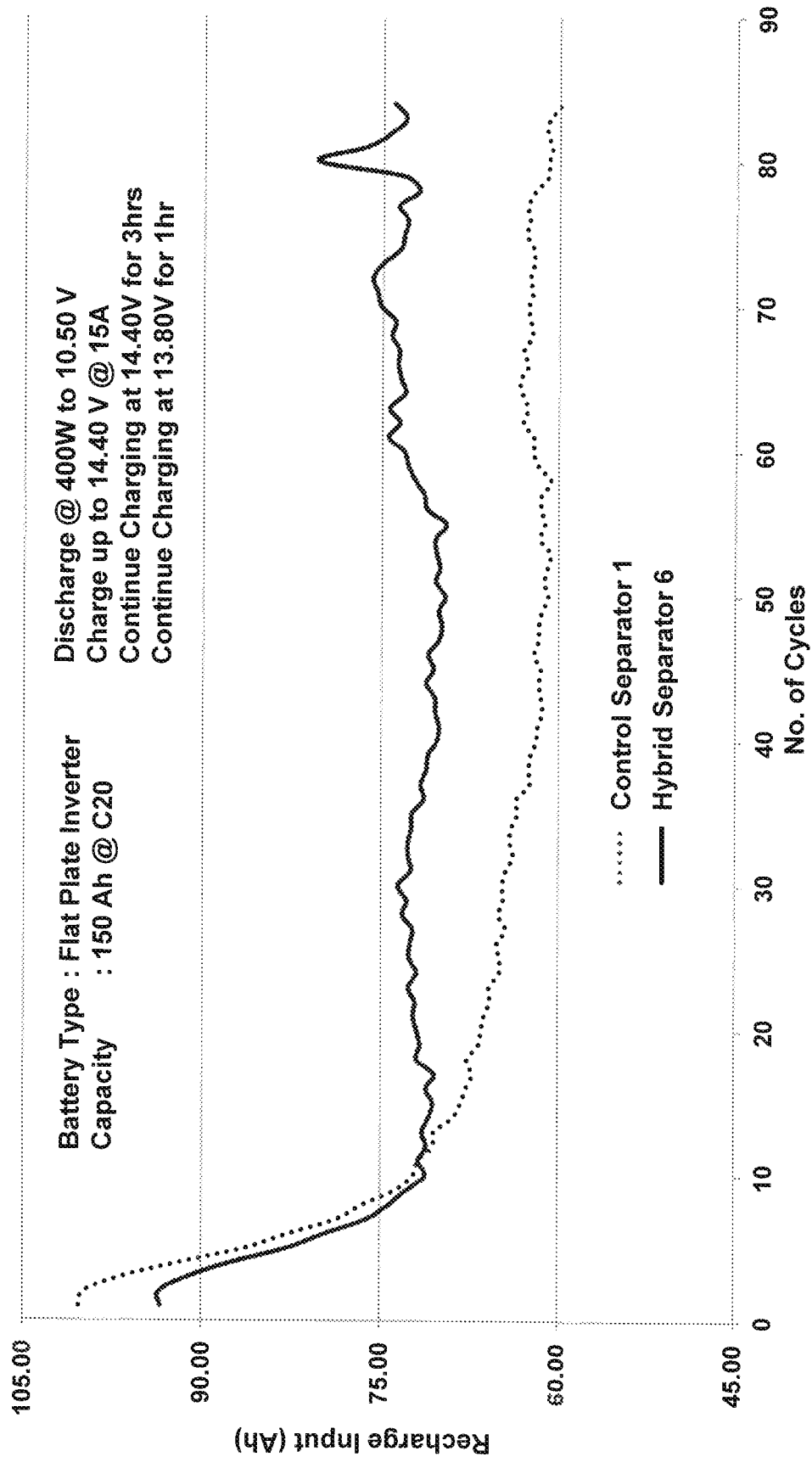
Figure 9A:
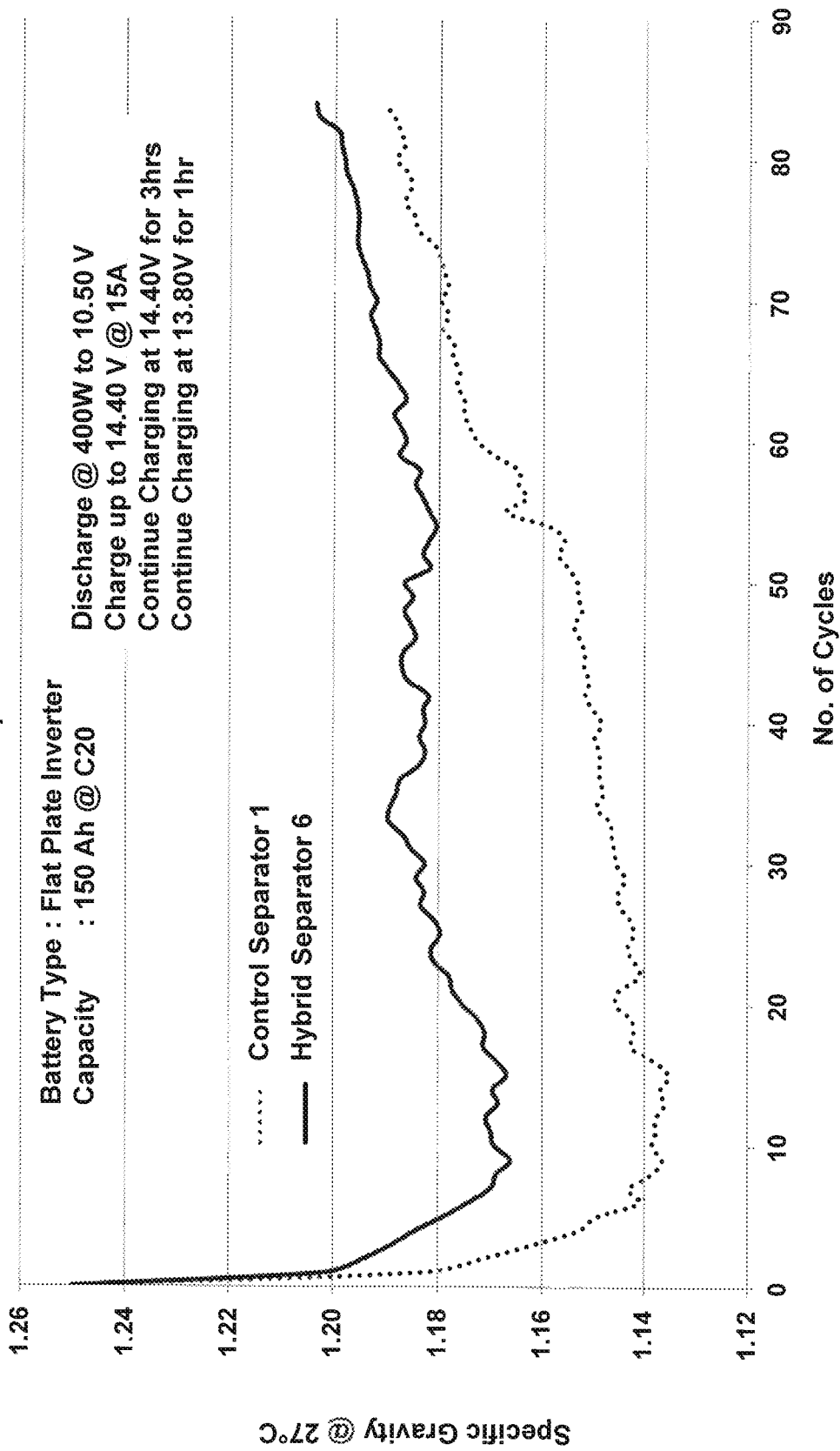
FIGS. 9A, 9B and 9C depict the comparative specific gravity during inverter battery cycling tests for a flat-plate inverter battery having samples of a control separator, and a hybrid separator with an X-profile negative rib pattern and an additive.
Figure 9B:
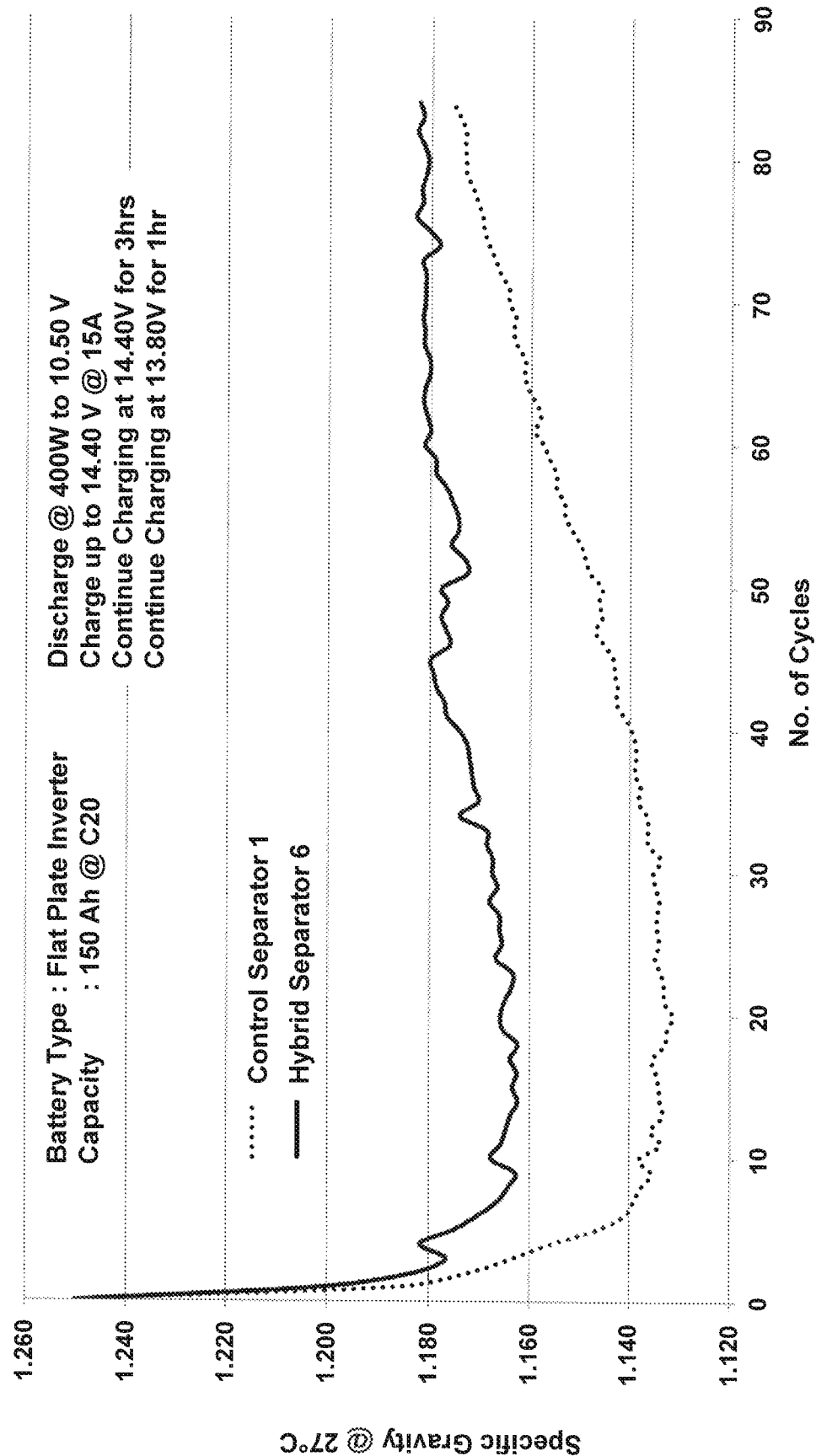
Figure 9C:
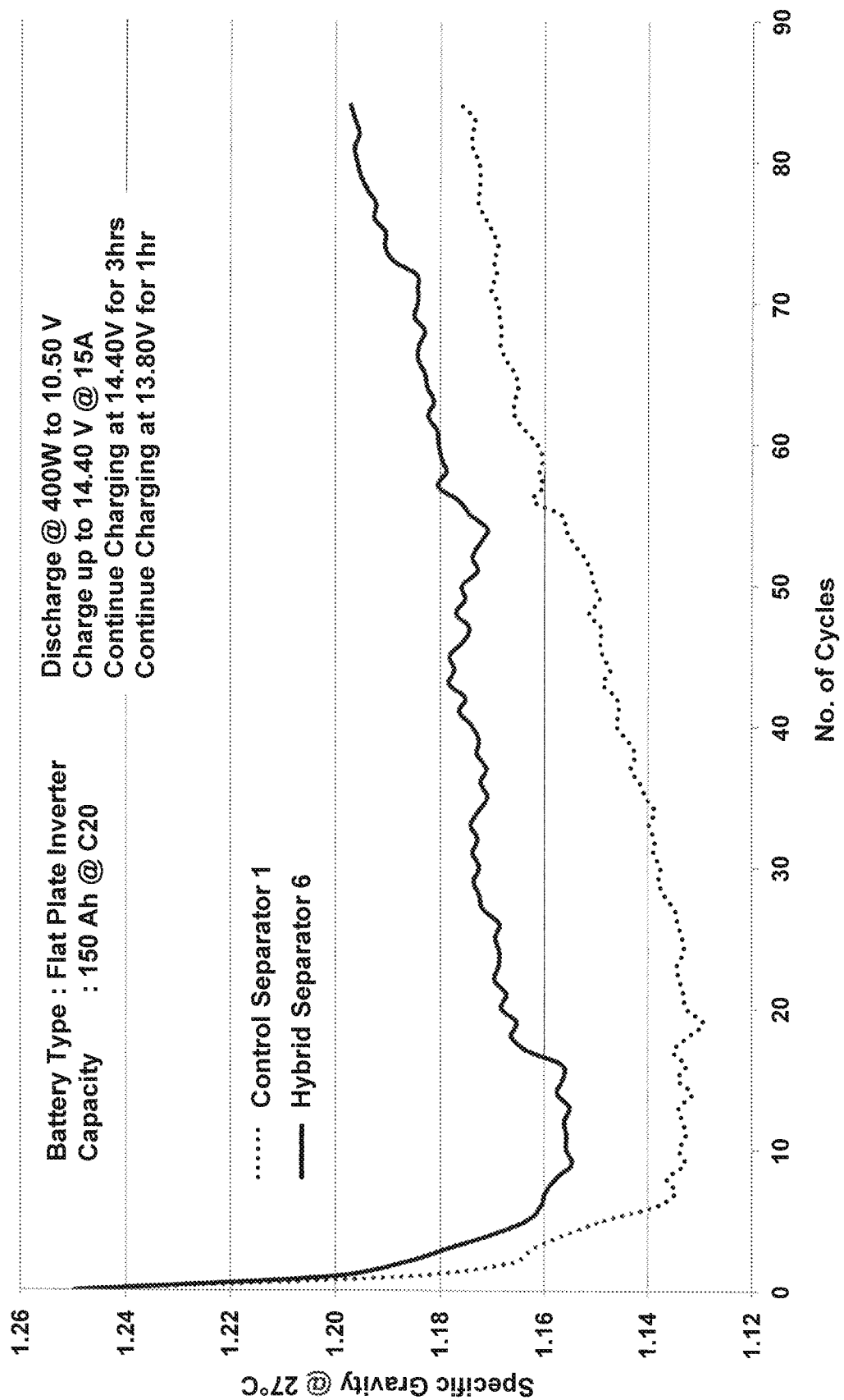

The following examples further illustrate at least selected separator embodiments of the instant disclosure.
   Examples of embodiments, aspects and/or objects of the present disclosure include:
   Separator 1: positive ribs+V-profile negative ribs+standard envelope;
   Separator 2: positive ribs+V-profile negative ribs+surfactant coating+standard envelope;
   Separator 3: positive ribs+X-profile negative ribs+surfactant coating+standard envelope;
   Separator 4: positive ribs+X-profile negative ribs+surfactant coating+standard envelope;
   Separator 5: positive ribs+X-profile negative ribs+an envelope with one or more slits ("hybrid envelope");
   Separator 6: positive ribs+X-profile negative ribs+surfactant coating+hybrid envelope;
   Separator 7: positive ribs+V-profile negative ribs+surfactant coating+hybrid envelope;
   Separator 8: positive ribs+surfactant coating+hybrid envelope.
   With reference to FIGS. 2A-11D, evaluations of the battery performance of the disclosed separators are depicted. Three different battery units were prepared. Flat-plate batteries having a charge of 12V 150 Ah @20 hours were used. The batteries contained 17 plates per cell (8 positive and 9 negative). The antimony content in the grids was 2.5%, and the plates had a mean dry weight of 271.5 grams (positive) and 206.65 grams (negative). The positive plate group weight was 2172±1.5 gram/cell, and the negative plate group weight 1860±1.5 gram/cell.
   The control battery had the following characteristics: a conventional negative-wrapped polyethylene separator envelope with a V-profile, a back web thickness of 350 µm, an overall thickness of 1.25 mm, with a 0.9 mm wet glass mat.
   The experimental batteries had the following characteristics: a negative-wrapped polyethylene hybrid separator envelope with a X-profile, a back web thickness of 400 µm that is inclusive of the X-profile rib (300 µm+100 µm), an overall thickness of 1.5 m, with a 1.1 mm wet glass mat (a 2 layer glass mat of 0.8 mm and 0.3 mm). Some of the experimental batteries further contained a surfactant additive as generally described above. The surfactant additive was applied with an amount equal to 7.5 g/m$^2$. The comparative performance of the batteries are depicted in FIGS. 2A-11F.
   FIGS. 2A, 2B and 2C depict the discharge as a percentage of initial discharge over the course of 168 cycles while discharging at 43 A to 10.5 V and charging at 13.9 V for 10 hours for a flat-plate inverter battery having samples of a control separator as generally described by Separator 1 above, a ribbed separator having an additive and in the shape of a conventional envelope as generally described by Separator 4 above, and a ribbed separator having an additive and in the shape of a hybrid envelope as generally described by Separator 6 above.
   FIGS. 3A, 3B and 3C depict the discharge as a percentage of initial discharge over the course of 168 cycles while discharging at 43 A to 10.5 V and charging at 13.9 V for 10 hours for a flat-plate inverter battery having samples of a control separator as generally described by Separator 1 and a hybrid separator as generally described by Separator 6.
   FIGS. 4A, 4B and 4C depict the comparative recharge over the course of 168 cycles while discharging at 43 A to 10.5 V and charging at 13.9 V for 10 hours for a flat-plate inverter battery having samples of a control separator as generally described by Separator 1, and a hybrid separator as generally described by Separator 6.
   FIGS. 5A, 5B and 5C depict the comparative specific gravity over the course of 50 cycles while discharging at 43 A to 10.5 V and charging at 13.9 V for 10 hours for a flat-plate inverter battery having samples of a control separator as generally described by Separator 1, and a hybrid separator as generally described by Separator 6.
   FIGS. 6A-1 to 6C-4 depict the comparative recharge profile while discharging at 43 A to 10.5 V and charging at 13.9 V for 10 hours for a flat-plate inverter battery having samples of a control separator as generally described by Separator 1, and a hybrid separator as generally described by Separator 6.
   FIGS. 7A, 7B and 7C depict the comparative discharge duration/backup time during inverter battery cycling tests discharging at 43 A to 10.5 V and charging at 13.9 V for 10 hours for a flat-plate inverter battery having samples of a control separator as generally described by Separator 1, and a hybrid separator as generally described by Separator 6.
   FIGS. 8A, 8B and 8C depict the comparative recharge input data in Ah during inverter battery cycling tests for a flat-plate inverter battery having samples of a control separator as generally described by Separator 1, and a hybrid separator as generally described by Separator 6.
   FIGS. 9A, 9B and 9C depict the comparative specific gravity during inverter battery cycling tests for a flat-plate inverter battery having of a control separator as generally described by Separator 1, and a hybrid separator as generally described by Separator 6.

Figure 10:
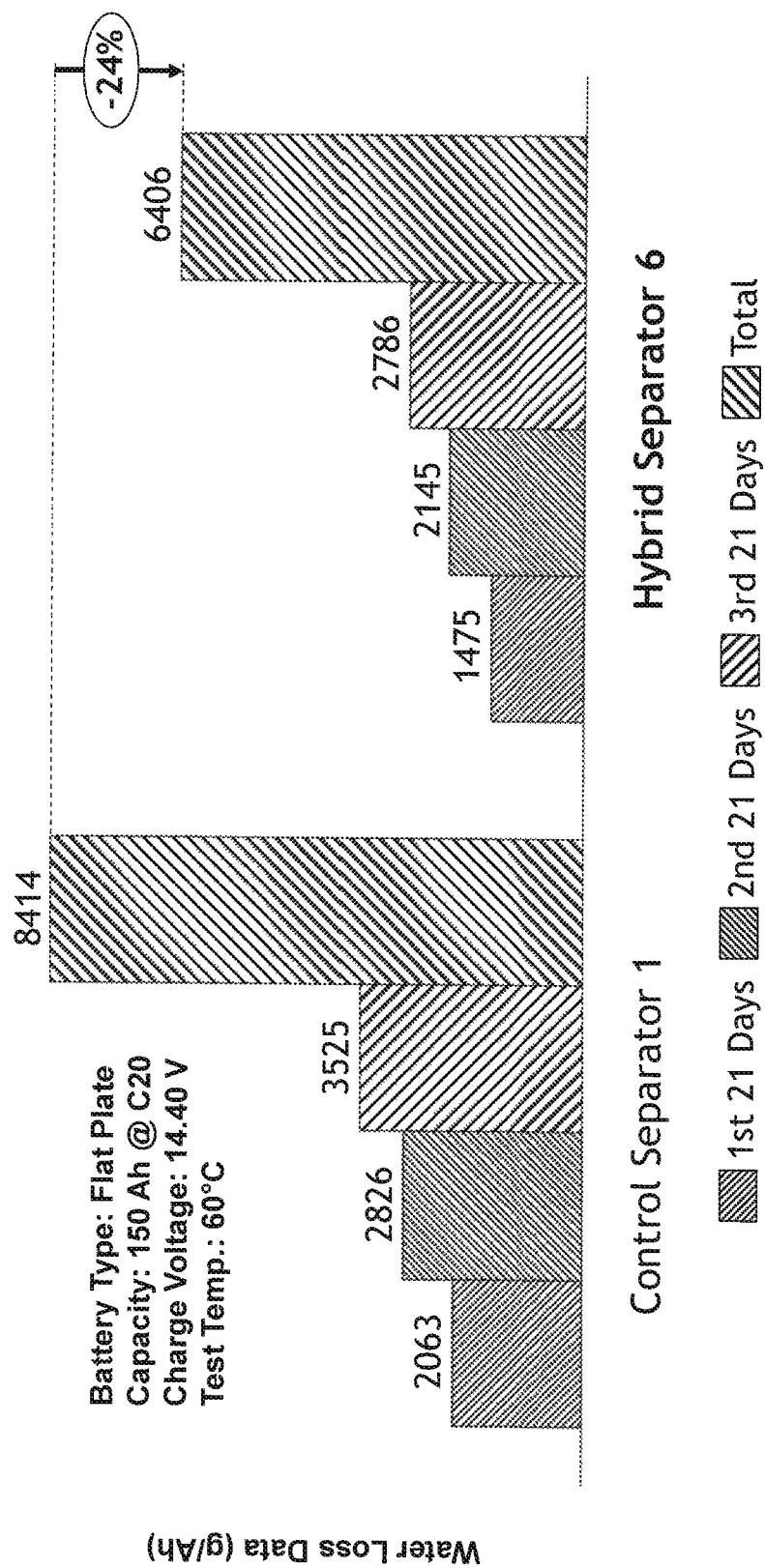
FIG. 10 depicts the comparative water loss for a flat-plate inverter battery having a control separator, and a hybrid separator with an X-profile negative rib pattern and an additive.
Figure 11A:
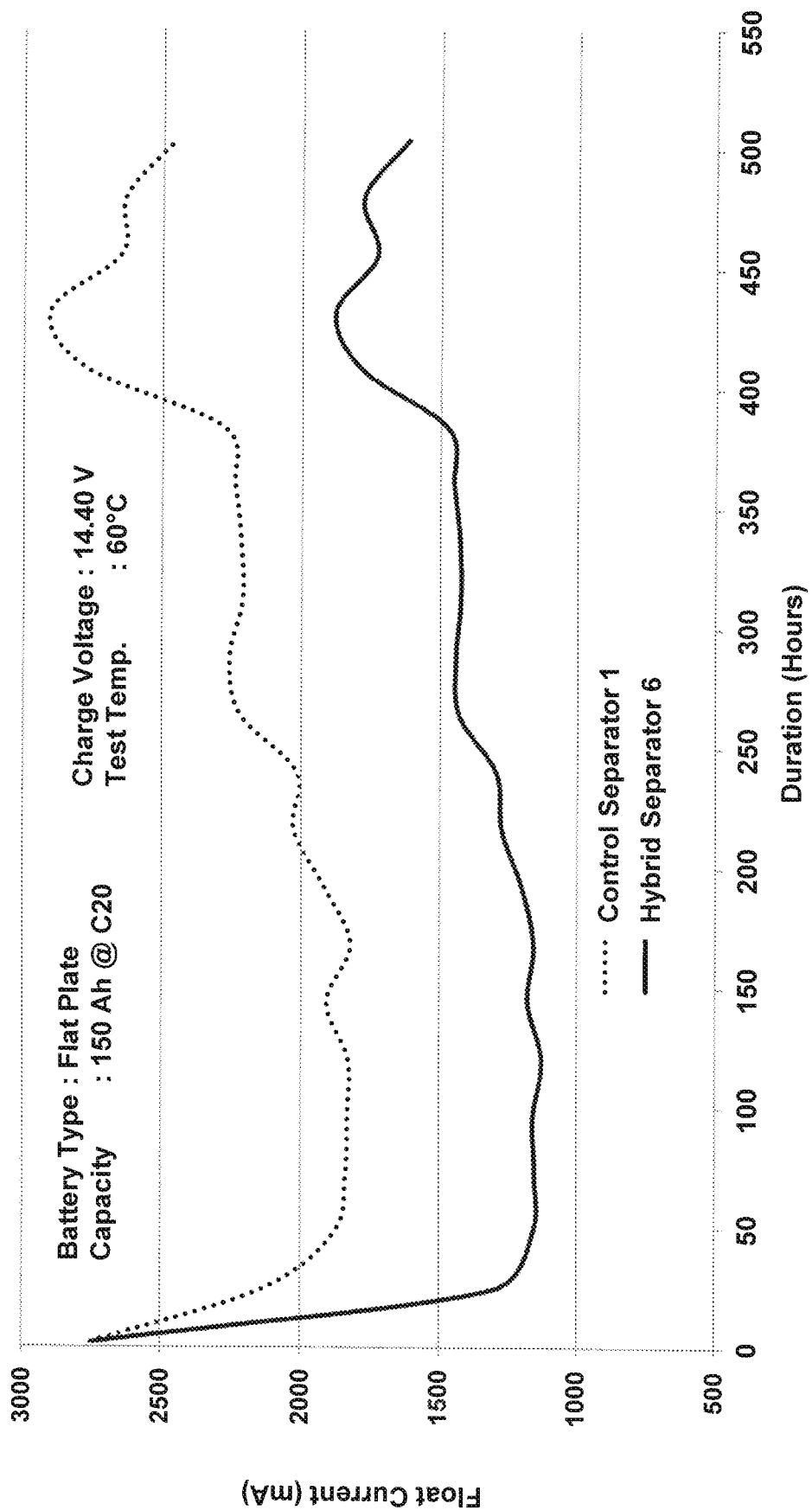
FIGS. 11A, 11B, 11C, 11D, 11E, and 11F depict the comparative water loss for a flat-plate inverter battery having samples of a control separator, and a hybrid separator with an X-profile negative rib pattern and an additive.
Figure 11B:
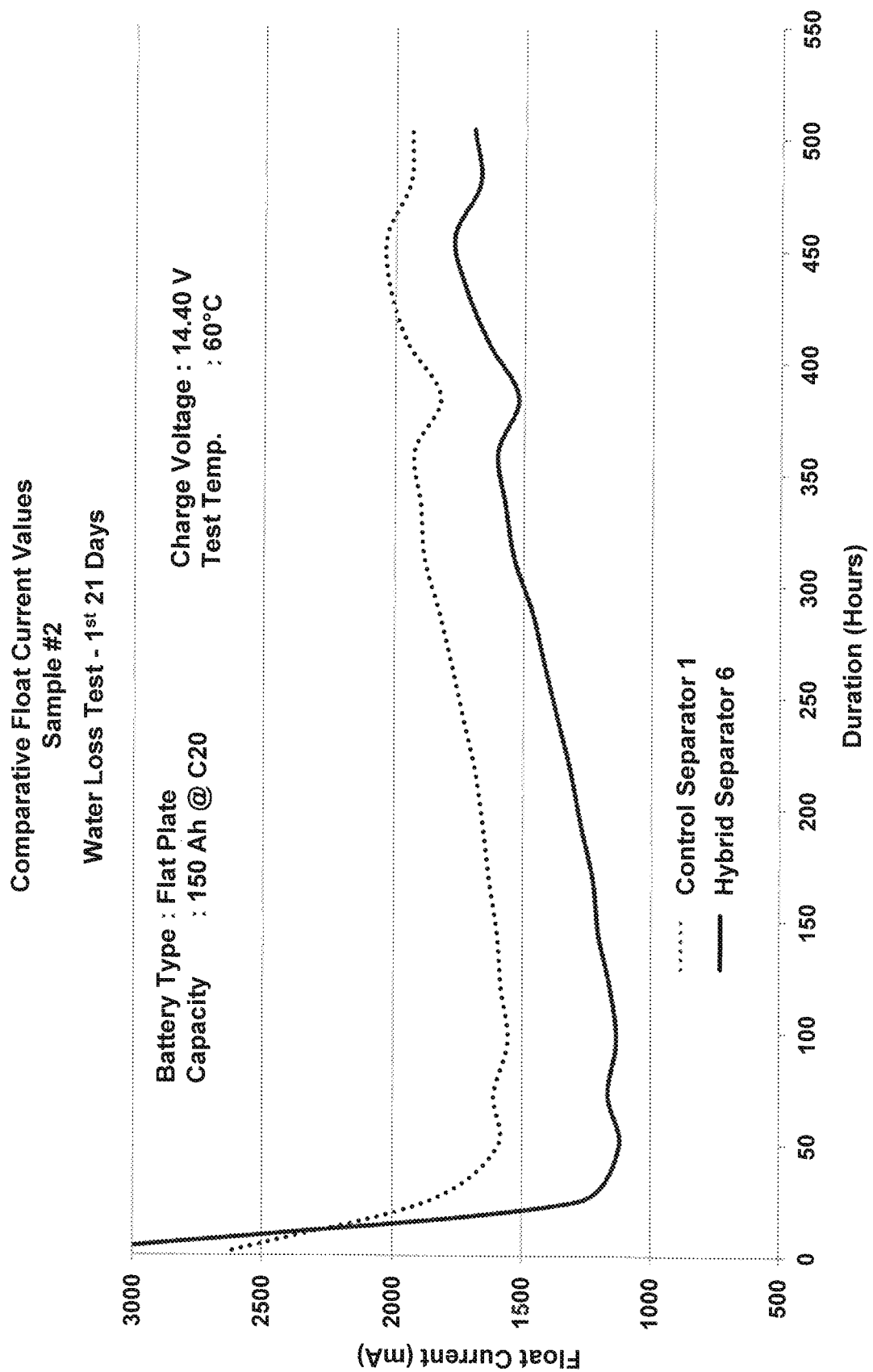
Figure 11C:
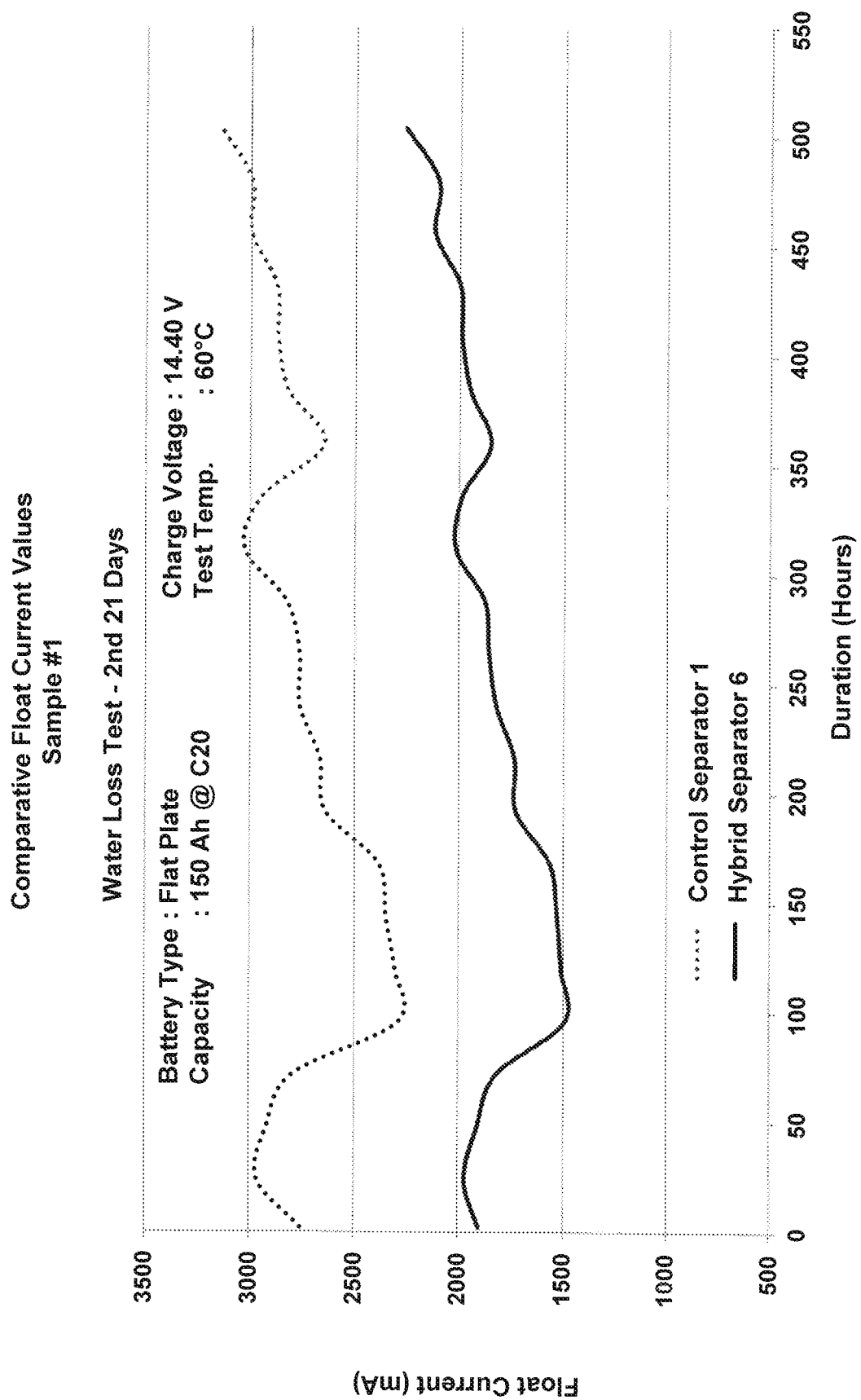
Figure 11D:
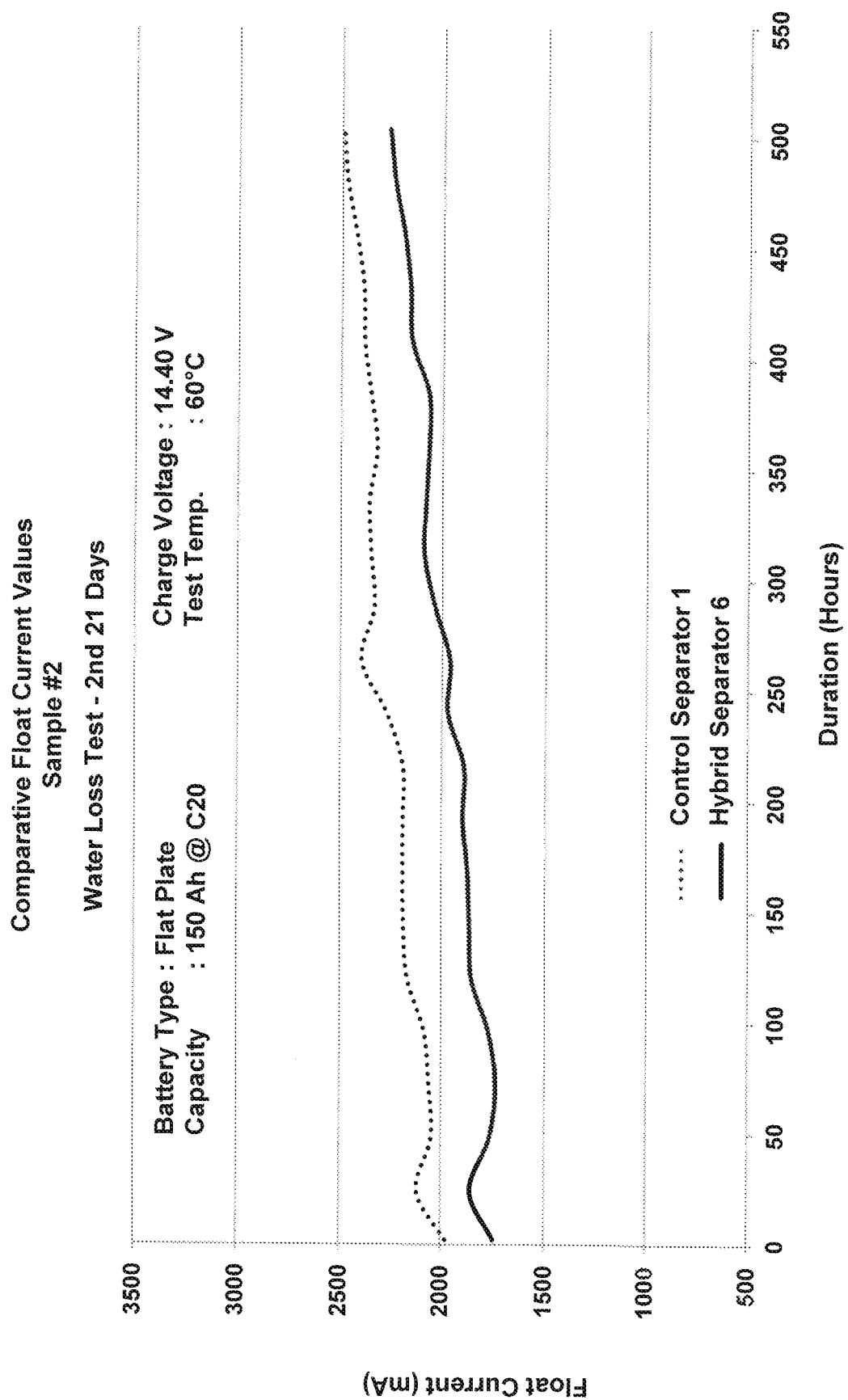
Figure 11E:
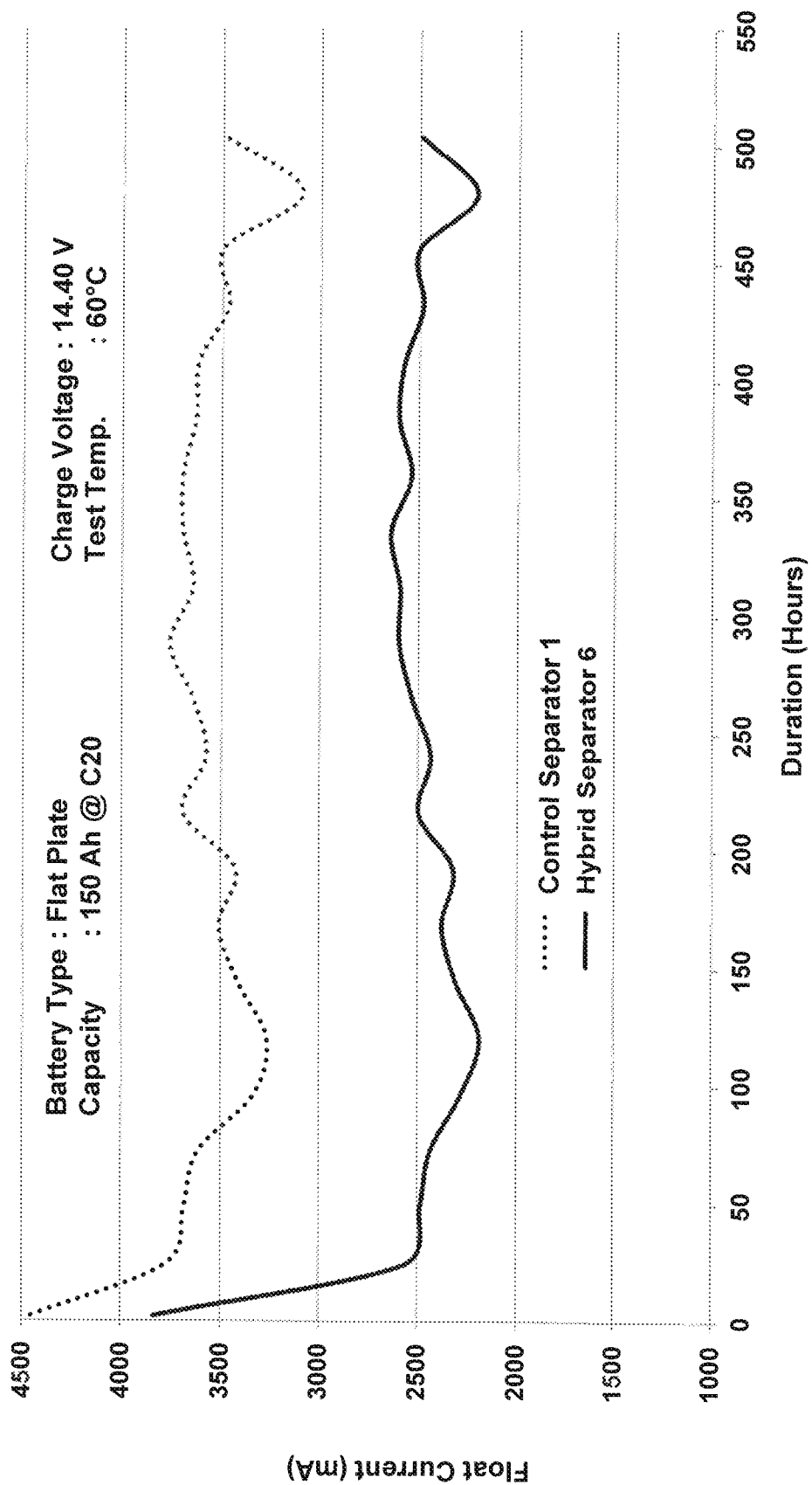
Figure 11F:
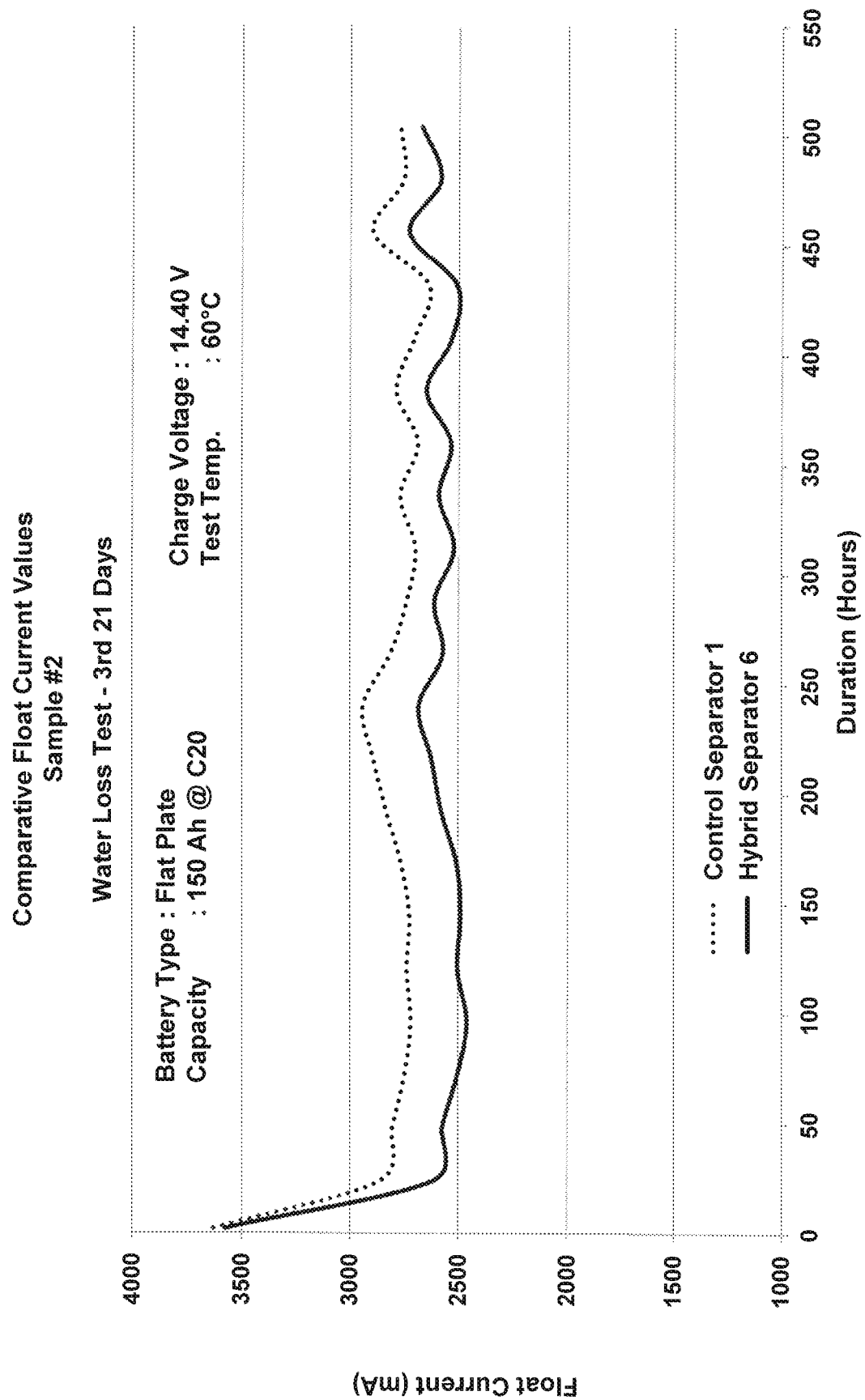

FIG. 10 depicts the comparative water loss for a flat-plate inverter battery comparing a control separator as generally described by Separator 1, and a hybrid separator as generally described by Separator 6.

FIGS. 11A, 11B, 11C, 11D, 11E, and 11F depict the comparative water loss for a flat-plate inverter battery having samples of a control separator as generally described by Separator 1, and a hybrid separator as generally described by Separator 6.

Figure 12A:
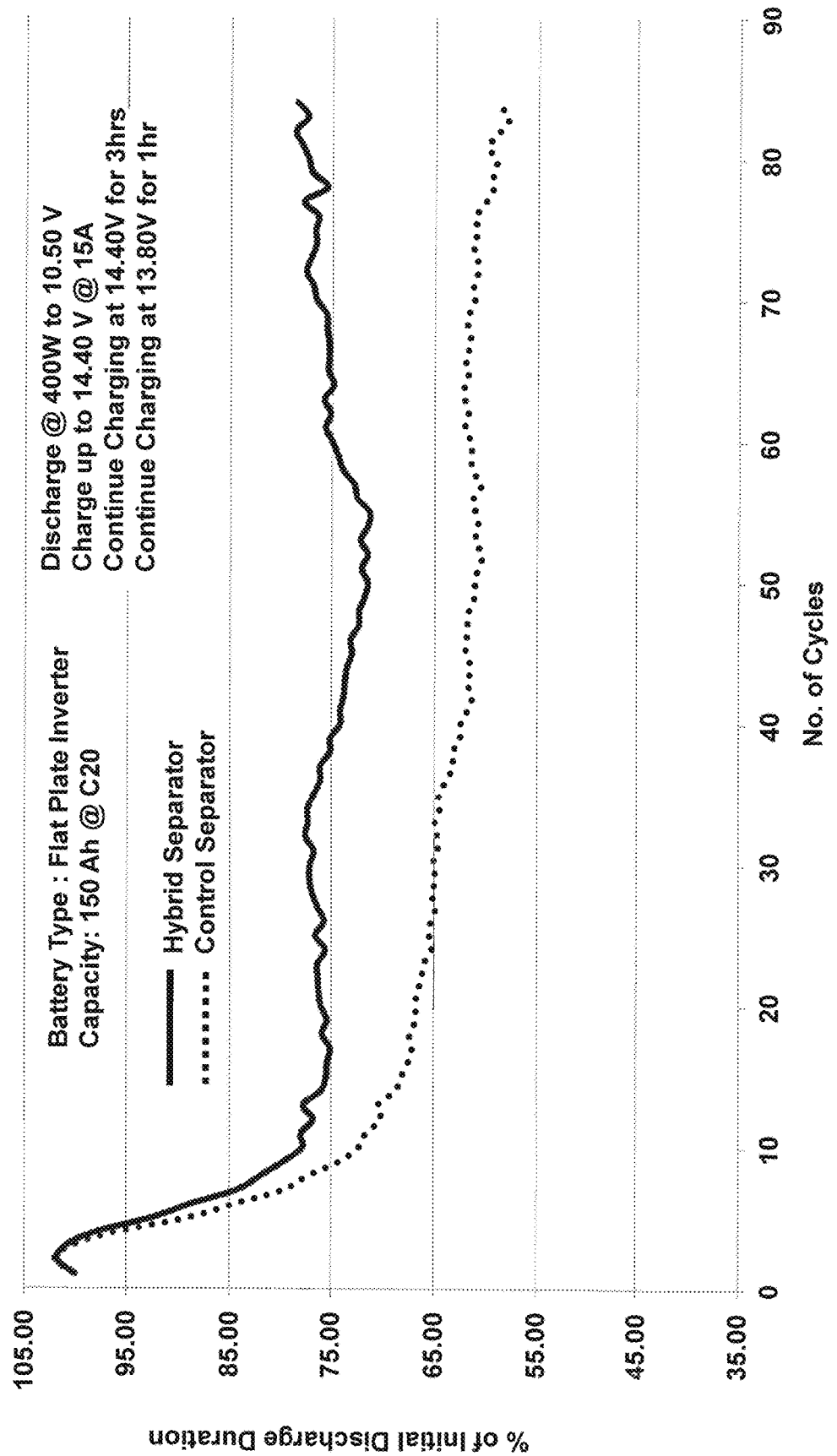
FIGS. 12A, 12B, 12C, and 12D depict the discharge duration as a percentage of initial backup time.
Figure 12B:
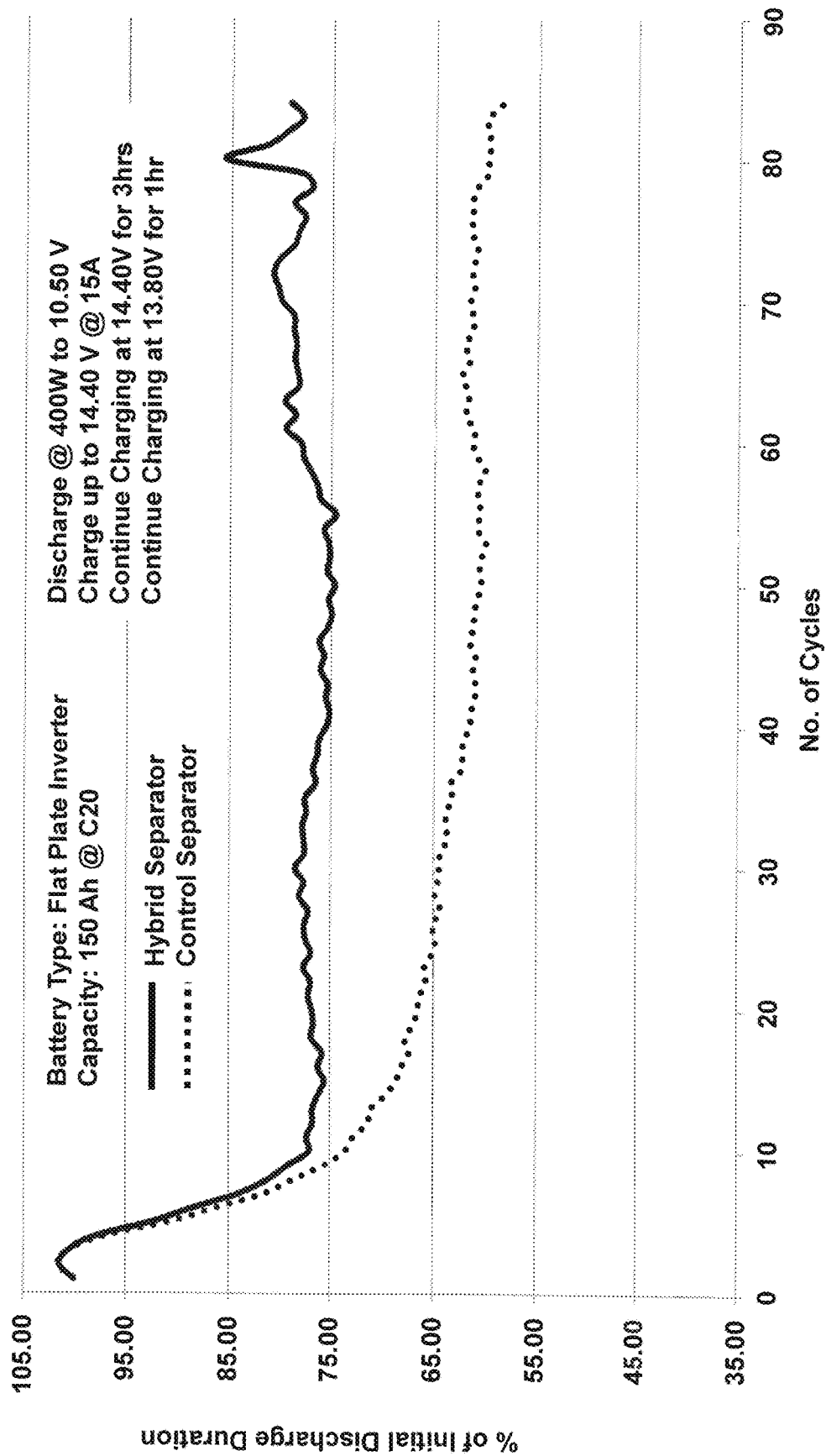
Figure 12C:
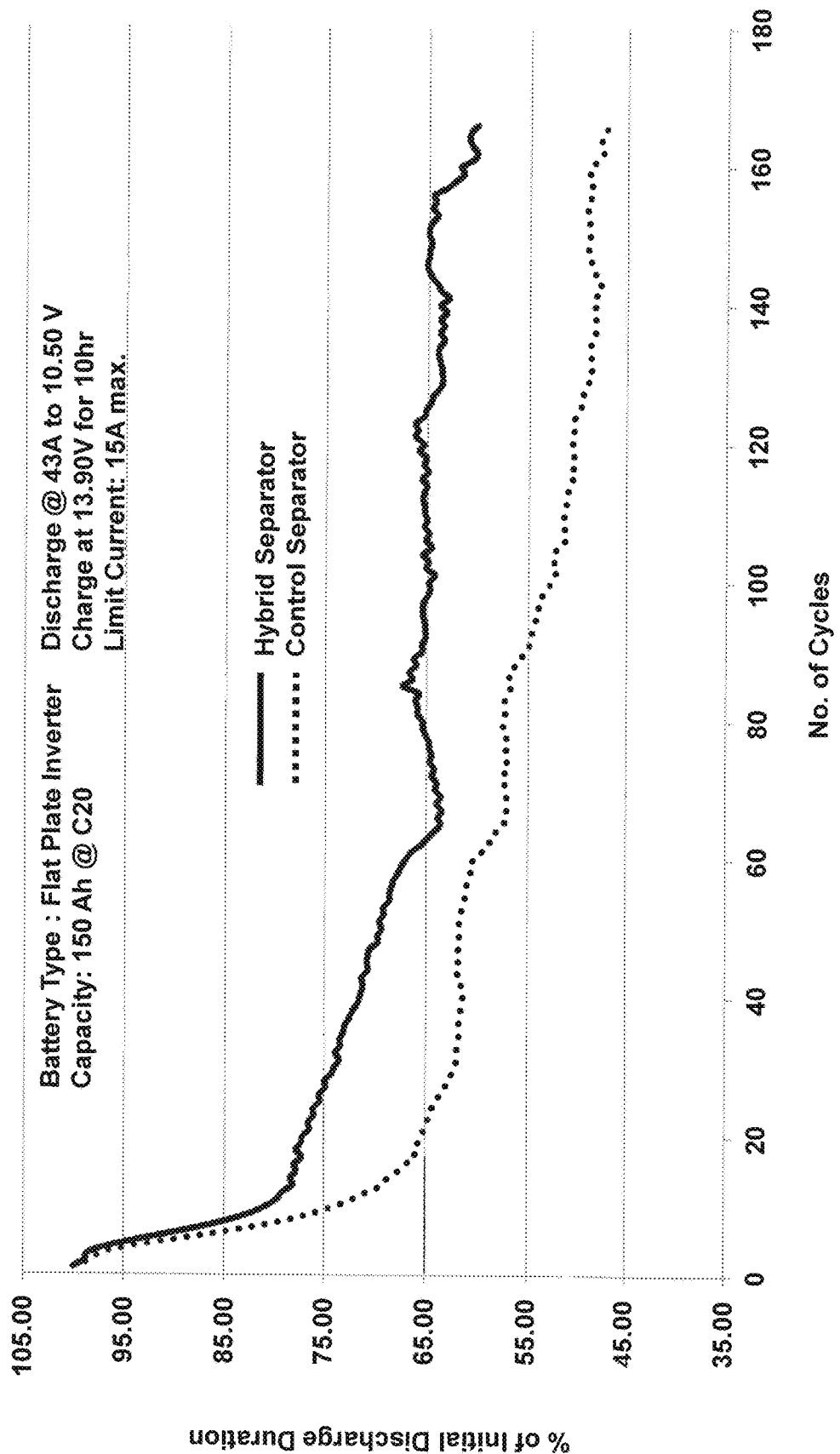
Figure 12D:
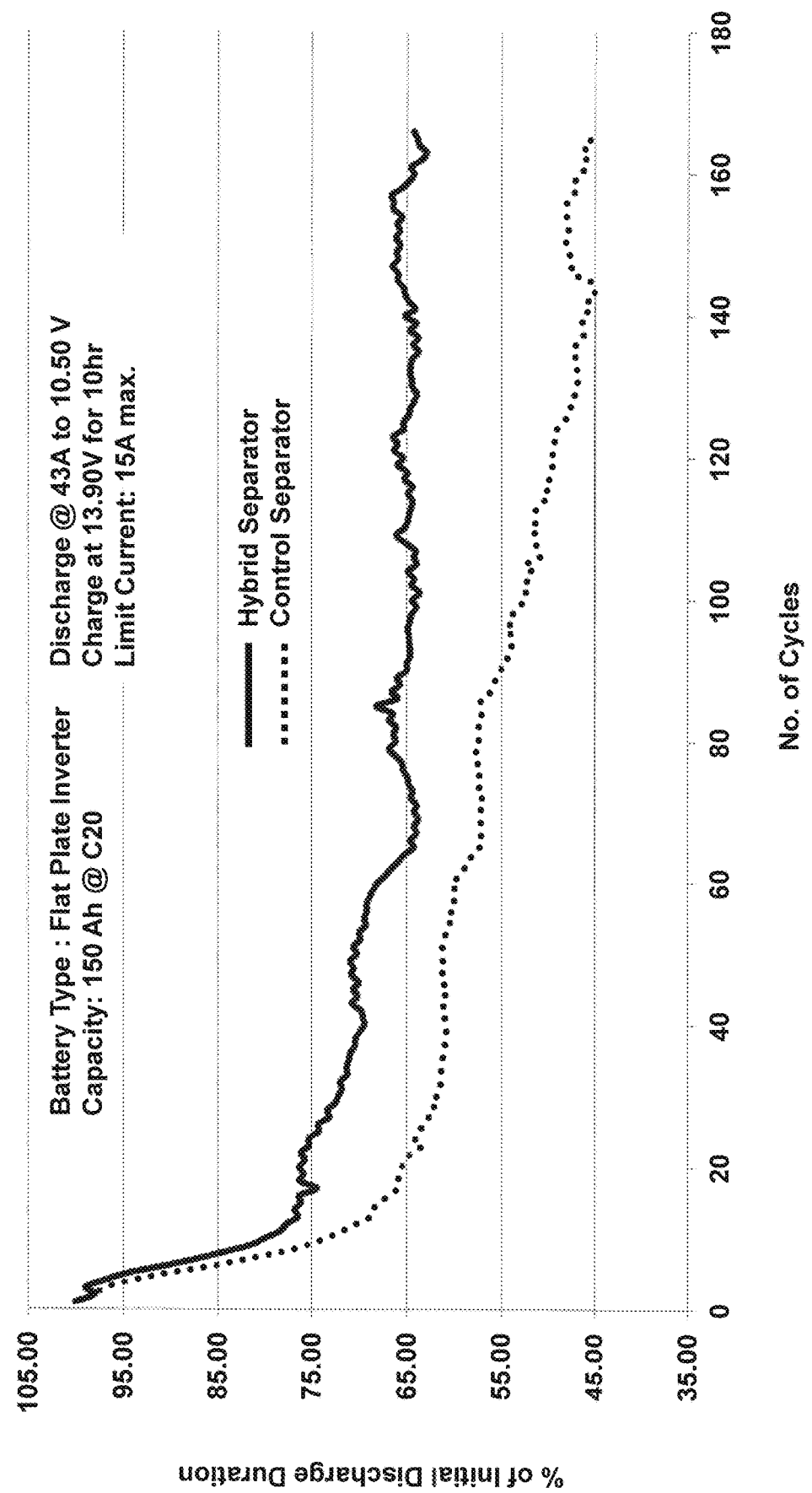

FIGS. 12A, 12B, 12C, and 12D depict the discharge duration as a percentage of initial backup time. FIGS. 12A and 12B represent the discharge duration as a percentage of initial backup time of a flat-plate inverter battery over the course 84 cycles while discharging at 400 W to 10.50 V; charging up to 14.40 V at 15 A; continuing to charge at 14.40 V for 3 hours; and continuing to charge at 13.8 V for 1 hour. FIGS. 12C and 12D represent the discharge duration as a percentage of initial backup time of a flat-plate inverter battery over the course 168 cycles while discharging at 43 A to 10.50 V; charging at 13.90 V for 10 hours, with a maximum current limit of 15 A. All of the batteries are provided with samples of a control separator, and a hybrid separator.

Figure 13B:
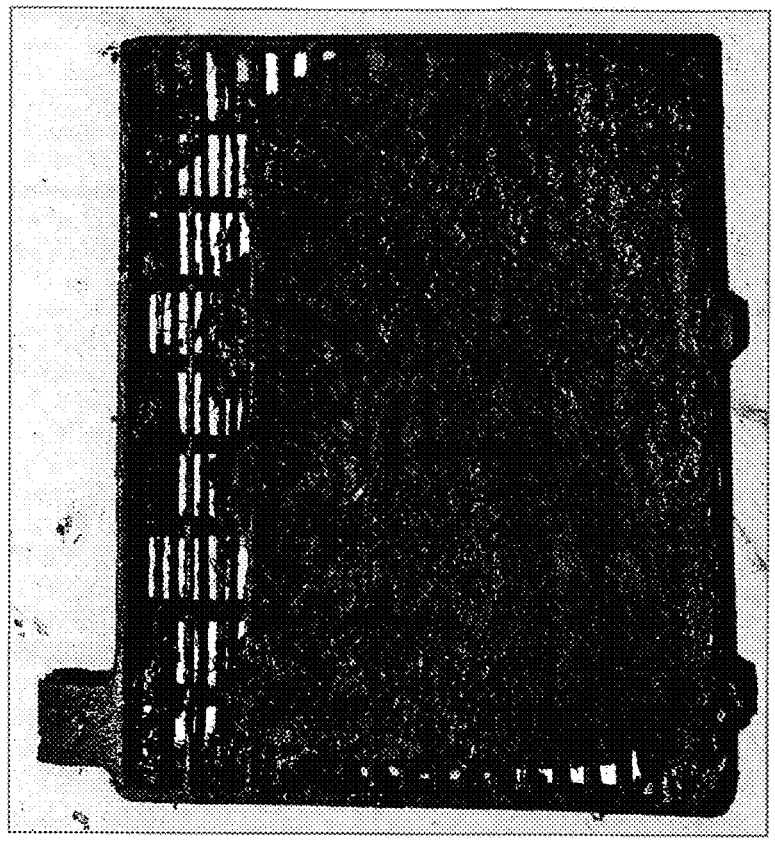
FIG. 13B is a photographic representation of a battery positive plate of a conventional control separator after approximately 250 charge and discharge cycles.
Figure 13A:
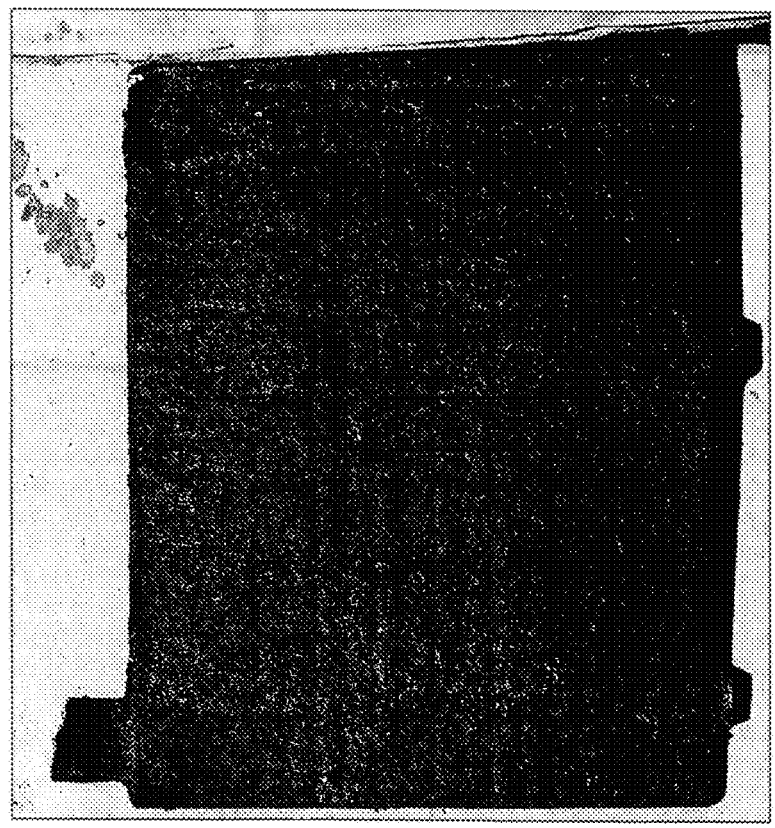
FIG. 13A is a photographic representation of a battery positive plate of a hybrid separator after approximately 250 charge and discharge cycles.

FIG. 13A is a photographic representation of a battery positive plate of a hybrid separator after approximately 250 charge and discharge cycles. FIG. 13B is a photographic representation of a battery positive plate of a conventional control separator after approximately 250 charge and discharge cycles. The plate represented in FIG. 13A associated with the hybrid separator was found to be healthier.

FIG. 14A is a photographic representation of a battery negative plate of a hybrid separator after approximately 250 charge and discharge cycles. FIG. 14B is a photographic representation of a battery negative plate of a conventional control separator after approximately 250 charge and discharge cycles. The plate represented in FIG. 14A associated with the hybrid separator was found to be healthier.

Figure 15B:
FIG. 15B is a photographic representation of a conventional control separator after approximately 250 charge and discharge cycles.
Figure 15A:
FIG. 15A is a photographic representation of a hybrid separator after approximately 250 charge and discharge cycles.

FIG. 15A is a photographic representation of a hybrid separator after approximately 250 charge and discharge cycles. FIG. 15B is a photographic representation of a conventional control separator after approximately 250 charge and discharge cycles. The hybrid separator represented in FIG. 15A, associated with the healthier electrode plates, was found to have little to no deposition of positive active material ("PAM"), and was much cleaner than the control separator.

Figure 16B:
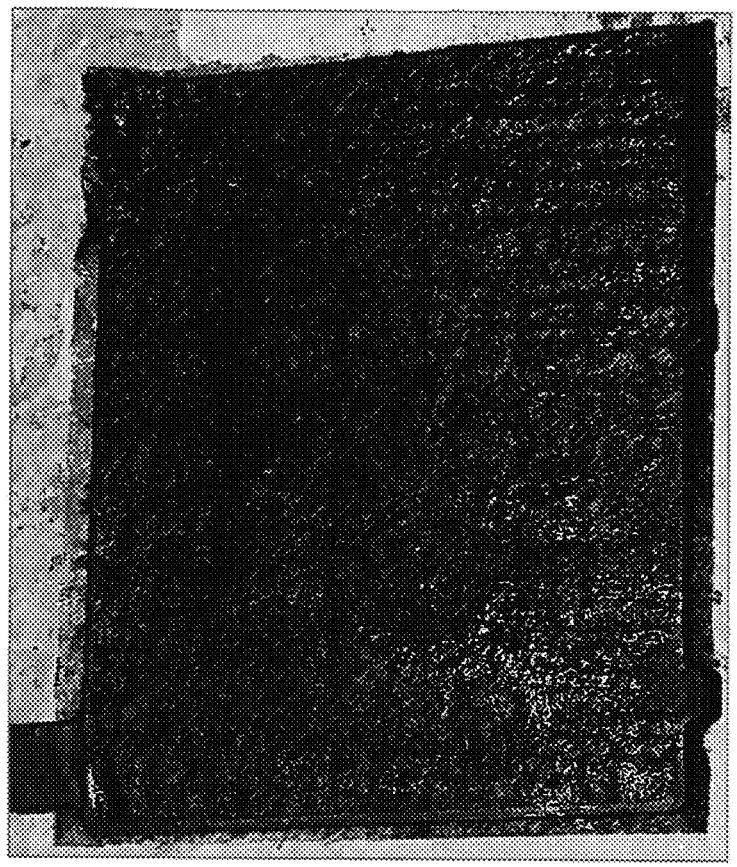
FIG. 16B is a photographic representation of a battery positive plate of a conventional control separator after approximately 310 charge and discharge cycles.
Figure 16A:
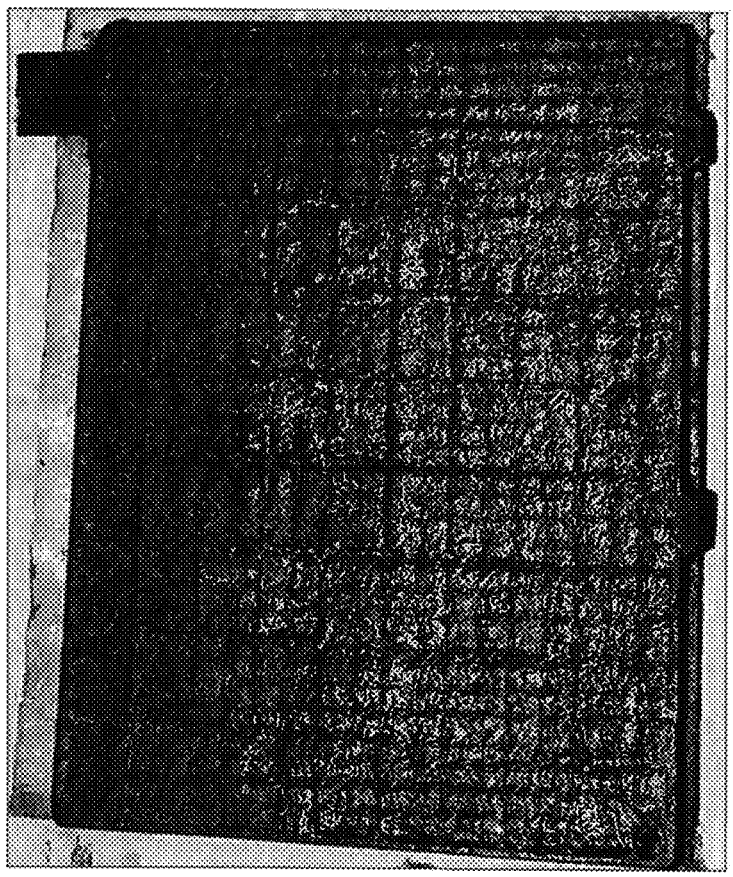
FIG. 16A is a photographic representation of a battery positive plate of a hybrid separator after approximately 310 charge and discharge cycles.

FIG. 16A is a photographic representation of a battery positive plate of a hybrid separator after approximately 310 charge and discharge cycles. FIG. 16B is a photographic representation of a battery positive plate of a conventional control separator after approximately 310 charge and discharge cycles. The plate represented in FIG. 16A associated with the hybrid separator was found to be healthier.

Figure 17B:
FIG. 17B is a photographic representation of a battery negative plate of a conventional control separator after approximately 310 charge and discharge cycles.
Figure 17A:
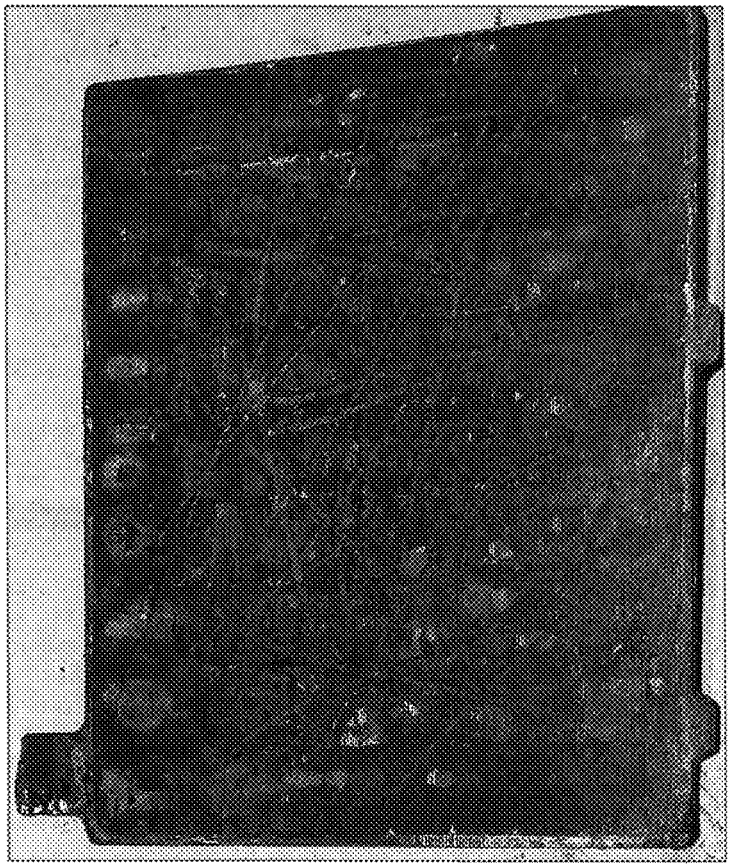
FIG. 17A is a photographic representation of a battery negative plate of a hybrid separator after approximately 310 charge and discharge cycles.

FIG. 17A is a photographic representation of a battery negative plate of a hybrid separator after approximately 310 charge and discharge cycles. FIG. 17B is a photographic representation of a battery negative plate of a conventional control separator after approximately 310 charge and discharge cycles. The plate represented in FIG. 17A associated with the hybrid separator was found to be healthier.

Figure 18B:
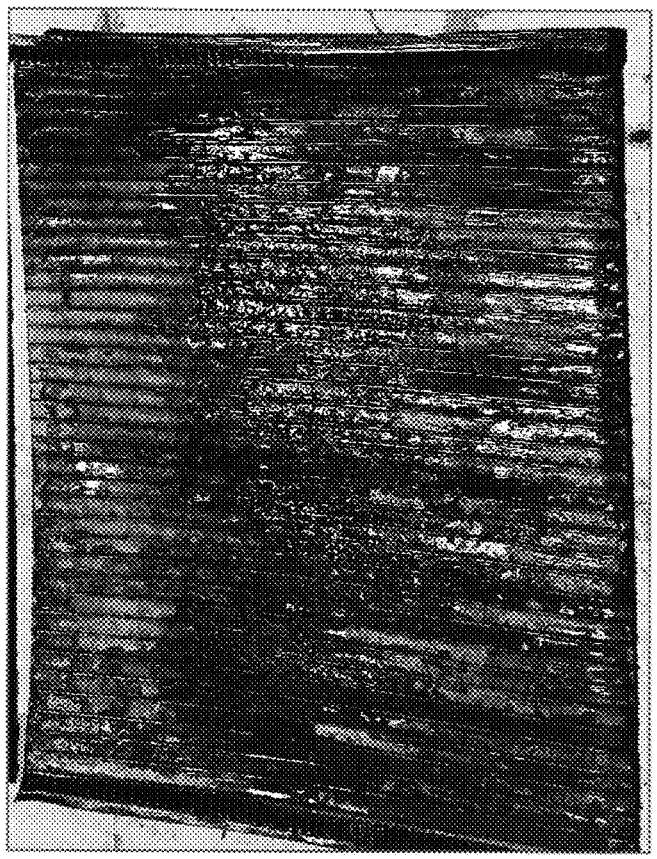
FIG. 18B is a photographic representation of a conventional control separator after approximately 310 charge and discharge cycles.
Figure 18A:
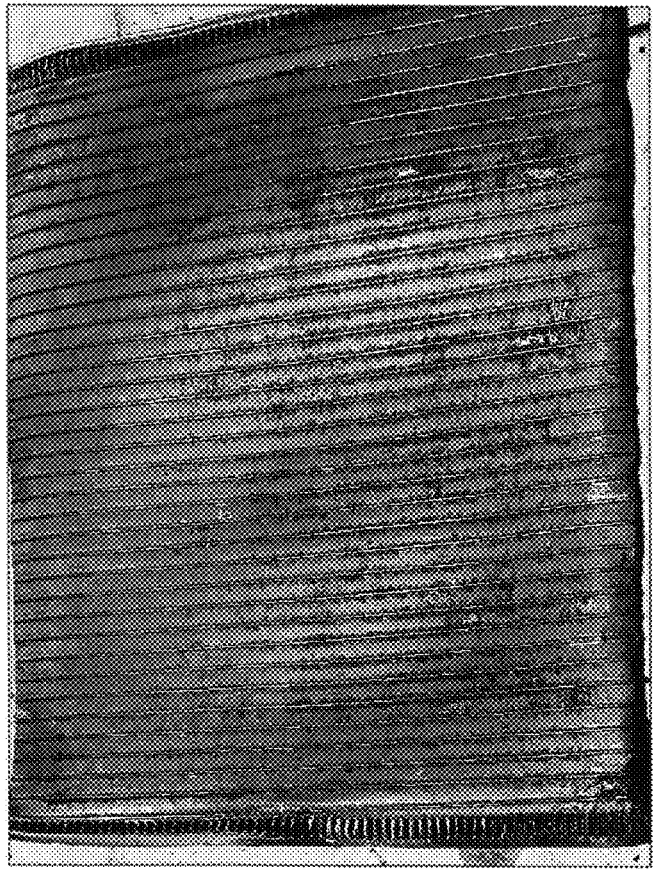
FIG. 18A is a photographic representation of a hybrid separator after approximately 310 charge and discharge cycles.

FIG. 18A is a photographic representation of a hybrid separator after approximately 310 charge and discharge cycles. FIG. 18B is a photographic representation of a conventional control separator after approximately 310 charge and discharge cycles. The hybrid separator represented in FIG. 18A, associated with the healthier electrode plates, was found to have little to no paste softening as evidenced by the scratches on the surface of the separators.

The embodiments of the hybrid separators and their associated batteries were found to have a higher back-up time with respect to the average initial backup as compared to control separators. This higher back up time was found to be in the range of approximately 8%-15%, and more particularly between approximately 10%-15%, and alternatively between approximately 8%-12%. As compared to the control separators and their associated batteries, the hybrid separators and associated batteries also exhibited a better specific gravity trend, better re-chargeability characteristics, less water loss of approximately 24%, and a lower float current of approximately 20%-25%.

In accordance with at least selected embodiments, the present disclosure is directed to novel or improved separators, battery separators, flat-plate separators, batteries, cells, and/or methods of manufacture and/or use of such separators, battery separators, flat-plate separators, cells, and/or batteries. In accordance with at least certain embodiments, the present disclosure is directed to novel or improved lead acid battery separators for flat-plate cycling batteries, flat-plate deep cycling batteries, flat-plate inverter batteries, flat-plate UPS batteries, flat-plate home UPS batteries, flat-plate long cycle life batteries, deep cycle stationary, traction, inverter, or fork lift batteries, flooded batteries, UPS, ESS, BESS, flat-plate cells, and/or improved methods of making and/or using such improved separators, cells, batteries, systems, and/or the like. In accordance with at least certain embodiments, the present disclosure is directed to an improved separator for flat-plate stationary batteries and/or improved methods of using such batteries having such improved separators. In addition, disclosed herein are methods, systems and battery separators for enhancing battery life, reducing water loss, and/or improving uniformity in at least flat-plate stationary batteries. In accordance with at least particular embodiments, the present disclosure is directed to an improved separator for flat-plate batteries wherein the separator includes performance enhancing additives or coatings, hybrid envelopes, cross rib shapes or profiles, and/or the like.

Disclosed herein are improved separators for valve regulated lead acid batteries. The separators can contain performance enhancing additives, novel hybrid envelope shapes, ribbed surfaces, or combinations thereof.

The separators of the present disclosure are particularly useful for flat-plate cycling batteries. The separators of the present disclosure effectively enhance the battery re-chargeability and the backup time. In addition, the separators of the present disclosure contribute to the reduction of water loss in the battery, lowering the maintenance needs in service. It is expected that batteries having the separators of the present disclosure will be useful in various applications, such as in inverters, golf carts, as well as solar and traction applications.

An exemplary hybrid battery separator is provided with a porous sheet with a folded bottom edge and joined lateral edges that form a pocket. The folded bottom edge may have one or more openings or slits. The hybrid separators of the present disclosure are particularly useful for flat-plate cycling batteries. The separators of the present disclosure may effectively enhance the battery re-chargeability and the backup time. In addition, the separators of the present disclosure may contribute to the reduction of water loss in the battery, lowering the maintenance needs in service. It is expected that batteries having the separators of the present disclosure may be useful in various applications, such as in inverters, golf carts, as well as solar and traction applications.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein, which are intended merely as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" can be used in place of "comprising" and "including" to provide for more specific embodiments of the invention and are also disclosed. "Exemplary" means "an example of" and is not intended to convey an indication of a preferred or ideal embodiment. "Such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A battery separator for a lead acid battery such as a flat-plate battery comprising:
   a ribbed porous sheet comprising a bottom edge and joined lateral edges that form a pocket or envelope having an outer surface and an inner surface;
   wherein the bottom edge has one or more slits through the sheet that do not extend to the joined lateral edges.

2. The battery separator according to claim 1, wherein the separator contains at least one surfactant.

3. The battery separator according to claim 2, wherein the surfactant is a non-ionic surfactant.

4. The battery separator according to claim 3, wherein the non-ionic surfactant comprises one or more polyol fatty acid esters, polyethoxylated esters, polyethoxylated alcohols, alkyl polysaccharides such as alkyl polyglycosides and blends thereof, amine ethoxylates, sorbitan fatty acid ester ethoxylates, organosilicone based surfactants, ethylene vinyl acetate terpolymers, ethoxylated alkyl aryl phosphate esters or sucrose esters of fatty acids.

5. A flooded lead acid battery comprising the separator of claim 1.

6. A flat-plate lead acid battery comprising the separator of claim 1.

7. A battery separator for a lead acid battery comprising:
   a porous sheet having a bottom edge and joined lateral edges that form a pocket or envelope having an outer surface and an inner surface;
   wherein the bottom edge has one or more slits through the sheet that do not extend to the joined lateral edges; and
   wherein the separator contains at least one surfactant.

8. A lead acid battery comprising the separator of claim 7.

9. A flat-plate lead acid battery comprising the separator of claim 7.

10. A flat-plate lead acid battery, a flat-plate cycling battery, a flat-plate deep cycling battery, a flat-plate inverter battery, a flat-plate UPS battery, a flat-plate home UPS battery, a flat-plate long cycle life battery, a stationary battery, a deep cycle stationary, traction, inverter, or fork lift battery, a flooded battery, a UPS, ESS, or BESS battery or cell, a flat-plate cell, a flat-plate UPS, ESS, or BESS cell, or combinations thereof comprising the separator of claim 7.

* * * * *